(12) United States Patent
Foreman et al.

(10) Patent No.: US 11,723,376 B1
(45) Date of Patent: *Aug. 15, 2023

(54) METHOD AND APPARATUS FOR A CARRIAGE AND A CONVEYOR FOR AUTOMATED CUTTING OF MEAT

(71) Applicant: Tyson Foods, Inc., Springdale, AR (US)

(72) Inventors: Doug Foreman, Springdale, AR (US); Douglas Martin Linn, Cave Springs, AR (US); James A. Ruff, Farmington, AR (US)

(73) Assignee: Tyson Foods, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 17/542,453

(22) Filed: Dec. 5, 2021

Related U.S. Application Data

(60) Division of application No. 16/907,012, filed on Jun. 19, 2020, now Pat. No. 11,191,281, which is a
(Continued)

(51) Int. Cl.
| | |
|---|---|
| *A22C 21/00* | (2006.01) |
| *B26D 5/00* | (2006.01) |
| *B26D 7/08* | (2006.01) |

(52) U.S. Cl.
CPC ........ *A22C 21/003* (2013.01); *A22C 21/0046* (2013.01); *A22C 21/0053* (2013.01);
(Continued)

(58) Field of Classification Search
CPC .............. A22C 21/003; A22C 21/0046; A22C 21/0053; B26D 5/007; B26D 7/086
(Continued)

(56) References Cited

U.S. PATENT DOCUMENTS

| | | |
|---|---|---|
| 4,847,954 A | 7/1989 | Lapeyre et al. |
| 5,334,084 A | 8/1994 | O'Brien et al. |

(Continued)

FOREIGN PATENT DOCUMENTS

| | | |
|---|---|---|
| EP | 0543628 A1 | 5/1993 |
| GB | 2364894 A | 2/2002 |
| WO | 2004106020 A1 | 12/2004 |

OTHER PUBLICATIONS

Misim et al. "Gribbot-Robotic 3D vision-guided harvesting of chicken fillets", Sep. 14, 2015, Computers and Electronics in Agriculture, vol. 121, pp. 84-100; https://sciencedirect.com/science/article/pii/s0168169915003701.
(Continued)

*Primary Examiner* — Richard T Price, Jr.
(74) *Attorney, Agent, or Firm* — Greensfelder, Hemker & Gale, P.C.; Mark E. Stallion

(57) ABSTRACT

The technology as disclosed herein includes a method and apparatus for deboning a meat item, and more particular for deboning a poultry item including performing an initial shoulder cut for removing boneless breast meat from the poultry carcass or frame. The method and apparatus disclosed and claimed herein is a combination of a robotic arm including an ultrasonic knife implement and a vision system for varying the cut path based on the shape and size of the poultry item. The combination as claimed including the ultrasonic knife can perform a meat cut while penetrating the meat with less force than the typical penetration that occurs when using a traditional knife.

30 Claims, 61 Drawing Sheets

Related U.S. Application Data continuation-in-part of application No. 16/201,294, filed on Nov. 27, 2018.

(60) Provisional application No. 62/614,175, filed on Jan. 5, 2018.

(52) U.S. Cl.
CPC .......... *A22C 21/0069* (2013.01); *B26D 5/007* (2013.01); *B26D 7/086* (2013.01)

(58) Field of Classification Search
USPC ................................ 452/134, 149, 156–158
See application file for complete search history.

(56) References Cited

U.S. PATENT DOCUMENTS

| | | | |
|---|---|---|---|
| 5,429,549 A * | 7/1995 | Verrijp | A22C 21/0023 452/167 |
| 5,768,970 A | 6/1998 | Wolf et al. | |
| 5,819,615 A | 10/1998 | Dale et al. | |
| 5,862,728 A | 1/1999 | Giamello | |
| 6,032,561 A | 3/2000 | Lonn et al. | |
| RE36,664 E | 4/2000 | O'Brien et al. | |
| 6,058,823 A | 5/2000 | Michoud | |
| 6,070,509 A | 6/2000 | Lonn et al. | |
| 6,089,968 A | 7/2000 | Andre et al. | |
| 6,155,919 A | 12/2000 | Haagensen et al. | |
| 7,210,993 B2 | 5/2007 | Woods et al. | |
| 10,117,438 B2 | 11/2018 | Driscoll | |
| 11,191,281 B1 | 12/2021 | Foreman et al. | |
| 2003/0145699 A1 | 8/2003 | Kim et al. | |
| 2005/0081692 A1 | 4/2005 | Mosiewicz et al. | |
| 2005/0154490 A1 * | 7/2005 | Blaine | B26D 5/005 700/103 |
| 2008/0200107 A1 | 4/2008 | Christensen et al. | |
| 2008/0281461 A1 | 11/2008 | Blaine et al. | |
| 2011/0196661 A1 | 8/2011 | Spicola et al. | |
| 2014/0114327 A1 * | 4/2014 | Boudreaux | A61B 34/25 606/130 |
| 2015/0044338 A1 | 2/2015 | Nagle et al. | |
| 2016/0150213 A1 * | 5/2016 | Mutti | G06V 20/20 348/143 |
| 2020/0077667 A1 | 3/2020 | Lauridsen et al. | |

OTHER PUBLICATIONS

Pending U.S. Appl. No. 16/201,294, filed Nov. 27, 2018, "Method and Apparatus for Efficient Automated Production of Deboned and Other Meat Cuts Utilizing an Ultrasonic Knife and Couple Controller", Foreman et al.

* cited by examiner

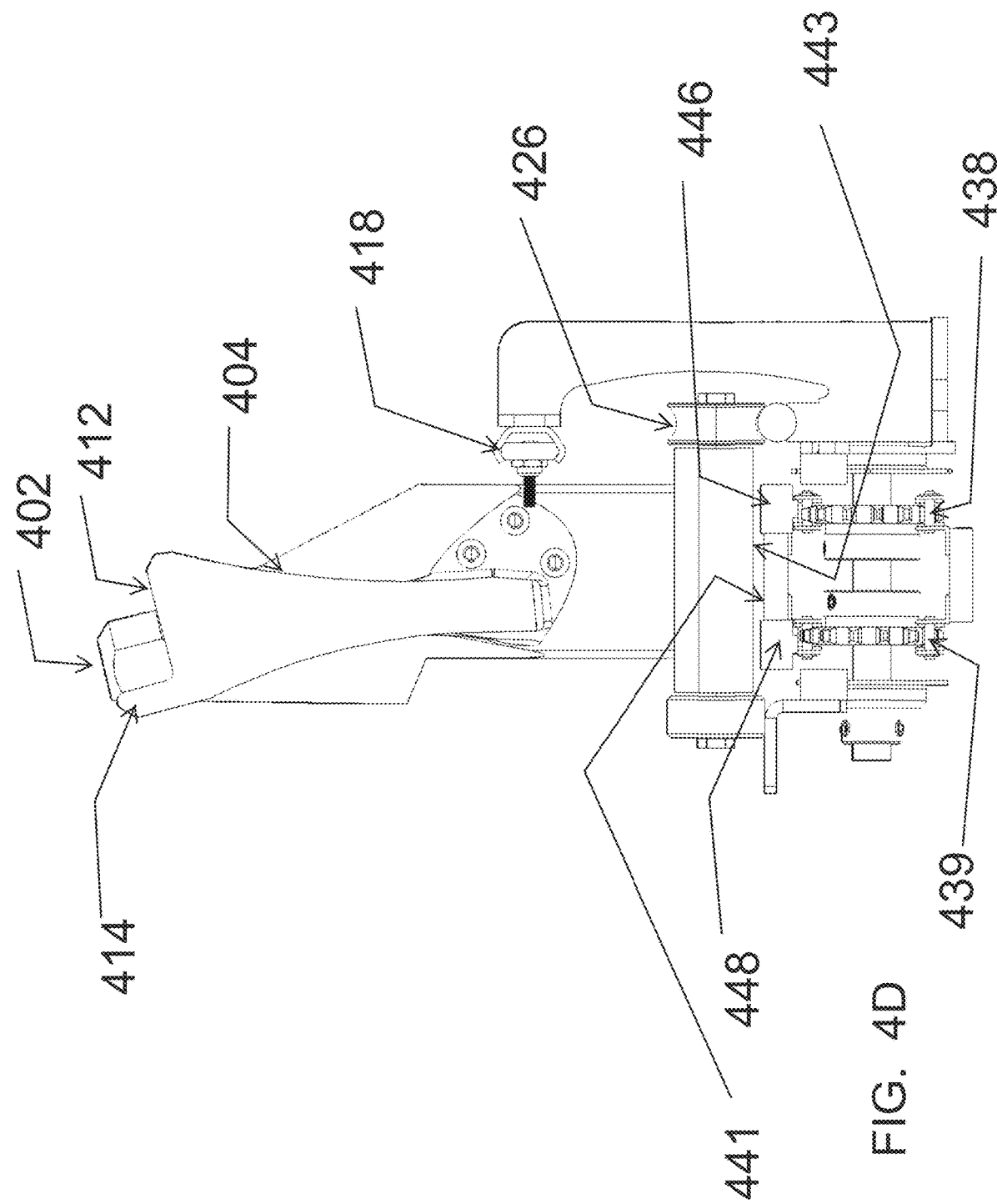

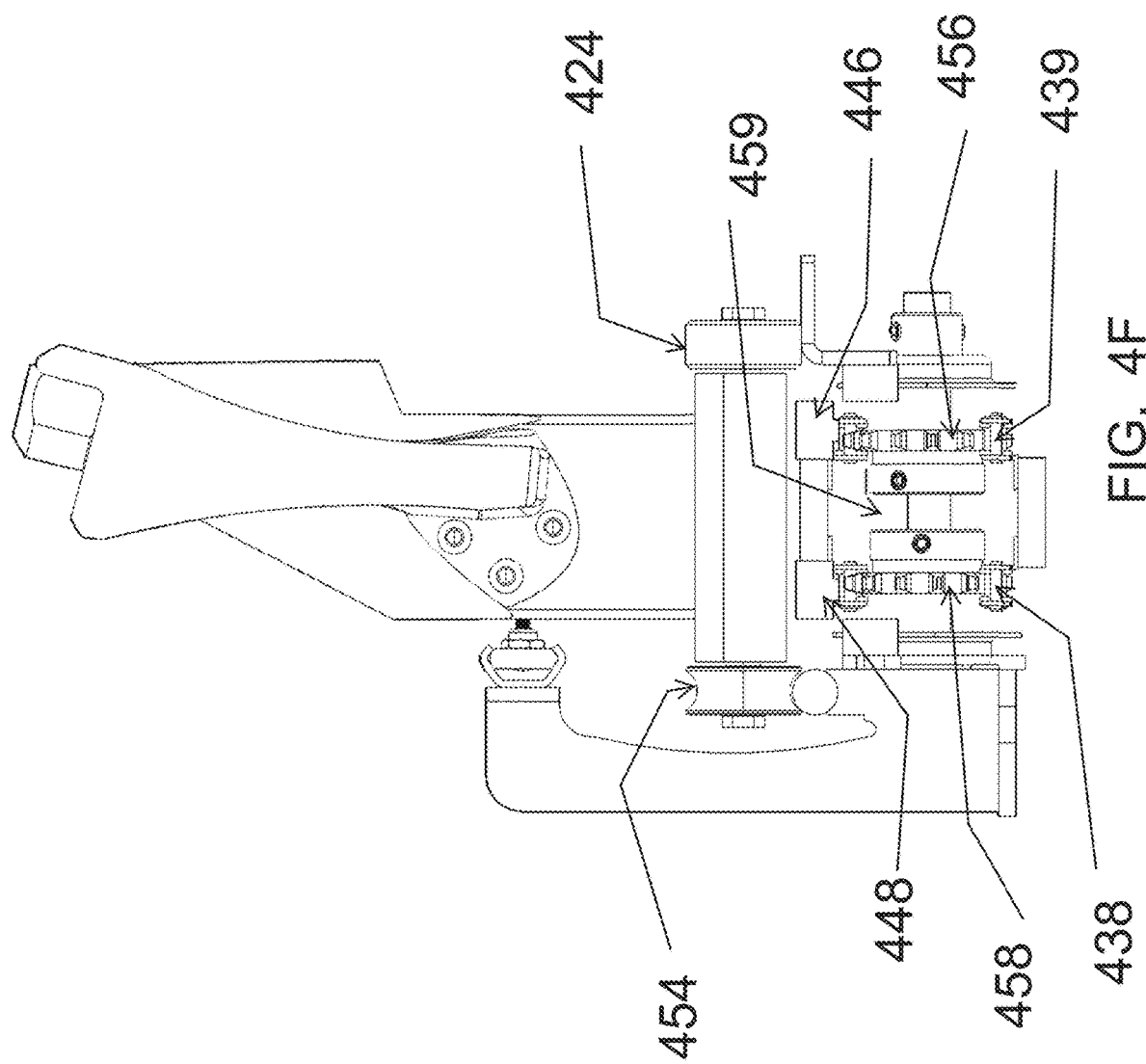

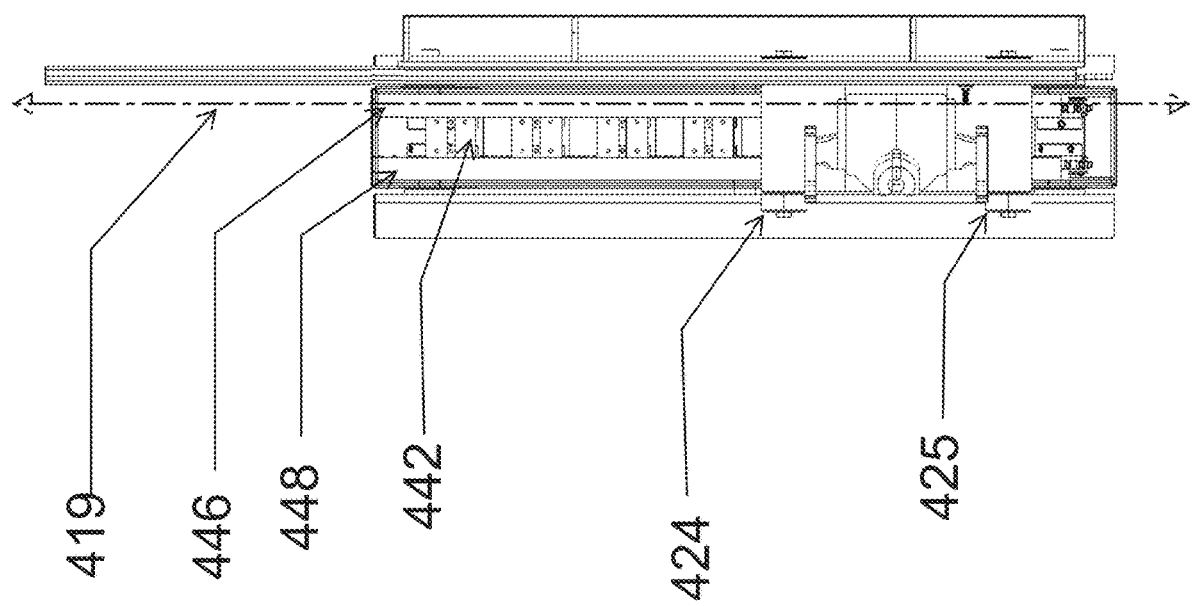

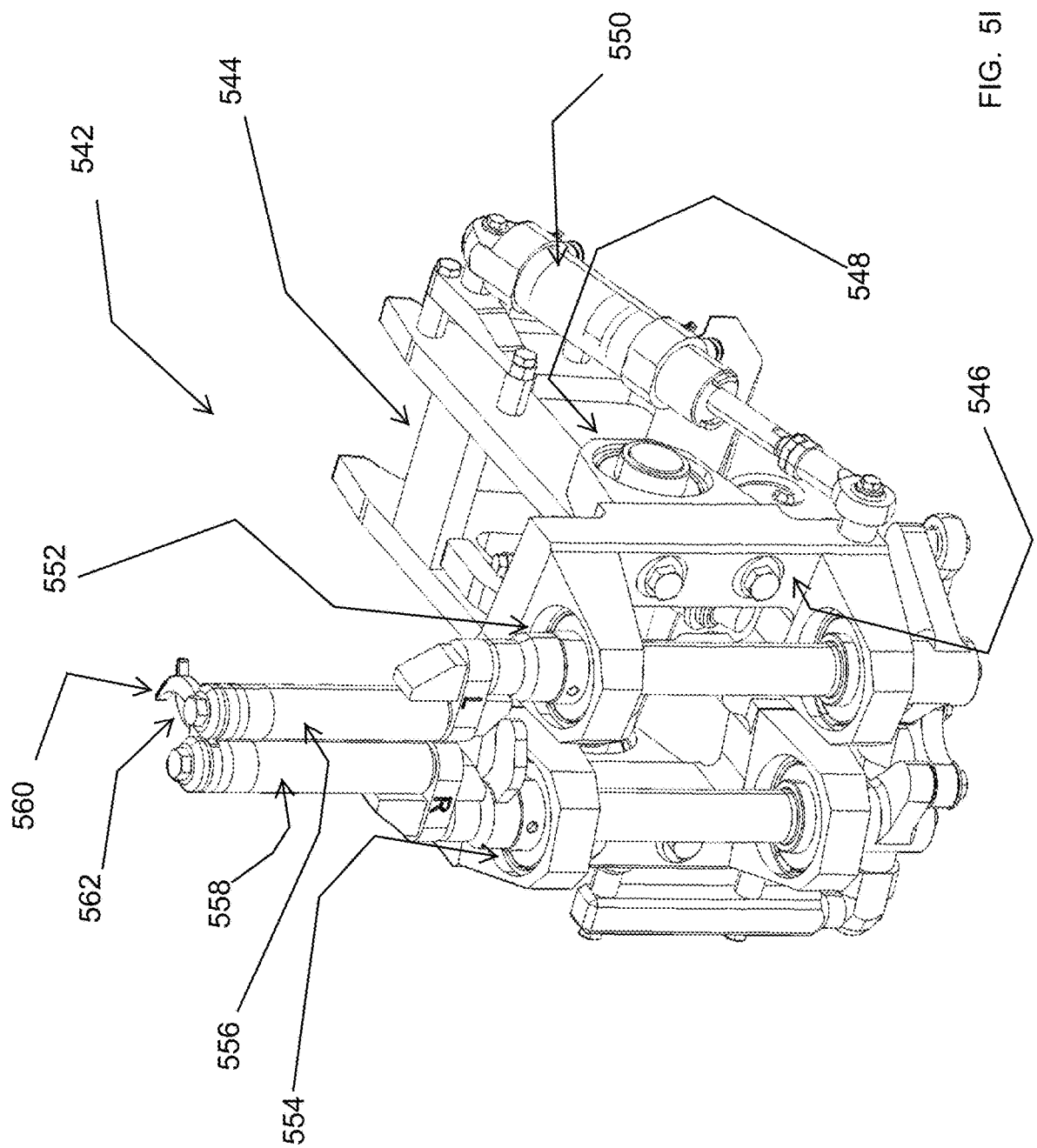

METHOD AND APPARATUS FOR A CARRIAGE AND A CONVEYOR FOR AUTOMATED CUTTING OF MEAT

CROSS REFERENCE TO RELATED APPLICATION

This Application is a Divisional U.S. Utility Patent Application, which claims priority to and the benefit of U.S. application Ser. No. 16/907,012, entitled Method and Apparatus For Conveying A Meat Product and Using An Ultrasonic Knife For Automated Cutting Of Meat, filed Jun. 19, 2020, which claims priority to and the benefit of Ser. No. 16/201,294, filed Nov. 27, 2018, entitled Method and Apparatus For Using Ultrasonic Knife For Automated Cutting Of Meat, which claims priority to and the benefit of U.S. Provisional Patent Application Ser. No. 62/614,175, filed Jan. 5, 2018, entitled Method and Apparatus For Using Ultrasonic Knife For Automated Cutting Of Meat, whereby the contents of both referenced priority applications are incorporated herein by reference in their entirety.

BACKGROUND

Field

The technology as disclosed herein relates generally to food manufacturing and, more particularly, to a system and method for producing a deboned meat cut using an ultrasonic knife and conveyor system, particularly a poultry meat cut.

Background

Separating animal carcasses into various primal cut components is an integral part of the meat processing industry. The primal cuts are then separated into various sub-primal cuts and further into individual meat cuts. Currently in the meat processing industry, it is common for sub-primal cuts, when being further separated into the various individual meat cuts, to be separated manually, whereby operators use hand held powered and unpowered blades to perform the separation. However, there are various apparatus and systems that have been developed to partially or fully automate the separation process. Deboning a whole meat item is also a common practice in the meat manufacturing industry. The meat separation and more particularly the deboning process when performed manually can be very labor intensive and depending on the meat cut can require a significant level of experience in order to debone the meat item efficiently and quickly and without excessive waste.

Deboning a poultry item can be particularly challenging, labor intensive and can require a sufficient level of experience and expertise. By way of illustration, a poultry shoulder cut is made on a poultry item prior to removing deboned breast meat from the carcass. It is a very complex cut such that when the cut is performed manually, it requires an individual to examine the poultry item, place the knife in the right location, make the knife move through the joint along a certain path while manipulating the wing to a certain position to facilitate the cut, and following a ribcage with a particular cutting path. It can be a complex, and a detailed cut that has to be performed on each front portion of each poultry item in order to remove the breast meat.

Robotic and automated systems have been attempted in the industry to perform the poultry shoulder cut to address the problems encountered when performing this cut manually. The systems are generally mechanical and they don't adequately adjust to the size of each individual front half portion of each poultry item that is processed on the production line resulting in a loss in yield or quality. Many of the automated systems require presorting the poultry item by size. Whereas, an operator performing this cut manually will visually observe each item and adjust the cut path as needed based on their prior experience and developed expertise. A method is needed for automated systems to adjust similarly and make the cut on each front so that the boneless breast meat can be harvested more efficiently to produce a higher and more consistent yield and quality. Otherwise, it is cost prohibitive to utilize some of the automated systems currently available.

Various automated systems have been developed with limited success. Automated robotic systems with blade implements have been developed that utilize a standard blade implement at the end of a robotic arm to perform the initial shoulder cut in an attempt to sever tendons around the shoulder joint. The automated system then grabs the wing and pulls the wing and breast meat off the carcass or frame of the poultry item. However, many automated systems have not been effective in completely severing the tendons and other connective tissue surrounding the shoulder joint resulting in the breast meat not pulling cleanly away from the carcass. If the automated system severs the tendons and muscle groups along that joint correctly, then the breast meat pulls cleanly off the frame (poultry carcass) and there are a number of smaller muscle groups that will also pull cleanly away from the carcass with the breast meat if the joint is severed properly. However, given the various sized poultry items, a cutting path that effectuates a proper cut for a given sized poultry item can vary significantly from bird to bird. When using a standard blade, the cutting path can't vary much from the most effective cutting path and still affect a sufficient cut such that the meat can be readily separated from the bones.

A skilled operator can perform this operation by hand because the skilled operator can visually examine the poultry item and through experience and learned skills, the operator can manually maneuver a hand held blade and poultry item to sever the tendons and the joint. However, many automated systems equipped with vision systems for analyzing the construct and size of the poultry have had difficulty reproducing the manual process. When an operator is performing the cut manually, the operator can sense with their hand the resistance against the blade and can visually see the depth of the cut being made. However, many automated systems don't have the ability to replicate the dynamic sensitivity and awareness of the operator and results in the automated system cutting into bone. Further, a standard blade can't afford to be off the mark by much and still be effective. Further, automated systems utilizing a standard blade will necessitate the blade being replaced by a more effective cutting tool or sharpened more regularly in order to be more effective.

Due to the force required to make the cut, it is difficult to regulate the depth of the cut, even for a skilled operator. It is even more difficult for an automated system. An appropriate cut depth must be achieved in order to sever the tendon surrounding the shoulder joint. However, if the cut is too deep, the tool will actually cut into some meat that was not intended or into an area of the bone that was unintended and will actually result in the meat remaining on the frame. If the cut is too deep, the tool will cut into meat that will then stay on the frame. If the cut is properly executed, then the tool only severs the tendons and the breast meat and the smaller muscle group meat will then pull off with the breast meat when pulled off the frame.

Further, for automated cutting systems positioned along a processing line, there is a need for conveyance and product mounting systems to position a product being operated on accurately, securely and consistently in order to maintain uniformity in cuts from item to item being processed along a process line.

A better apparatus and/or method for performing a meat cut is needed for the reasons stated, and more particularly a better method is needed for improving the shoulder cut methodology for a poultry item for subsequent removal of the breast meat with improved yield.

SUMMARY

The technology as disclosed herein includes a method and apparatus for performing a meat cut, particularly a meat cut performed for deboning a meat item, and specifically for performing a shoulder cut as part of the process for deboning a meat product from a poultry item including removing boneless breast meat from the poultry carcass or frame. The method and apparatus disclosed and claimed herein is a combination of a robotic arm including an ultrasonic knife implement and a vision system coupled to a controller or other computing device for varying the cut path based on the shape and size of a meat item, particularly that of the poultry item. The combination as claimed including the ultrasonic knife performs a meat cut with less force and more accurately than the typical penetration that occurs when using a traditional knife. For one implementation of the technology, the meat cut, poultry item, or other item being operated on is mounted on a mounting fixture or jig and platform for holding the position of the item being operated on. For one implementation of the mount/jig and platform, the mount includes a carriage configured to traverse on a track, such that the mount is configured to linearly traverse along the track.

The ultrasonic knife operates smoothly and requires less penetration in order to sever targeted tendons. With less force, the ultrasonic knife is able to excuse itself through the joint areas and will only cut those tendons and muscle groups needed, and actually tends not to trim off bone. Whereas, if a conventional knife is used, then as the knife is penetrating through a particular area, the knife has the tendency to cut through whatever is in its path. However, it takes a lot of force to cut through bone, which is part of the problem with using a traditional knife or blade implement. The ultrasonic knife tends to somewhat excuse itself through the joint area only cutting tendons and muscle groups as opposed to bones. The ultrasonic nature of the blade tends to allow the blade to move more smoothly through a cut and sever an item with less force being applied as compared to a traditional knife. If a traditional blade implement is utilized, more force is required to make the cut whether the cut is being performed with an automated system or being performed manually, therefore, the possibility of cutting muscle groups unintentionally or cutting bone increases. Therefore the work being done by the high frequency low amplitude of the ultrasonic knife and blade is more efficient.

The technology as disclosed and claimed herein uses a combination of controlling a robotic arm with a computer executed algorithm adjusted by inputs from a vision system in combination with the use of an ultrasonic blade in order to implement the cut. The computer executed algorithm controls the path of the robotic arm and ultrasonic knife implement.

A cutting path algorithm with inputs from a vision system creates a cut path. The algorithm and the vision system looks at a poultry front half, revert it in space, reads the size of it and identifies joint placement, and places the ultrasonic knife in the correct and optimal position and creates/defines the correct and optimal cut path around the shoulder joint to sever that breast muscle from the shoulder joint so that the breast meat can be cleanly pulled from the frame. The frequency of the blade can operate in the range of about approximately 18,000 Hz and above. For one implementation of the blade, the bevel of the cutting edges of the blades are from about approximately 15 degrees +/−1 degree to about approximately 70 degrees +/−2 degrees. However, the bevel of the blade can vary beyond this range depending on the meat item being operated on without departing from the scope of the invention. It is the ultrasonic wave and agitation initiated in the meat that cause the meat to sever and not only the sharpness of the edge of the ultrasonic blade.

Sound is often described as a vibration that is transmitted through a medium. Ultrasonic waves are an "inaudible sound," the frequency of which generally exceeds about approximately 18-20 kHz. A 20-kHz frequency means that a certain medium vibrates 20,000 times per second. An ultrasonic cutter vibrates its blade with an amplitude of 10-70 μm in the longitudinal direction. The vibration is microscopic, so it cannot be seen with the human unassisted eye. The movement repeats 18,000-40,000 times per second (18-40 kHz). Because of this movement, the ultrasonic cutter/knife can easily cut food items including meat, resin, rubber, nonwoven cloths, film, composite materials in which various products are superposed. An ultrasonic cutter/knife is composed of a "transducer" that generates vibration and an "oscillator" that drives the transducer. For one implementation, a piezoelectric element is used for the transducer. When voltage is applied, the piezoelectric element displaces the transducer by a few micrometers. Periodically applying voltage generates vibration. Each object has its special frequency, by which the object is stable and easy to vibrate. By adding an external force that corresponds to that special frequency, a small force can obtain a large vibration. This phenomenon is called resonance. In an ultrasonic cutter/knife, the piezoelectric element generates a force that resonates the whole body, from the transducer to the blade tip and/or cutting edge, generating a large vibration at the tip and/or cutting edge. The oscillator periodically generates a voltage to resonate and drive the transducer. Using a component of the ultrasonic cutter/knife called the horn/Sonotrode to wring the cross-sectional area, from the piezoelectric element to the blade tip/blade edge, can obtain a larger vibration.

The vibration of the blade makes the cutting faster because the vibration of the blade also slices the material being cut in addition to the force that is being applied to the blade. If the vibrations are along the correct axis, as in said knife, then they'll do the exact same thing as a standard knife would do when the tip or cutting edge is pushed into a material for cutting, that is applying a force, meaning that the knife does most of the work in cutting because the vibration performs the same work as would be provided by applying a force to a standard cutter/knife blade.

The ultra-sonic generator converts the power supply (100-250 Volts, 50-60 Hz) into a 20 to 30 kHz, 800-1000 Volts electrical signal. This signal is applied to piezo-electrical ceramics (included in the converter) that will convert this signal into mechanical oscillations. These oscillations will be amplified by the booster and converter. The converter converts electricity into high frequency mechanical vibration. The active elements are usually piezo-electrics ceramics. The booster (optional) serves as an amplitude transformer.

The actuator vibrates at an extremely high frequency, making it ultrasonic, and it is these waves of vibration that are transmitted by the horn of the actuator all the way to the blade itself. The vibrations are created at the actuator and are transferred by the horn to a free mass. The free mass vibrates between the blade and the horn of the actuator to transmit the vibrations down the blade. The repetitive impact on the blade by the free mass, creates stress pulses that transmit to the tip/blade edge of the blade and into the item being cut. Ultimately, the repetitive cutting of the blade produces enough strain on the surface of the item being cut to fracture it. The effect of ultrasonic cutting parameters, such as resonant frequency, mode of vibration, blade tip sharpness, cutting force, cutting speed, and blade tip/blade edge amplitude are all factors.

Ultrasonic food cutting technology goes beyond the limits of conventional cutting systems by utilizing a vibrating blade as opposed to a static blade. The vibrations create an almost frictionless cutting surface, providing neater cuts, faster processing, minimal waste, longer blade life and less downtime. The induced oscillation at the cutting edge of the sonotrode with defined vibration amplitude results in faster and more efficient cutting due to less mechanical cutting force needed in comparison to other conventional blade methods or laser cutters and/or water jet cutters. The pressure on the item to be cut can be reduced due to the high number of frequencies per second. This creates a clean cut face. Ultrasound application for cutting enhances the cut surface quality, lowers the energy for cutting and improves the cut exactness. The induced oscillation at the cutting edge of the sonotrode with defined vibration amplitude results in faster and more efficient cutting due to less mechanical cutting force needed in comparison to other conventional methods such as standard blades, laser cutters and water jet cutters. In fact, the vibration reduces the friction resistance at the cutting surface. The ultrasonic knife in combination with the vision system as disclosed and claimed herein provide for an effective method and system.

In contrast, when cutting with standard cutting blades the main aim of the cutting process is to break internal bonds in a material by stressing structural elements; this is achieved by the progressive motion of a mechanical tool having a sharpened cutting edge. The stress within the material to be cut is directly proportional to the applied force, and inversely proportional to the contact area. Cutting starts when the total stress exceeds the internal strength of the cutting material. Food products are predominantly characterized by iso-elastic deformation properties that are associated with the ability toward stress relaxation and creep deformation. These time—dependent effects are responsible for the scattering of deformation energy in the zone where the cutting edge contacts the product, and for the expanding deformation. Therefore, the cutting velocity must exceed the stress relaxation velocity to reach the fracture limit; otherwise, the product will not be cut, but rather squeezed. In addition to the desired separation, there is some displacement of the cutting material while the cutting tool penetrates the item. This displacement is responsible for the special features and characteristics as regards the cutting of foods.

When a standard knife with a defined wedge angle a and a blade thickness d cuts into a semi-solid material, three zones with different deformation characteristics can he distinguished: a separation zone in the immediate vicinity of the cutting edge, a deformation zone along the wedge, and a compression zone along the flank of the blade. In these deformation zones (the individual force components acting on the blade play different roles. Upon contact with the edge of the knife, the product will be pushed down. The stress in the separation zone propagates and increases because of the resistance of the material until the fracture stress is exceeded. The characteristic force component at this stage is the cutting resistance FR which, apart from cohesive forces in the material, is heavily influenced by the sharpness of the tool in the deformation zone, the action of the wedge leads to biaxial (horizontal and vertical) deformation, the magnitude of which depends on wedge angle and blade thickness.

When referring to the deformed or distorted fraction of the material, it is necessary to distinguish between a zone of plastic deformation, located in the close vicinity of the cutting edge, and a zone of elastic deformation, which follows the zone of plastic deformation. Lateral displacement leads to the deformation force $F_w$, which is also responsible for the formation of frictional $F_w$ along the wedge surface. Further displacement of the material causes the generation of lateral compression forces $F_1$ in the compression zone, which becomes important since the relative motion accounts for frictional forces along the tool flanks. $F_1$ increases with blade thickness and is of high relevance when cutting products with high friction coefficients. The properties of the material from which the blade is constructed are, along with lateral forces, responsible for the friction that occurs between the product and the knife along the wedge amid the flank, which is significantly involved in the formation of the plastic deformation zone. For efficient cutting, it is especially the plastic deformation that must be efficiently controlled to protect cutting segments from irreversible damage. It is, therefore, extremely important to keep the wedge angle, the thickness of the blade, and the flank area that is in direct contact with the food as small as possible. Otherwise, the cutting tool must show a sufficient firmness to resist the cutting forces.

Ultrasonic cutting can be distinguished from conventional cutting with a standard blade by the specific motion characteristics of the cutting tool, as the conventional movement of the device is super positioned by ultrasonic vibration. Generally, the sonotrode acts as a mechanical resonator, which vibrates mainly longitudinally along the vibration axis. The sonotrode may even act as the cutting tool which, however, requires maximum amplitudes at the cutting edge, or may act as a coupling unit for an independent cutting blade. To ensure stable performance, the entire vibrating system is tuned to a constant operating frequency. Depending on the mounting of the cutting tool, the sonotrode and on the orientation of the cutting edge relative to the vibration axis, three main configurations may be distinguished: The vibration axis and the moving axis of the cutting tool are identical, but the main vibration axis is perpendicular to the cutting edge. This is, for example, true in a guillotine—type cut where the stress and strain acting on the material due to the macroscopic iced motion is intensified or diminished by a periodical stress with a high frequency (that is. 20-50 kHz) and a low amplitude (in the micrometer range). Stress and strain are mainly exerted in the separation zone where the edge is in contact with the crack tip in the product.

The principle of ultrasonic cutting machine is totally different from that of traditional cutting. It uses the energy of ultrasonic waves to heat and melt the parts of the cut material, so as to achieve the purpose of cutting the material. Therefore, Ultrasonic cutting does not require as sharp of a cutting edge as compared to a traditional blade, nor does it require great pressure, which will not cause the edge breakage and damage of the cutting material. At the same time, because the cutting tool is doing ultrasonic vibration, the friction resistance is very small, the cut material is not easy to stick to the blade. This is especially effective for cutting the viscous and elastic materials, frozen materials, such as food, or objects that are difficult to apply pressure.

One implementation of the technology as disclosed and claimed herein is an automated computer controlled method for performing a cut on a meat item, which includes capturing a three dimensional image of a meat item with a three dimensional vision system coupled to a computer that generates 3-dimensional point cloud data representative of the meat item. The vision system can include one or more digital cameras or three dimensional sensors or three dimensional scanners, such as a laser scanner that is operable to capture a three dimensional digital image of a poultry item or other meat item and transmit the digital image to a computer system for further processing of the data. A point cloud is a set of data points in some coordinate system. In a three-dimensional coordinate system, points are defined by Cartesian or polar coordinates. The point cloud is intended to represent the external three dimensional surface of an object—in this case a poultry item or other meat item. Point clouds may be created by vision systems. The vision system capture an image of the item in question and derives from the captured image and measures a large number of points on an object's surface, and often output a point cloud as a data file to a computing system. The point cloud represents the set of points the device has measured.

One implementation of the technology also includes comparing, with a comparison algorithm processing on a computer, the generated point cloud data with one or more electronically stored point cloud template data sets and selecting the point cloud template data set that most closely matches the generated point cloud data as generated by the vision system and associated computing system. Various point comparison techniques can be utilized for the comparison algorithm processing on the computer system. The point cloud template data sets are various data sets that are statistically representative of the size and shapes of a typical bird being processed. These templates are associated with typical skeletal bone and tendon positions that are typical for a poultry having a particular shape and/or size. Three dimensional data matching is performed comparing the point cloud for the captured image with the various templates. One approach for comparing point clouds that is used by the comparison algorithm is based on local feature descriptors. The point cloud for the captured image is cropped and the cropped data is transformed to a set of distinctive local features each representing a region. The features are characterized with descriptors containing local surface properties for matching with the templates. An iterative closest point methodology is one approach utilized by the comparison algorithm for another implementation. However, various other matching/comparison techniques can be utilized without departing from the scope of the technology as disclosed and claimed herein.

The method includes aligning with a computer the selected point cloud template data set with a cropped version of the generated point cloud data and calculating a three dimensional cut path based on the alignment using statistically representative data for a given size bird, which statically defines the location of the various portion of the anatomy including muscle, joint tendon and bone structures and placement, and said cut path is calculated to have a minimal cutting depth while sufficient to sever the tendons around the shoulder joint. One implementation of the technology includes calculating a cut path and articulating a blade with multiple degrees of freedom while cutting a meat item. One example of a meat item is a poultry item and one example of a cut is a shoulder cut.

One implementation includes articulating the blade with 6 or more degrees of freedom while cutting a meat item. However, fewer degrees of freedom can be implemented with departing from the scope of the technology as disclosed and claimed herein. One implementation can also include controlling an automated robotic arm having an ultrasonic knife implement to cause a blade of the ultrasonic knife implement to traverse along the cut path of the meat item. One specific example of using this methodology is where the meat item is a poultry item and the cut path is a shoulder cut path. One function of the technology is to perform the severing of the tendons around the shoulder joint with the ultrasonic knife as the ultrasonic knife travels along the cut path. A further step of the method can include grasping and pulling the wing of the poultry item and pulling the breast meat off a frame of the poultry item, where the cutting path depth is sufficient to sever the shoulder joint.

For one implementation, a point cloud is a set of data points in space. The point clouds can be produced by a 3D scanner, which measures a large number of points on the external surfaces of objects around them, in this case of the present technology, the object is a meat item being operated on. As the output of 3D scanning processes, point clouds are used for many purposes, including to create 3D CAD models for manufactured parts, for metrology and quality inspection, and for a multitude of visualization, animation, rendering and mass customization applications. In this case, the point cloud scanning process is used for a meat item. The point clouds are aligned with 3D models of the item being operated on, or with other point clouds, a process known as point set registration. In computer vision and pattern recognition (the automated recognition of patterns and regularities in data), point set registration, also known as point matching, is the process of finding a spatial transformation that aligns two point sets. This methodology is utilized to match the point set of the capture image with the point set of the template of the item to be operated on.

The field of pattern recognition is concerned with the automatic discovery of regularities in data through the use of computer algorithms and with the use of these regularities to take actions such as classifying the data into different categories such as categorizing parts of an object such as the shoulder area of a poultry item and from that information determining the likely anatomical structure and location based on statistically representative data. Pattern recognition algorithms are used to provide a reasonable answer for all possible inputs and to perform "most likely" matching of the inputs, taking into account their statistical variation. This is opposed to pattern matching algorithms, which look for exact matches in the input with pre-existing patterns.

Pattern recognition is generally categorized according to the type of learning procedure used to generate the output value. For one implementation of the technology as disclosed and claimed, supervised learning is used, which provides a set of training data (the training set), in this case the point cloud templates of different sized poultry items, consisting of a set of instances that have been properly labeled with the correct output. A learning procedure then generates a model that attempts to meet two sometimes conflicting objectives: Perform as well as possible on the training data, and generalize as well as possible to new data. For one implementation, unsupervised learning can be utilized, which assumes training data that has not been labeled, and attempts to find inherent patterns in the data that can then be used to determine the correct output value for new data instances.

The purpose of finding such a transformation includes merging multiple data sets into a globally consistent model, and mapping a new measurement to a known data set to identify features or to estimate its position. A point set may be raw data from 3D scanning or an array of rangefinders. For use in image processing and feature-based image registration, for one implementation a point set is a set of features obtained by feature extraction from an image, for example corner detection. Point set registration is used in optical character or object recognition, augmented reality and aligning data from magnetic resonance imaging with computer aided tomography scans. In the present case, the technology is utilized to recognize the portions of a poultry item. While point clouds can be directly rendered and inspected, for one implementation, point clouds are converted to polygon mesh or triangle mesh models, surface models, or CAD models through a process commonly referred to as surface reconstruction.

One implementation of the technology disclosed and claimed herein includes capturing a 3D image of a poultry item and converting the image to a point cloud. The point cloud of the converted live image is compared to the one or more of the pre-stored point cloud templates representative of known different sized and shaped poultry items and the closest matching template point cloud is chosen. A cutting path control algorithm is retrieved that corresponds with the closest matching template point cloud. The closest matching template point cloud is then registered with converted live image point cloud, adjustments are made to the matching template point cloud and the cutting path is adjusted accordingly and the cut is performed. There are many techniques for converting a point cloud to a 3D surface. Some approaches, like Delaunay triangulation, alpha shapes, and ball pivoting, build a network of triangles over the existing vertices of the point cloud, while other approaches convert the point cloud into a volumetric distance field and reconstruct the implicit surface so defined through a marching cubes algorithm.

Yet another implementation of the technology as disclosed and claimed herein includes capturing a 3D image of the surface of a poultry item using a 3D Laser Profiler to determine the size of a poultry item and to thereby assign a cut path strategy. There are a number of techniques available for 3D Laser Profiler imaging, including 3D laser profilers that use a laser triangulation technique to deliver high resolution measurements and that use a time of flight technique. In the case of a triangulation technique, the 3D Laser Profiler emits a laser onto an object of interest; and the reflection's position in the sensor's field of view allows the scanner to triangulate the point in space at which the laser hits the object. This is repeated over the surface of the object of interest. Laser scanners are designed for dynamic measurement tasks with high demands on resolution and accuracy. The 3D laser profiler is utilized for automation in a high throughput environment and is particularly useful for demanding surfaces like that of a poultry item. The 3D Laser Profiler determines the size of the poultry item. The size of the poultry item is utilized to identify a typical anatomical structure and corresponding cut path strategy for a poultry item of a given size. Known typical bird sizes having a corresponding typical anatomical bone and muscle structure and orientation based on statistically collected and stored data. A cut path is determined accordingly. Red or Blue laser light scanners are utilized. Blue Laser Technology, offers some advantages in various measurement tasks compared to sensors with a red laser diode. Blue-violet laser light hardly penetrates the measurement object, which can be particularly important with organic materials. Whether using a 3D Point Cloud method or a 3D laser profiler, both interface with a PLC and the front half size of surface is determined and a Z value is returned that directs the cut path and the starting point of the cut.

One implementation of the ultrasonic debone system includes a debone track mount assembly or carriage assembly. The debone track mount assembly or carriage assembly includes a debone mount jig for holding the item being operated on. For one implementation a whole carcass poultry item is mounted on the debone mount jig by inserting the mount through the cavity opening on a bottom front half of a whole carcass poultry item, whereby the debone mount penetrates into the poultry carcass item and stabilizes the position of the poultry item for the deboning operation. The debone track mount and track conveyor is configured to convey the debone track mount adjacent to a cutting station for the cutting operation. For one implementation of the debone mount jig, the mount is cone shaped where the top portion or apex of the cone having a smaller diameter is oriented vertically above the bottom portion having a larger diameter with respect to the top portion. The angle of the conical shape of the mount widens from the top to the bottom where the slope or rate of increase in diameter of the conical shaped from top to bottom allows the top of the mount to be inserted into the thoracic inlet while at the same time the slope of the mount is sufficient to spread the clavicle and position the shoulder joint in a sufficiently stable and constant position to stabilize and ready the poultry item for the cutting process.

The wings of the poultry carcass are extended to straddle over wing supports. The pit of the wings are supported by the top upward facing surface of the wing supports. The top upward facing surface as disclosed and claimed herein has a downward extending angle with respect to horizontal, thereby urging the pit of the wings to rest and be captured in a corner formed by the upward facing surface an and a member extending orthogonally with respect to the upward facing surface. The urging of the wing pit to the corners further stabilizes the poultry item for further operation. The wing supports are spaced away from debone mount in order to extend the wings.

For one implementation of the apparatus, the debone mount jig is mounted on a stand and the wing supports are also mounted to the stand using stand-off mounts, which provide a spacing between wing supports and the stand. The stand is mounted on a carriage, where the carriage is configured to traverse the debone track mount assembly along a track to further position the poultry item during the deboning process.

The features, functions, and advantages that have been discussed can be achieved independently in various implementations or may be combined in yet other implementations further details of which can be seen with reference to the following description and drawings.

These and other advantageous features of the present technology as disclosed will be in part apparent and in part pointed out herein below.

BRIEF DESCRIPTION OF THE DRAWINGS

For a better understanding of the present technology as disclosed, reference may be made to the accompanying drawings in which:

FIGS. 4A through 4M are an illustration of one implementation for the debone track mount;

FIGS. 5E through 5L are an illustration of a breast removal station along the track conveyance system;

FIGS. 6A through 6I illustrate a combination linear and magnetic carriage track conveyor system;

FIGS. 7A through 7I illustrate the breast removal line; and

Figure 1A:
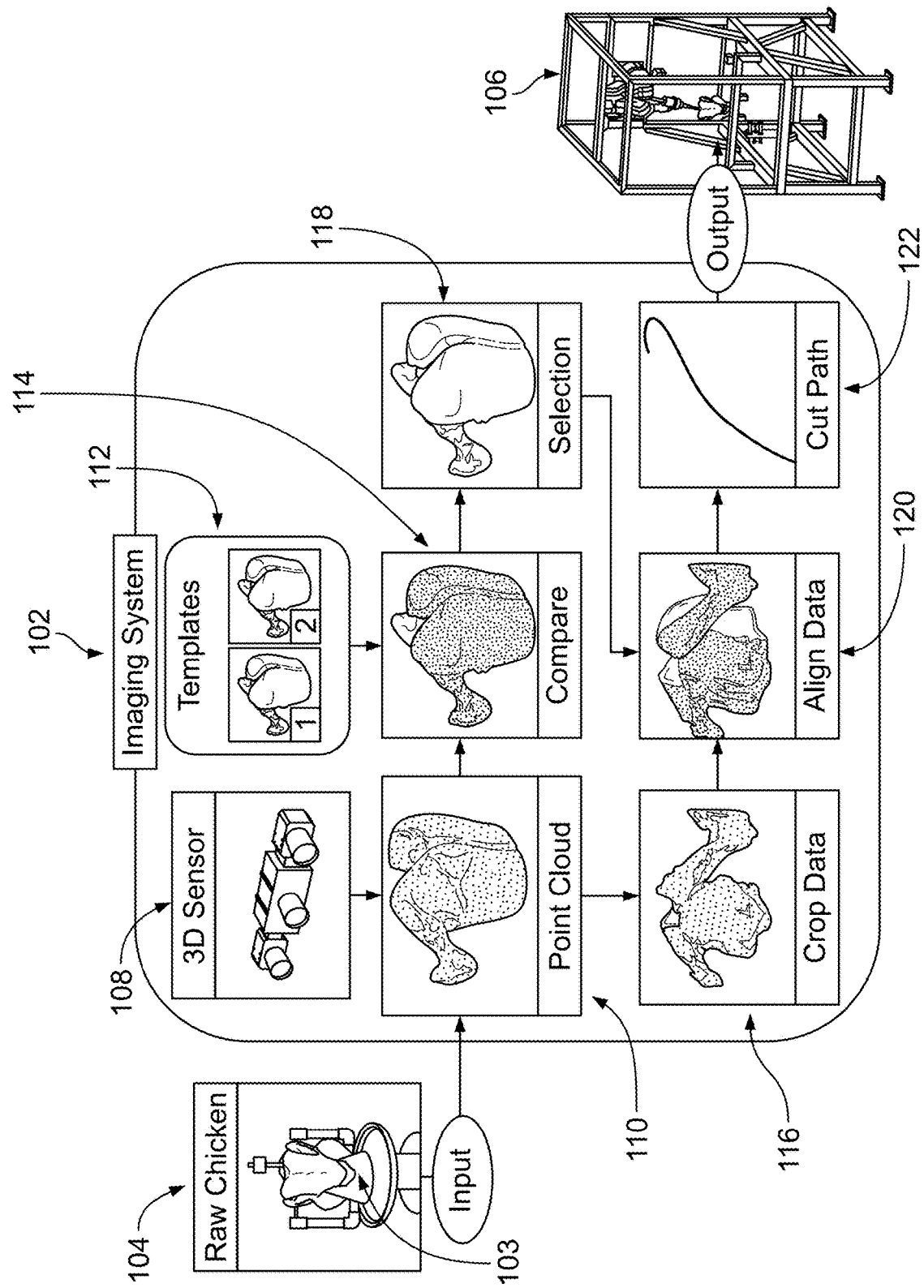
FIGS. 1A and 1B are illustrating a computer based imaging system for generating point cloud data.

While the technology as disclosed is susceptible to various modifications and alternative forms, specific implementations thereof are shown by way of example in the drawings and will herein be described in detail. It should be understood, however, that the drawings and detailed description presented herein are not intended to limit the disclosure to the particular implementations as disclosed, but on the contrary, the intention is to cover all modifications, equivalents, and alternatives falling within the scope of the present technology as disclosed and as defined by the appended claims.

DESCRIPTION

According to the implementation(s) of the present technology as disclosed, various views are illustrated in FIGS. 1-8 and like reference numerals are being used consistently throughout to refer to like and corresponding parts of the technology for all of the various views and figures of the drawing. Also, please note that the first digit(s) of the reference number for a given item or part of the technology should correspond to the Fig. number in which the item or part is first identified.

One implementation of the present technology as disclosed comprises a computer controlled robotic arm with an ultrasonic knife implement, which teaches an apparatus and method for performing a cut path for processing a deboned meat cut, particularly a poultry cut.

Figure 1B:
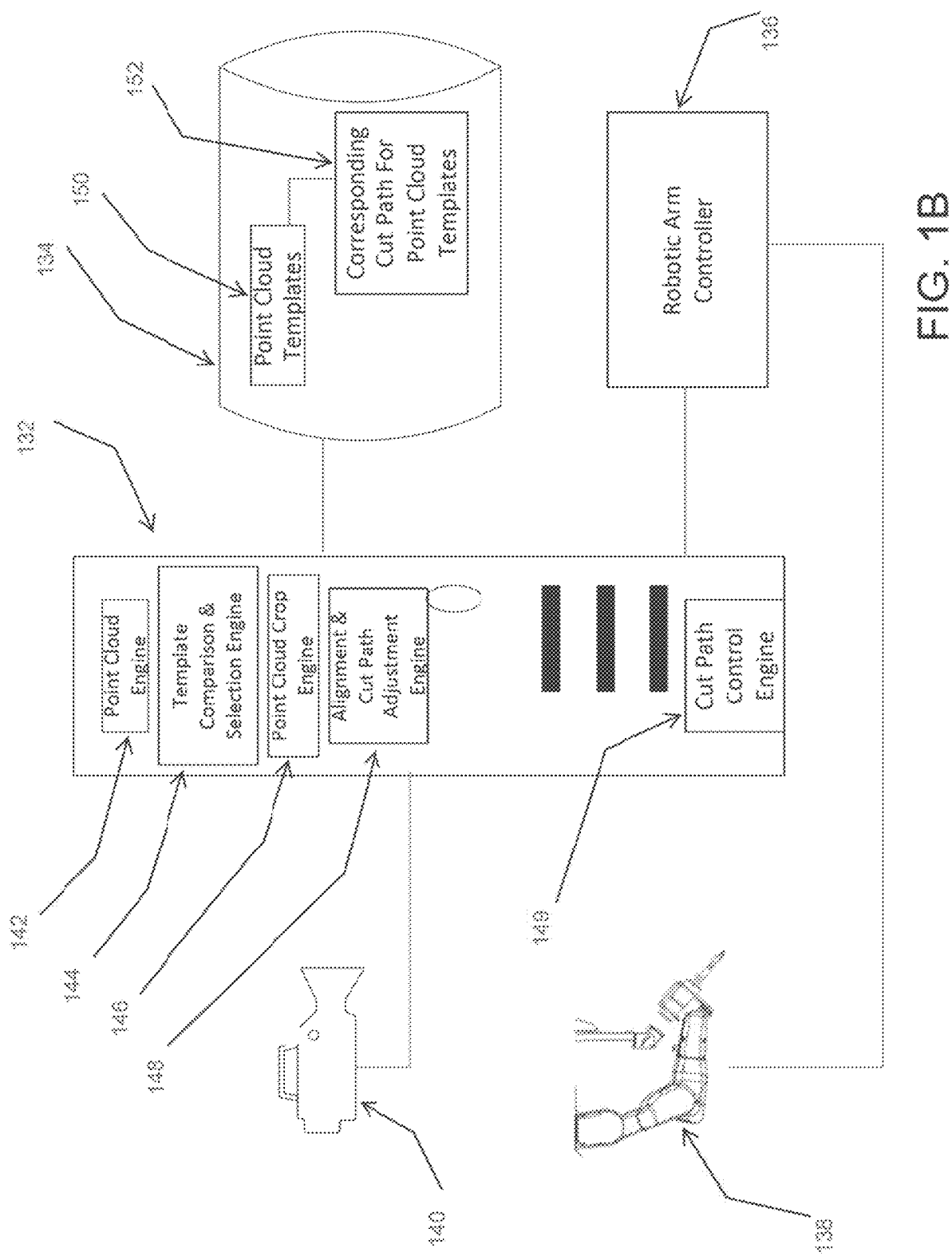

The details of the technology as disclosed and various implementations can be better understood by referring to the figures of the drawing. Referring to FIGS. 1A and 1B, one implementation of the technology is disclosed, which includes an automated computer controlled method for performing a meat cut, which includes capturing a three dimensional image of a meat item with a three dimensional imaging system 102, including a vision system 108 coupled to a computer that generates point cloud data 110 representative of a meat item 104. The vision system 102 includes one or more digital cameras or three dimensional sensors or three dimensional scanners 108, such as a laser scanner, that is operable to capture a three dimensional digital image of a poultry item 104 (or other meat item) positioned on a mounting stand 103 that is placed within the field of view of the vision system 108 or other meat item and the vision system transmits the digital image to the computer system for further processing of the data.

The image that is captured is converted to a point cloud data set representative of the captured image. The point cloud data has a resolution or point density and spacing between points sufficient to resolve the size of a poultry item and correlate to the statistically representative anatomical structure. The computing system is coupled to an ultrasonic knife assembly 106 that performs the cut. A point cloud is a set of data points in some coordinate system. In a three-dimensional coordinate system, the data points are defined by Cartesian coordinates or polar coordinates. The point cloud is intended to represent the external three dimensional surface of an object—in this case a poultry item or other meat item. Point clouds may be created from scans provided by 3D scanners 108 or cameras having sufficient resolution. For one implementation the cameras/scanners have a 1080× 1080 resolution or better. These scanners/cameras capture a sufficient high resolution image from which the system can measure a large number of points on an object's surface, and output a point cloud as a data file 110 to a computing system. The point cloud data 110 represents the set of points derived from the image that the sensor 108 has captured and measured.

One implementation of the technology also includes comparing 114 the point cloud computer generated data 110 with one or more point cloud template data sets 112 and selecting 118 the point cloud template data set that most closely matches the generated point cloud data. One or more point comparison techniques are utilized. The point cloud template data sets 112 are various data sets that are statistically representative of the size and shapes of a typical bird being process. These templates are associated with typical skeletal bone and tendon positions that are typical for a poultry having a particular shape and/or size. Three dimensional data matching 114 is performed comparing the point cloud for the captured image with the various templates. One approach for comparing point clouds is based on local feature descriptors. The point cloud for the captured image can be cropped and the cropped data can be transformed to a set of distinctive local features each representing a region. The features are characterized with descriptors containing local surface properties for matching with the templates. For one implementation of the technology, an iterative closest point methodology can then be utilized. However, for other implementations various other matching techniques can be utilized.

For one implementation, the method includes aligning 120 with the computer the selected point cloud template data set 118 with a cropped version 116 of the generated point cloud data and calculating a three dimensional cut path 122 based on the alignment 120 and said cut path 122 is calculated to have a minimal cutting depth while having a sufficient cutting depth to sever the tendons around the shoulder joint.

One implementation of the technology is an automated computer controlled system 132 for performing a meat cut, which includes a three dimensional vision system 140 coupled to a computer 132, where said vision system and computer captures a three dimensional image of a meat item where the computer generates point cloud data with a point cloud engine 142 processing at the computer. The point cloud data is representative of the captured three dimensional image of the meat item. One implementation of the technology includes a database 134 having stored thereon one or more retrievable point cloud template data sets 150 and separate cut path control data 152 corresponding to each of one or more point cloud template data sets. The control data can be interpreted by the computing system to control the cut path of the blade. A selection engine 144 is processing at the computer and comparing the generated point cloud data, with one or more point cloud template data sets 150 stored in the database 134 and selecting the best matching point cloud template data set that most closely matches the generated point cloud data.

One implementation of the technology includes a cropping function 146 executing at the computer to thereby crop the point cloud data, thereby providing a cropped version of the point cloud data and said computer having stored thereon said cropped version of the point cloud data. An alignment and cut path adjustment engine 148 is processing at the computer to thereby align the selected point cloud template data set with the cropped version of the generated point cloud data thereby defining alignment adjustments and retrieving the cut path control data that corresponds to the selected best matching point cloud template. A cut path control engine processing at the computer, thereby calculates or maps a final cut path from the retrieved cut path corresponding to the selected best matching point cloud template based on the defined alignment adjustments. The cut path control engine 149 thereby controls and articulates a control arm 138 of a blade of an ultrasonic knife along the calculated or mapped final cut path with multiple degrees of freedom while cutting a meat item, where articulating along a final cut path includes vibrating the blade at an ultrasonic frequency. A robotic arm controller 136 controls the ultrasonic knife implement to cause a blade of the ultrasonic knife implement to vibrate at an ultrasonic frequency. For one implementation of the technology, the one or more point cloud template data sets 150 stored in a database 134 is representative of a poultry item and the cut path control data is for a shoulder cut path. The ultrasonic knife is positioned at a series of positions along the cut path to perform the cut as controlled by the computing system. Once the cut is performed, a grasping implement grasps and pulls the wing of the poultry item and pulls the breast meat off a frame of the poultry item.

Figure 1C:
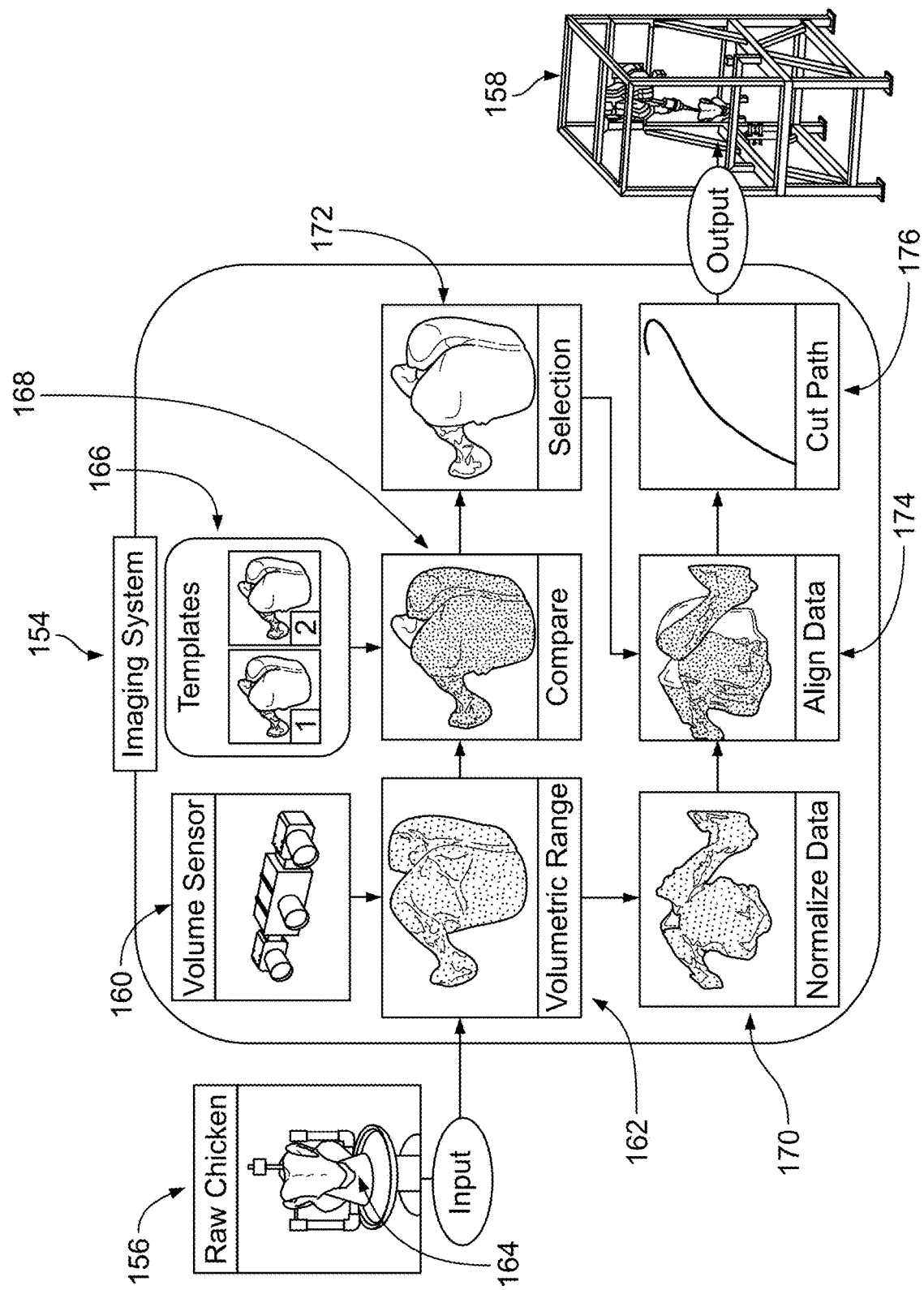
FIGS. 1C and 1D are illustrating a computer based imaging system for generating volumetric range data.
Figure 1D:
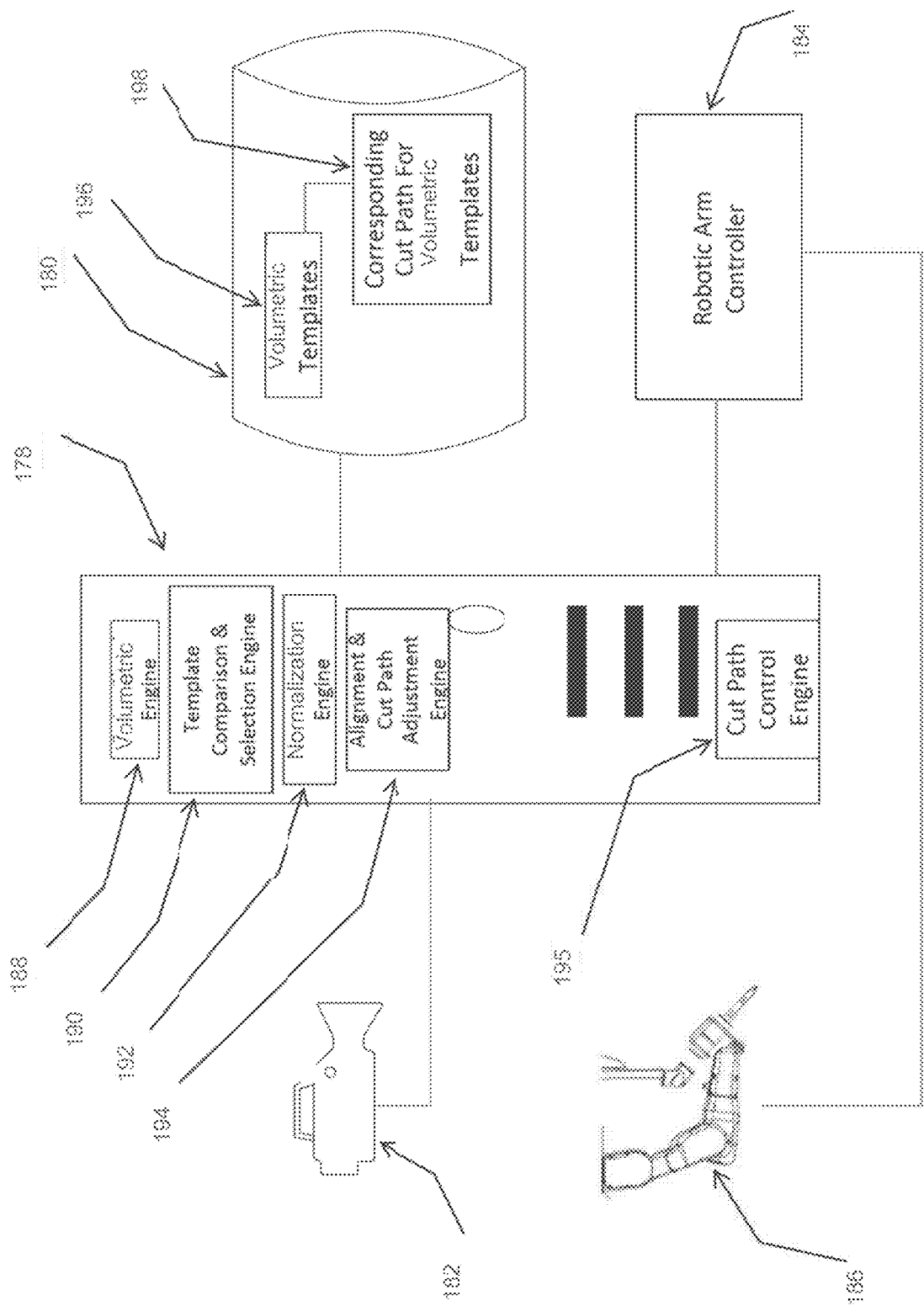

Referring to FIGS. 1C and 1D, an illustration of a computer based imaging system for generating volumetric range data is provided. One implementation of the technology is disclosed, which includes an automated computer controlled method for performing a meat cut, which includes capturing a three dimensional image of a meat item with a three dimensional imaging system 154, including a vision system 160 coupled to a computer that determines a volumetric range representative of a meat item 156. The vision system 160 includes one or more digital cameras or three dimensional sensors or three dimensional scanners, such as a laser scanner, that is operable to capture a three dimensional digital image of a poultry item 156 (or other meat item) positioned on a mounting stand 164 that is placed within the field of view of the vision system 160 or other meat item and the vision system transmits the digital image to the computer system for further processing of the data. The image is captured and from the image, a volumetric range is determined representative of the captured image that correlates to estimate volumetric range of the item being scanned. The image data has a resolution or point density and spacing between points sufficient to resolve the size of a poultry item and correlate to a volumetric range and the statistically representative anatomical structure. The volumetric range is correlated to a statistically representative anatomical structure of a poultry item, which is used to determine the depth of the poultry item from the shoulder joint to the outer contours of the breast area (z-offset) so that the depth of the cut path is determined. The computing system is coupled to an ultrasonic knife assembly 158 that performs the cut. A volumetric range is the volume range within which it is determined that the volume of the item being scanned falls. In a three-dimensional coordinate system, the data points are defined by Cartesian coordinates or polar coordinates. The scanned data is intended to represent the external three dimensional surface of an object—in this case a poultry item or other meat item. A volumetric range is determined based on the data. For one implementation the cameras/scanners have a 1080×1080 resolution or better. These scanners/cameras capture a sufficient high resolution image from which the system can measure a volumetric range 162.

One implementation of the technology also includes comparing 168 the determined volumetric range with one or more template volume ranges 166 and selecting 172 the volume range template data set that most closely matches the determined volume range. One or more comparison techniques are utilized. The volumetric range template data sets 166 are various data sets that are statistically representative of the volume range—size and shapes of a typical bird being process. These templates are associated with typical skeletal bone and tendon positions that are typical for a poultry having a particular shape and/or size. Three dimensional data matching 168 is performed by comparing the determined volumetric range for the captured image with the various volume range templates. The volumetric range template selected for the captured image can be normalized 170 and aligned.

For one implementation, the method includes aligning 174 with the computer the selected volumetric range data set 172 with a volumetric range captured by the image data and retrieving a three dimensional cut path 176 based on and corresponding with the selected 172 volumetric range.

One implementation of the technology is an automated computer controlled system 178 for performing a meat cut, which includes a three dimensional vision system 182 coupled to a computer 178, where said vision system and computer captures a three dimensional image of a meat item where the computer generates volumetric range data with a volumetric engine 188 processing at the computer. The volumetric range data is representative of the captured three dimensional image of the meat item and the volume of the item. One implementation of the technology includes a database 180 having stored thereon one or more retrievable volumetric range template data sets 196 and separate cut path control data 198 corresponding to each of one or more volumetric range template data sets. The control data for a cut path can be interpreted by the computing system to control the cut path of the blade. A selection engine 190 is processing at the computer and comparing the volumetric range image data, with one or more volumetric range template data sets 196 stored in the database 180 and selecting the best matching volumetric range template data set that most closely matches the generated volumetric range data from the captured image.

One implementation of the technology includes a normalization function 192 executing at the computer to thereby normalize the volumetric range data, thereby providing a normalized version of the volumetric data and said computer having stored thereon said normalized version of the point cloud data. An alignment and cut path adjustment engine 194 is processing at the computer to thereby align the selected volumetric range template data set with the normalized version of the volumetric range data thereby defining alignment adjustments and retrieving the cut path control data that corresponds to the selected best matching volumetric range template. A cut path control engine 195 processing at the computer, thereby calculates a final cut path from the retrieved cut path corresponding to the selected best matching volumetric range template based on the defined alignment adjustments.

The cut path control engine 195 thereby controls and articulates a control arm 186 of a blade of an ultrasonic knife along the calculated final cut path with multiple degrees of freedom while cutting a meat item, where articulating along a final cut path includes vibrating the blade at an ultrasonic frequency. A robotic arm controller 184 controls the ultrasonic knife implement to cause a blade of the ultrasonic knife implement to vibrate at an ultrasonic frequency. For one implementation of the technology, the one or more volumetric range template data sets 196 stored in a database 180 is representative of a poultry item and the cut path control data is for a shoulder cut path. The ultrasonic knife is positioned at a series of positions along the cut path to perform the cut as controlled by the computing system. Once the cut is performed, a grasping implement grasps and pulls the wing of the poultry item and pulls the breast meat off a frame of the poultry item.

Yet another implementation of the vision system technology as disclosed and claimed herein includes capturing a 3D image of the surface of a poultry item using a 3D Laser Profiler to determine the size of a poultry item and to thereby assign a cut path strategy. There are a number of techniques available for 3D Laser Profiler imaging, including 3D laser profilers that use a laser triangulation technique to deliver high resolution measurements and that use a time of flight technique. In the case of a triangulation technique, the 3D Laser Profiler emits a laser onto an object of interest; and the reflection's position in the sensor's field of view allows the scanner to triangulate the point in space at which the laser hits the object. This is repeated over the surface of the object of interest. Laser scanners are designed for dynamic measurement tasks with high demands on resolution and accuracy. The 3D laser profiler is utilized for automation in a high throughput environment and is particularly useful for demanding surfaces like that of a poultry item. The 3D Laser Profiler determines the size of the poultry item. The size of the poultry item is utilized to identify a typical anatomical structure and corresponding cut path strategy for a poultry item of a given size. Known typical bird sizes having a corresponding typical anatomical bone and muscle structure and orientation based on statistically collected and stored data. A cut path is determined accordingly. Red or Blue laser light scanners are utilized. Blue Laser Technology, offers some advantages in various measurement tasks compared to sensors with a red laser diode. Blue-violet laser light hardly penetrates the measurement object, which can be particularly important with organic materials. Whether using a 3D Point Cloud method or a 3D laser profiler, both interface with a PLC and the front half size of surface is determined and a Z value is returned that directs the cut path and the starting point of the cut.

Figure 2:
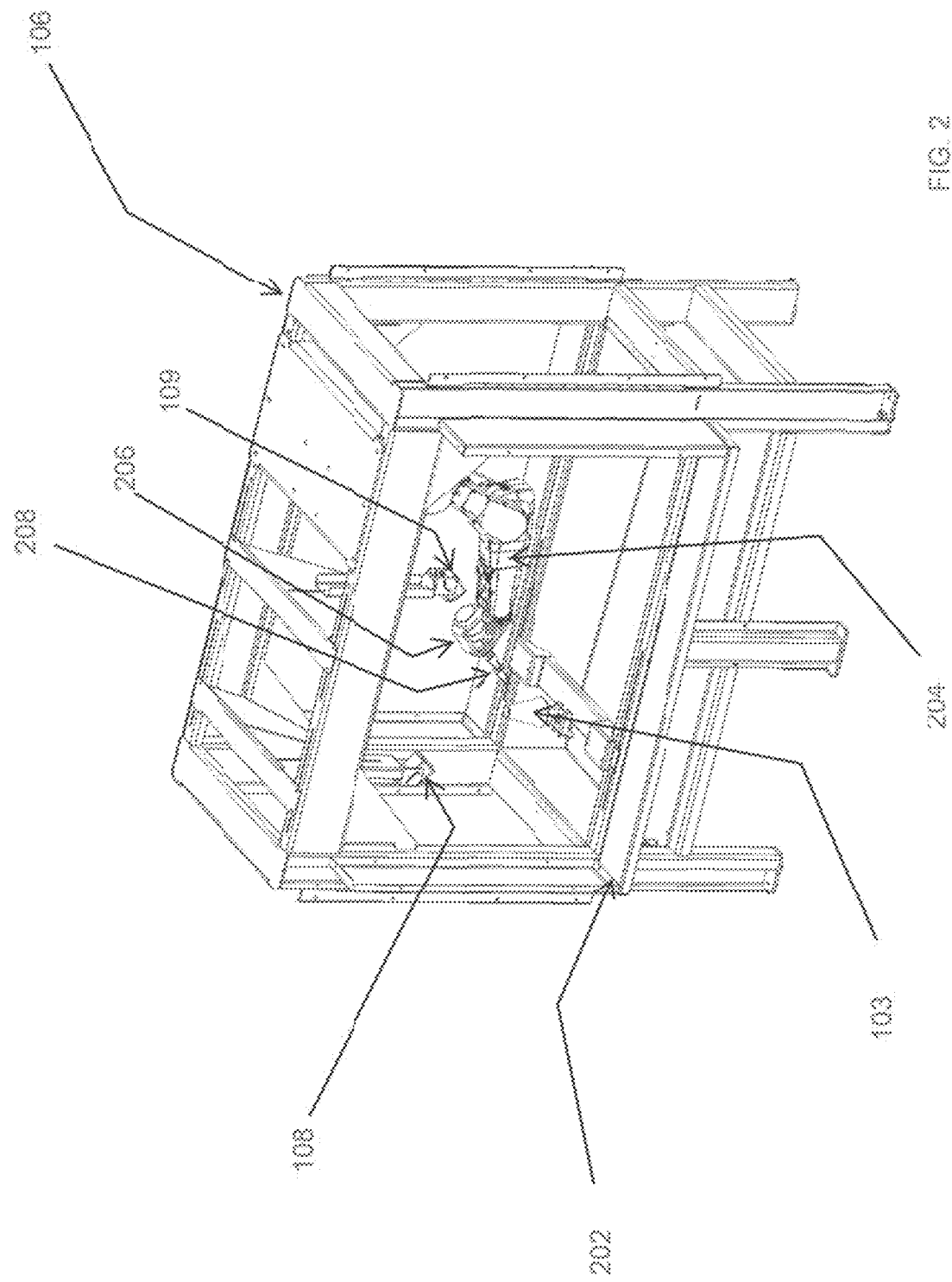
FIG. 2 is an illustration of an apparatus configured with an ultrasonic knife attached to a robotic arm mounted on a frame.
Figure 3A:
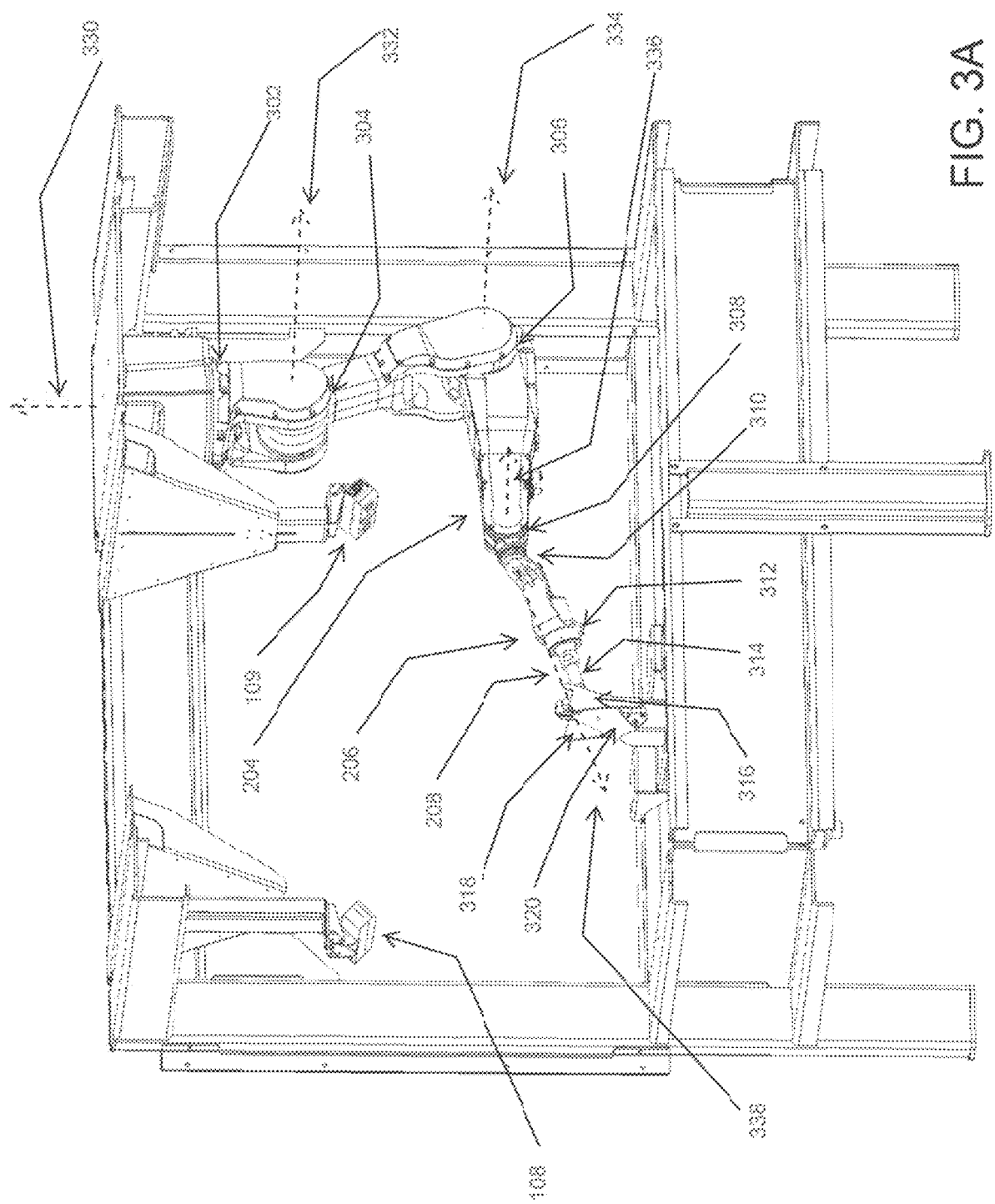
FIGS. 3A through 3C are illustrating an apparatus configured with an ultrasonic knife attached to a robotic arm mounted on a frame with portions of the frame redacted from the view for clarity.
Figure 3B:
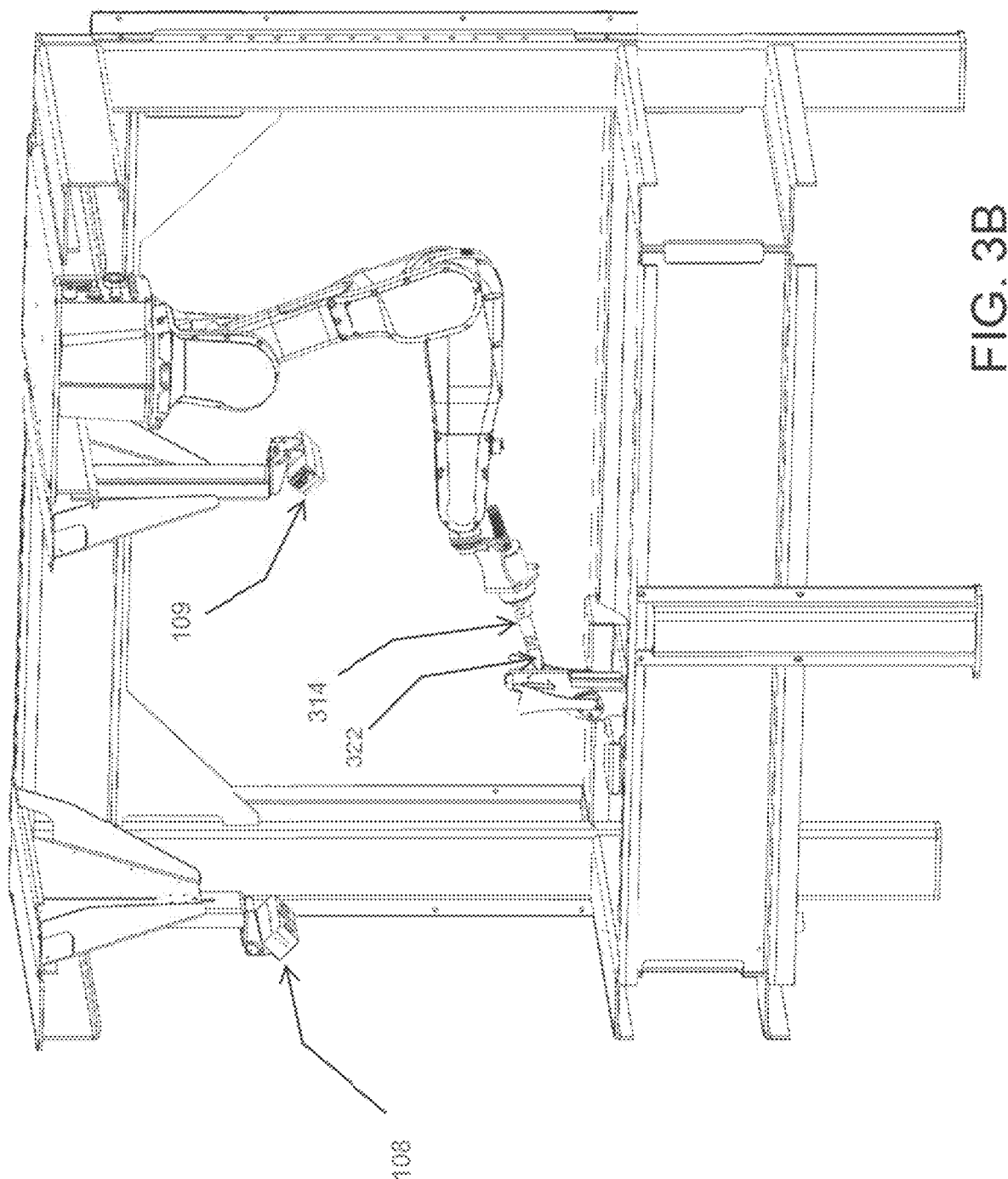
Figure 3C:
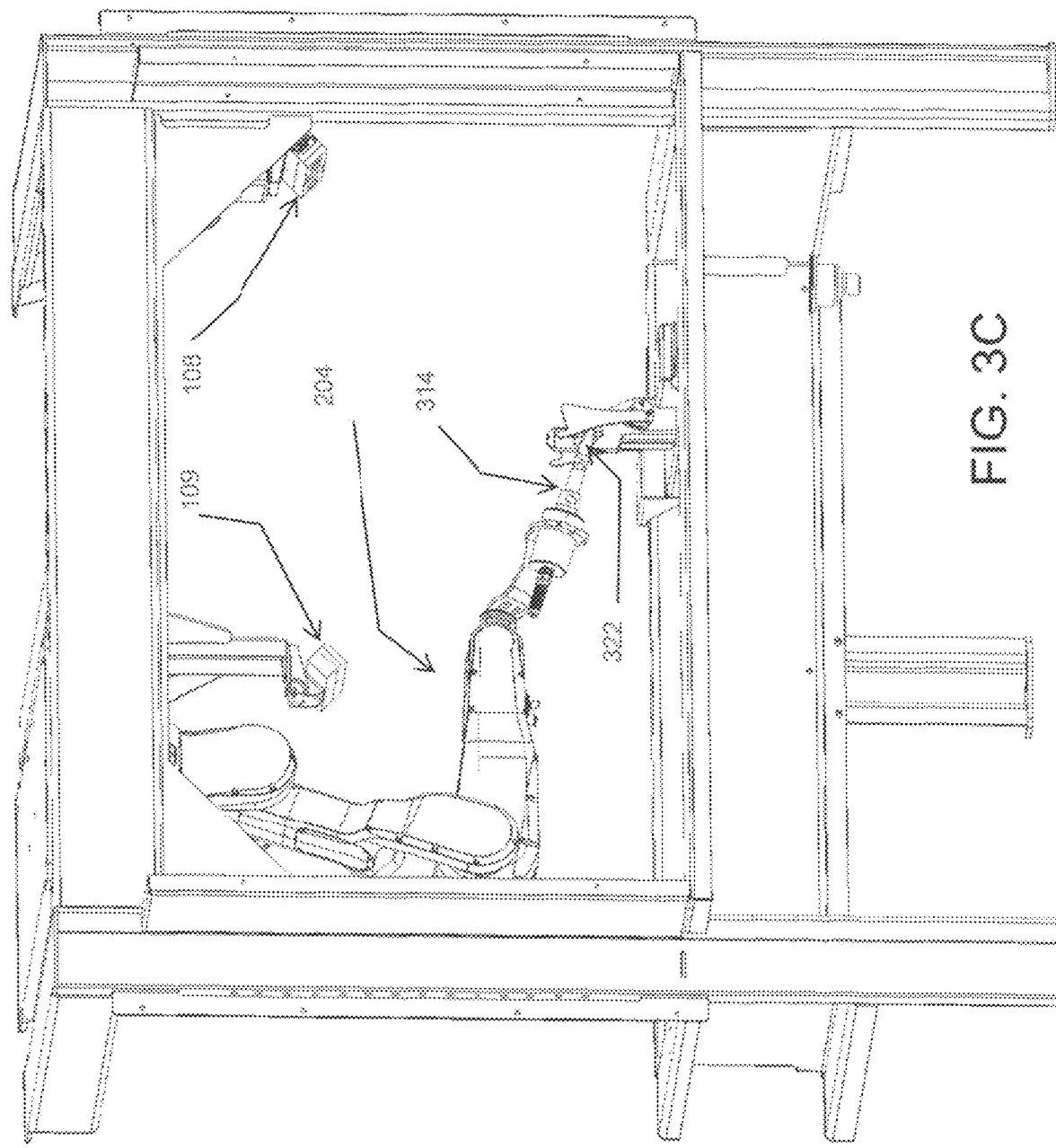
Figure 3D:
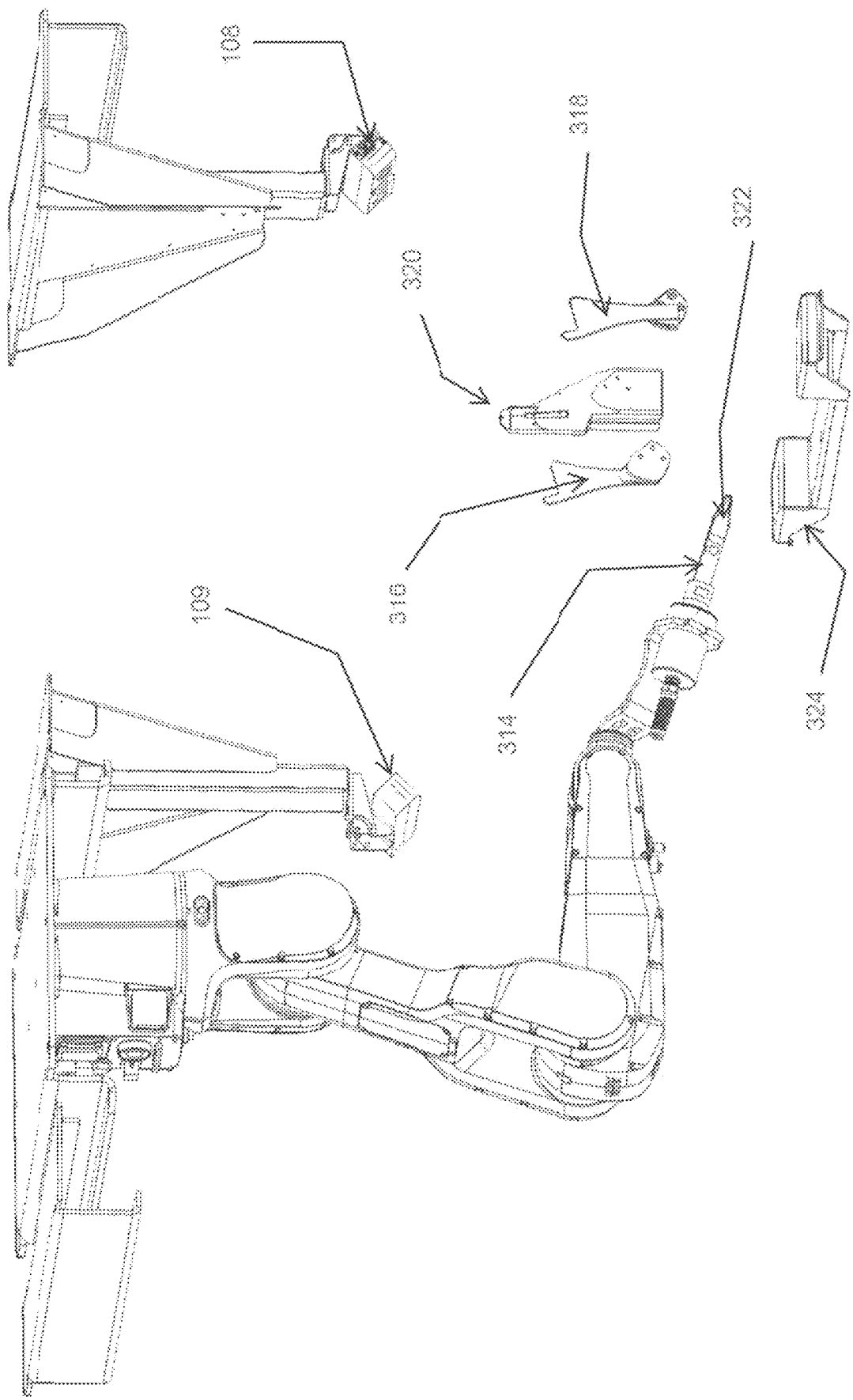
FIG. 3D is an illustration of an apparatus configured with an ultrasonic knife attached to a robotic arm mounted on a frame with portions of the frame redacted from the view for clarity and illustrating an exploded view of the product mount for clarity.

Referring to FIG. 2, one implementation of the technology as disclosed and claimed herein includes controlling with a computing system an automated robotic arm 204 having an ultrasonic knife implement 206 to cause a blade 208 of the ultrasonic knife implement to traverse along the cut path of the meat item. One specific example of using this methodology is where the meat item is a poultry item and the cut path is a shoulder cut path. One function of the technology is to perform the severing of the tendons around the shoulder joint with the ultrasonic knife as the ultrasonic knife travels along the cut path. A further step of the method can include grasping and pulling the wing of the poultry item and pulling the breast meat off a frame of the poultry item, where the cutting path depth is sufficient to sever the shoulder joint. The apparatus includes an ultrasonic knife assembly and frame 106.

Referring to FIGS. 3A through 3D, an illustration of the ultrasonic knife is shown mounted to a robotic arm within an overall assembly frame. The overall assembly frame shows an implementation that includes a vision system including two three dimensional scanners/cameras 108 and 109. FIGS. 3A through 3D further illustrate a robotic arm 204 and an ultrasonic knife assembly 206 and 208. The robotic arm 204 is mounted to a frame assembly and the robotic arm 204 includes a main rotation hub 302 that provides rotation about a substantially vertical axis 330 of the arm portion extending beyond the rotation hub. The direction or path of rotation lies in a substantially horizontally oriented plane. The robotic arm has a shoulder joint 304 that allows the portion of the arm extending beyond the shoulder joint to pivot and rotate about axis 332. The direction or path of rotation lies in a substantially vertically oriented plane. The robotic arm has an elbow joint 306 that allows the portion of the arm extending beyond the elbow joint to pivot and rotate about axis 334. The direction or path of rotation lies in a substantially vertically oriented plane. The direction or path of rotation lies in a substantially vertically oriented plane. The robotic arm has a wrist joint 308 that allows the portion of the arm extending beyond the wrist joint to pivot and rotate about axis 336. The direction or path of rotation lies in a substantially vertically oriented plane. The rotation arm also has an end joint 310, which allows the end portion of the arm to rotate about the axis 338. The knife assembly 312 and 314 illustrate an ultrasonic knife assembly. The meat item to be cut, for an example a poultry item, is mounted on the mounting cone 320. The platform 324 for accommodating the item to be operated on can include opposing outside wing spreaders 316 and 318. The blade is illustrated by item 322.

An ultrasonic cutter vibrates its blade with amplitudes of 10-70 μm in the longitudinal direction. The vibration is microscopic, so it cannot be seen. The movement repeats 18,000-40,000 times per second (18-40 kHz). An ultrasonic knife includes a "transducer" that generates vibration and an "oscillator" that drives the transducer. A piezoelectric element is used for the transducer. When voltage is applied, the piezoelectric element displaces the transducer by a few micrometers. Periodically applying voltage generates vibration. Each object has its special frequency, by which the object is stable and easy to vibrate. By adding an external force that corresponds to that special frequency, a small force can obtain a large vibration. This phenomenon is called resonance. In an ultrasonic cutter, the piezoelectric element generates a force that resonates the whole body, from the transducer to the blade tip and/or cutting edge of the blade 322, generating a large vibration at the tip and/or cutting edge. The oscillator periodically generates voltage to resonate and drive the transducer. Using a component of the ultrasonic cutter called the horn/Sonotrode to wring the cross-sectional area, from the piezoelectric element to the blade tip, can obtain a larger vibration.

The vibration of the blade 322 makes the cutting faster because the vibration of the blade also slices the material being cut in addition to the force that you're applying to the blade. If the vibrations are along the correct axis, as in said knife, then they'll do the exact same thing as a standard knife would do when pushed into a material for cutting, that is applying a force, meaning that the knife does most of the work in cutting because the vibration performs the same work as would be provided by applying a force to a standard blade.

The ultra-sonic generator converts the power supply (100-250 Volts, 50-60 Hz) into a 20 to 30 kHz, 800-1000 Volts electrical signal. This signal is applied to piezo-electrical ceramics (included in the converter) that will convert this signal into mechanical oscillations. These oscillations will be amplified by the booster and converter. The converter converts electricity into high frequency mechanical vibration. The active elements are usually piezo-electrics ceramics. The booster (optional) serves as an amplitude transformer.

The actuator vibrates at an extremely high frequency, making it ultrasonic, and it is these waves of vibration that are transmitted by the horn of the actuator all the way to the blade itself. The vibrations are created at the actuator and are transferred by the horn to a free mass. The free mass vibrates between the blade and the horn of the actuator to transmit the vibrations down the blade. The repetitive impact on the blade by the free mass, creates stress pulses that transmit to the tip/blade edge of the blade and into the item being cut. Ultimately, the repetitive cutting of the blade produces enough strain on the surface of the item being cut to fracture it. The effect of ultrasonic cutting parameters, such as resonant frequency, mode of vibration, blade tip sharpness, cutting force, cutting speed, and blade tip/blade edge amplitude are all factors.

Ultrasonic food cutting technology goes beyond the limits of conventional cutting systems by utilizing a vibrating blade as opposed to a static blade. The vibrations create an almost frictionless cutting surface, providing neater cuts, faster processing, minimal waste, longer blade life and less downtime. The induced oscillation at the cutting edge of the sonotrode with defined vibration amplitude results in faster and more efficient cutting due to less mechanical cutting force needed in comparison to other conventional blade methods or laser cutters and/or water jet cutters. The pressure on the item to be cut can be reduced due to the high number of frequencies per second. This creates a clean cut face. Ultrasound application for cutting enhances the cut surface quality, lowers the energy for cutting and improves the cut exactness. The induced oscillation at the cutting edge of the sonotrode with defined vibration amplitude results in faster and more efficient cutting due to less mechanical cutting force needed in comparison to other conventional methods such as laser cutters and water jet cutters. In fact, the vibration reduces the friction resistance at the cutting surface.

Referring to FIGS. 4A through 4M, an illustration of one implementation for the debone track mount assembly 400 is provided. The debone track mount assembly includes a debone mount jig 402 for holding the item being operated on. For one implementation a whole carcass poultry item is mounted on the debone mount jig 402 by inserting the mount 402 through the cavity opening on a bottom front half of a whole carcass poultry item, whereby the debone mount penetrates into the poultry carcass item and stabilizes the position of the poultry item for the deboning operation. For one implementation of the debone mount jig 402, the mount is cone shaped where the top portion or apex of the cone having a smaller diameter is oriented vertically above the bottom portion having a larger diameter with respect to the top portion. The angle of the conical shape of the mount widens from the top to the bottom where the slope or rate of increase in diameter of the conical shaped from top to bottom allows the top of the mount to be inserted into the thoracic inlet while at the same time the slope of the mount is sufficient to spread the clavicle and position the shoulder joint in a sufficiently stable and constant position to stabilize and ready the poultry item for the cutting process.

The wings of the poultry carcass are extended to straddle over wing supports 404 and 406. The pit of the wings are supported by the top upward facing surface 412 of the wing supports. The top upward facing surface as illustrated by item 412 of the wing supports 404 and 406, has a downward extending angle with respect to horizontal, thereby urging the pit of the wings to rest and be captured in a corner, illustrated by item numbers 408 and 410 formed by the upward facing surface an and a member, as illustrated by item 414 extending orthogonally with respect to the upward facing surface. The urging of the wing pit to the corners 410 and 408 further stabilizes the poultry item for further operation. The wing supports 404 and 406 are spaced away from debone mount 402 with spacer 450 and 452 in order to extend the wings.

For one implementation of the apparatus, the debone mount jig 402 is mounted on a stand 420 and the wing supports 404 and 406 are also mounted to the stand 420 using stand-off mounts 450 and 452, which provides a spacing between wing supports and the stand 420. The stand is mounted on a carriage 422, where the carriage 422 is configured to traverse the debone track mount along a track to further position the poultry item during the deboning process. For one implementation of the debone track mount, the track mount tracks along a substantially horizontally extended track 414. The debone mount has extending therefrom a track wheel 418, which tracks along the guide track 414 in a track groove 416. For one implementation, the carriage 422, includes four wheels to support the carriage and facilitate the carriage traversing with the stand 420 along a track as illustrated by 414. Two of the wheels are grooved wheels, 426 and 454, where the grooved wheels 426 and 454 include a groove between the outside flanges of the wheels and the groove extends around its circumference, where the circumferential groove is configured for receiving a monorail track 427. The interface between the circumferential groove of the grooved wheels and the monorail is configured to resist side-to-side lateral movement of the carriage. The opposing side wheels of the carriage 424, as illustrated by items 424 and 425, ride along traversing on top of a side ledge 403.

The overall carriage 427, with stand 420 and debone mount jig 402 mounted thereon, is urged to travers back and forth along the track 414 such that the operation performed on the item mounted thereon is facilitated. The carriage is urged to traverse using a magnetic interface. The magnetic interface is between a series of items 442 being conveyed back and forth with an endless chain conveyor and at least a portion of the underside of the carriage. For one implementation, at least a portion of the underside of the carriage is constructed of a magnet. The series of items 442 are constructed of a ferrous material that is attracted to a magnet such that when the dual side by side endless chain conveyors convey items 442 back and forth, the magnetic interface causes the carriage, the stand and the debone mount and track wheel 418 to traverse back and forth along the track 414. Axles 430 and 432 for the conveyor can be powered to cause conveyance of items 442. For one implementation, the endless conveyance system is housed in a housing 428, where the housing is constructed of a material such that the magnetic interface is not interrupted. For several of the views, the housing is removed or hidden for clarity. Housing eyelets 467, 468 and 466 can be utilized for mounting the housing frame. For one implementation, at least a portion of the underside of the carriage is constructed of a ferrous material. The series of items 442 are constructed of magnets that attract items made of ferrous materials such that when the dual side by side endless chain conveyors convey items 442 back and forth, the magnetic interface causes the carriage, the stand and the debone mount and track wheel 418 to traverse back and forth along the track 414.

Figure 4A:
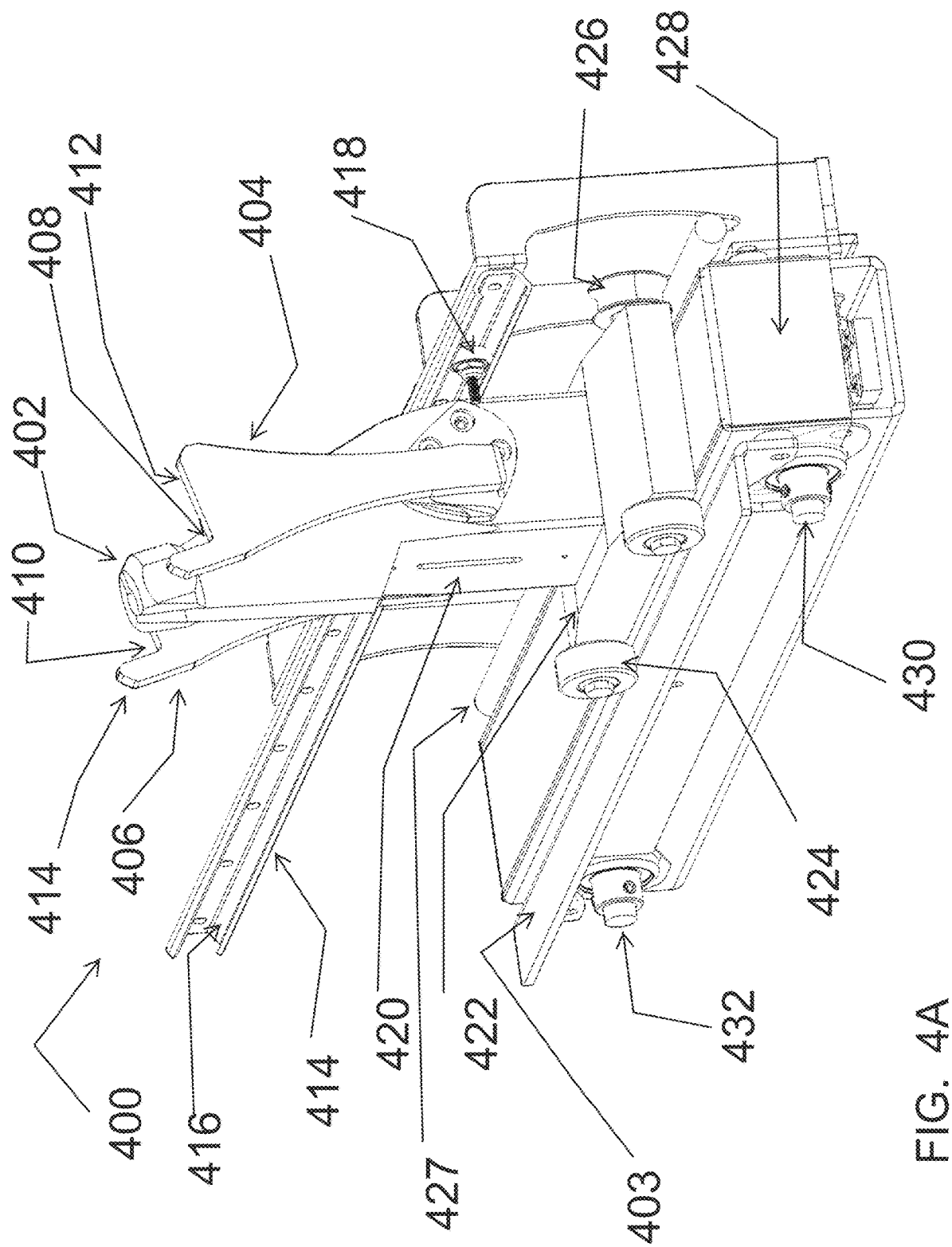
Figure 4B:
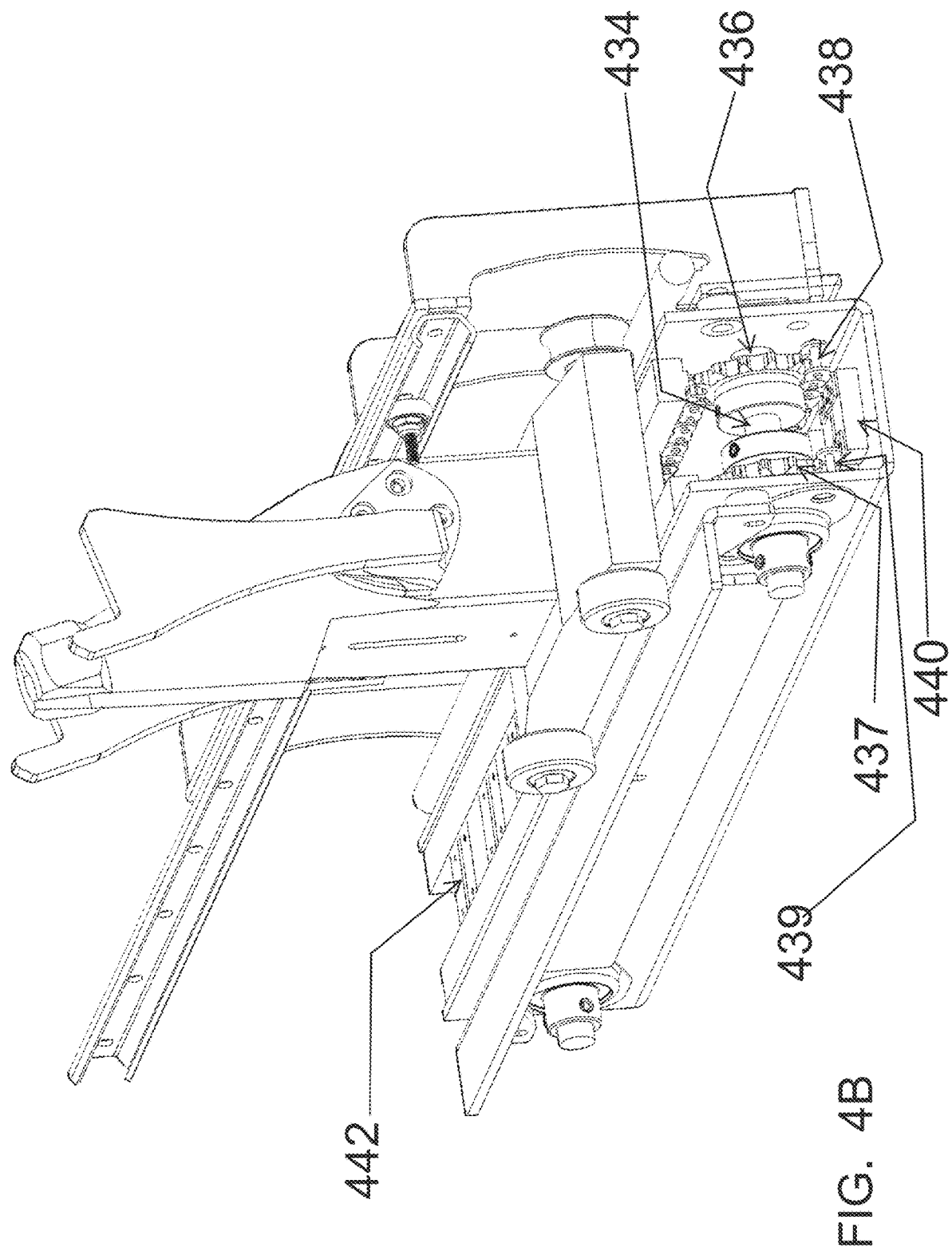
Figure 4C:
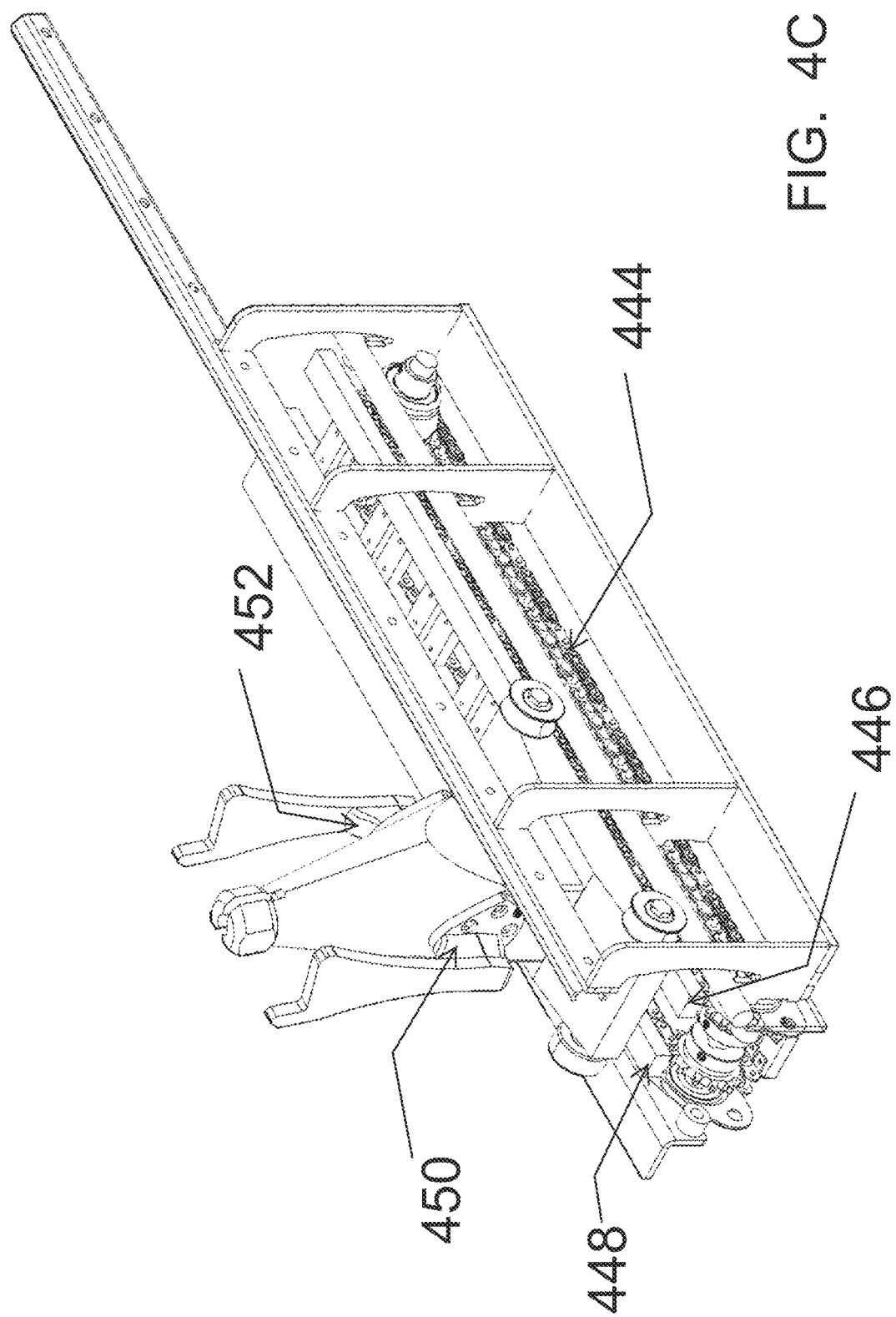
Figure 4E:
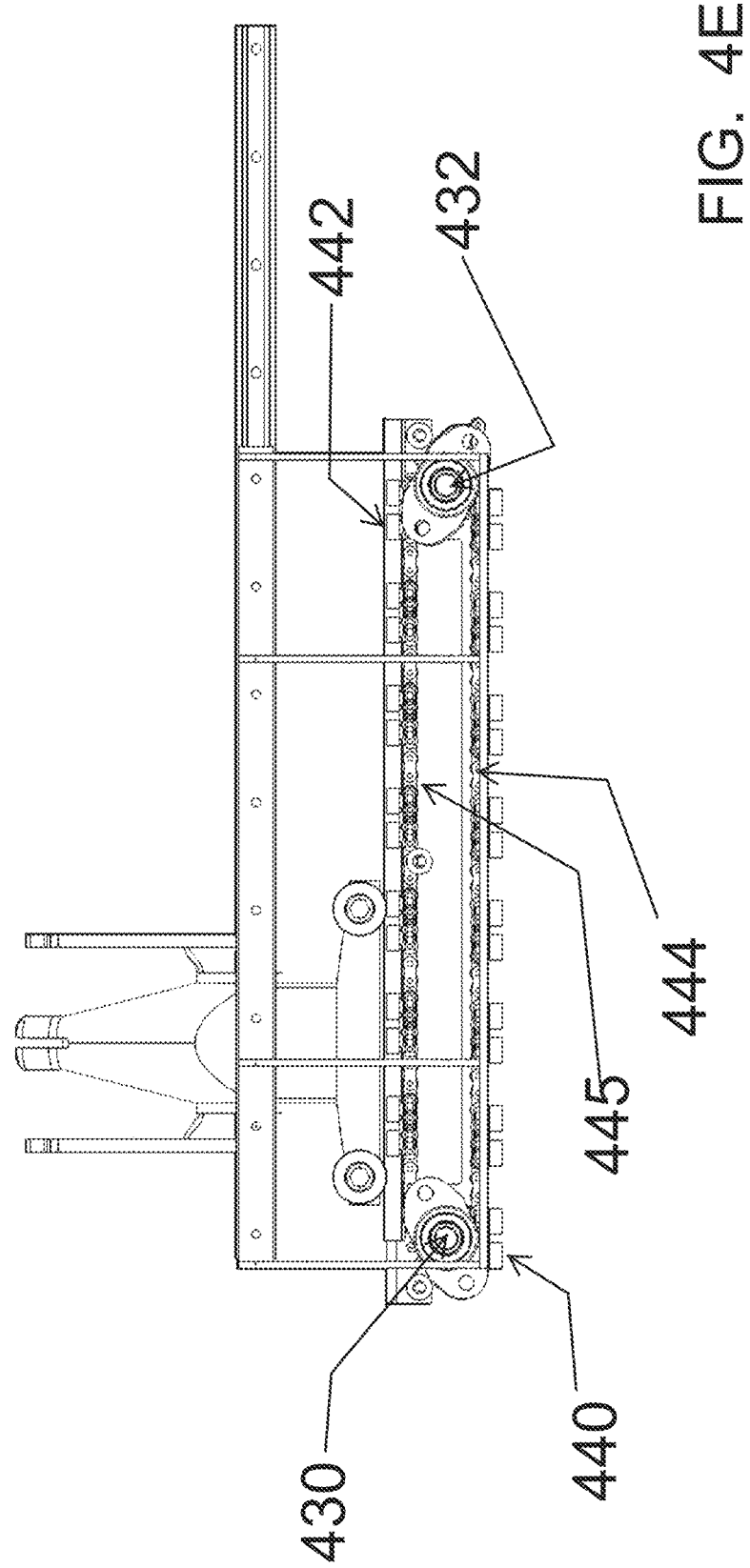
Figure 4H:
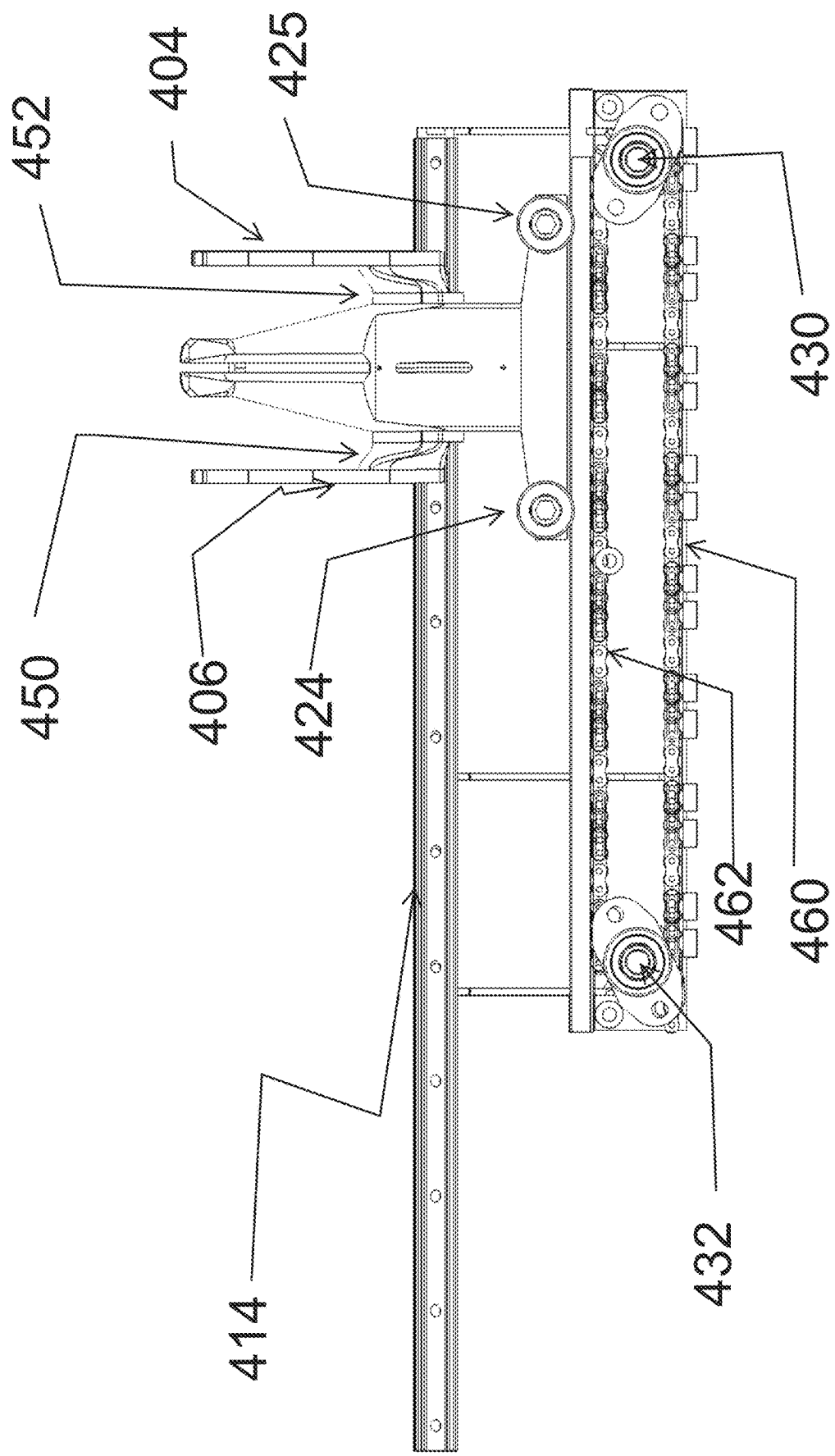
Figure 41:
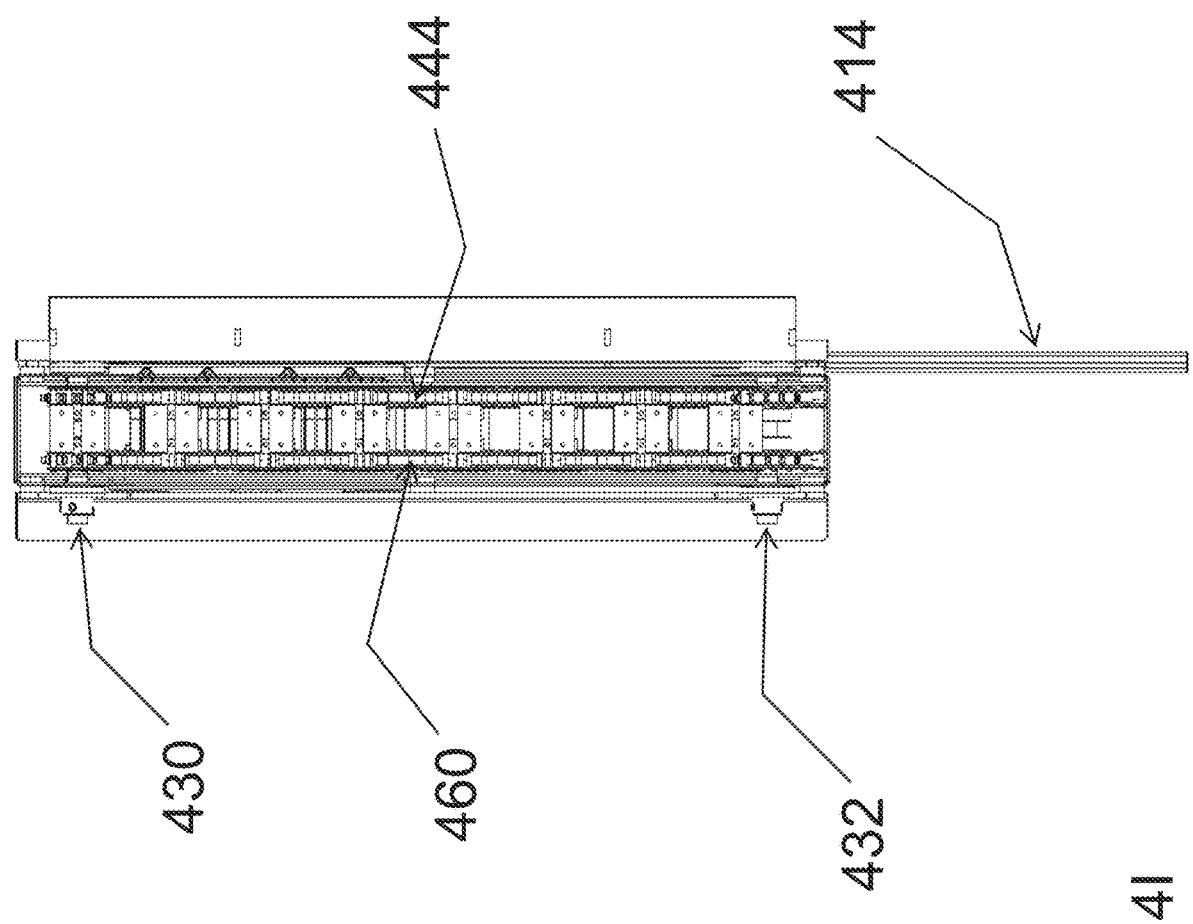
Figure 4J:
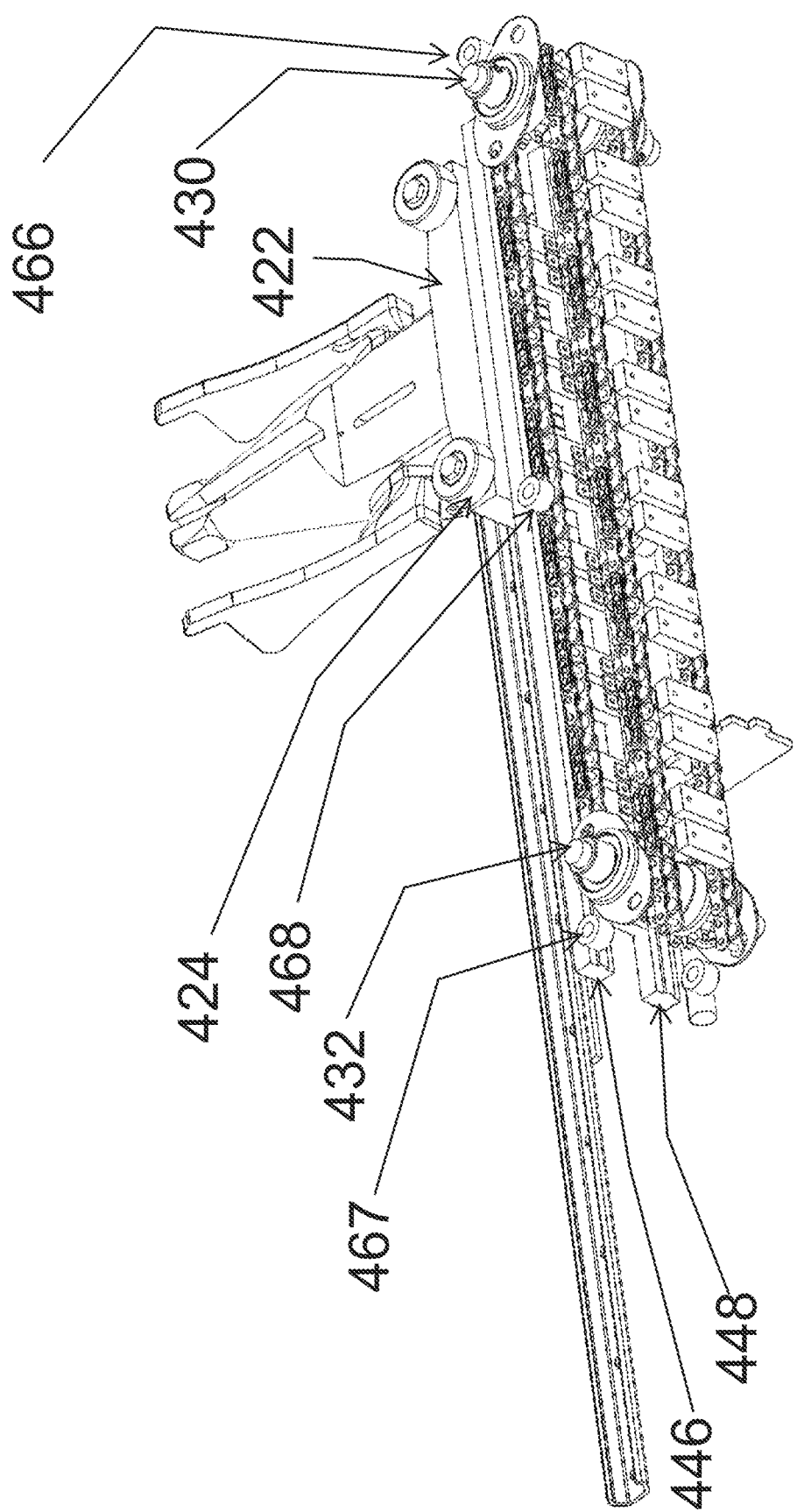
Figure 4K:
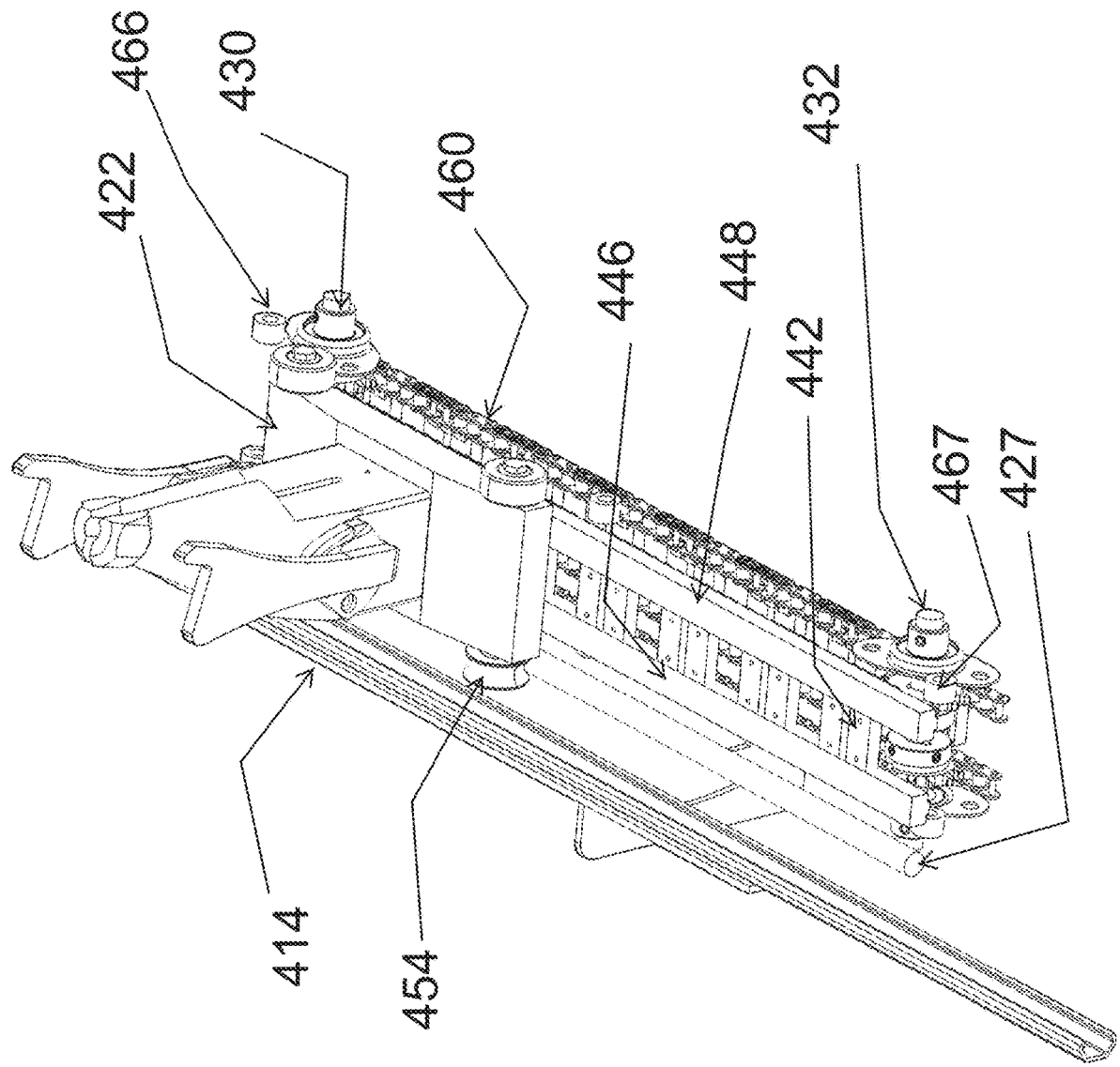
Figure 4L:
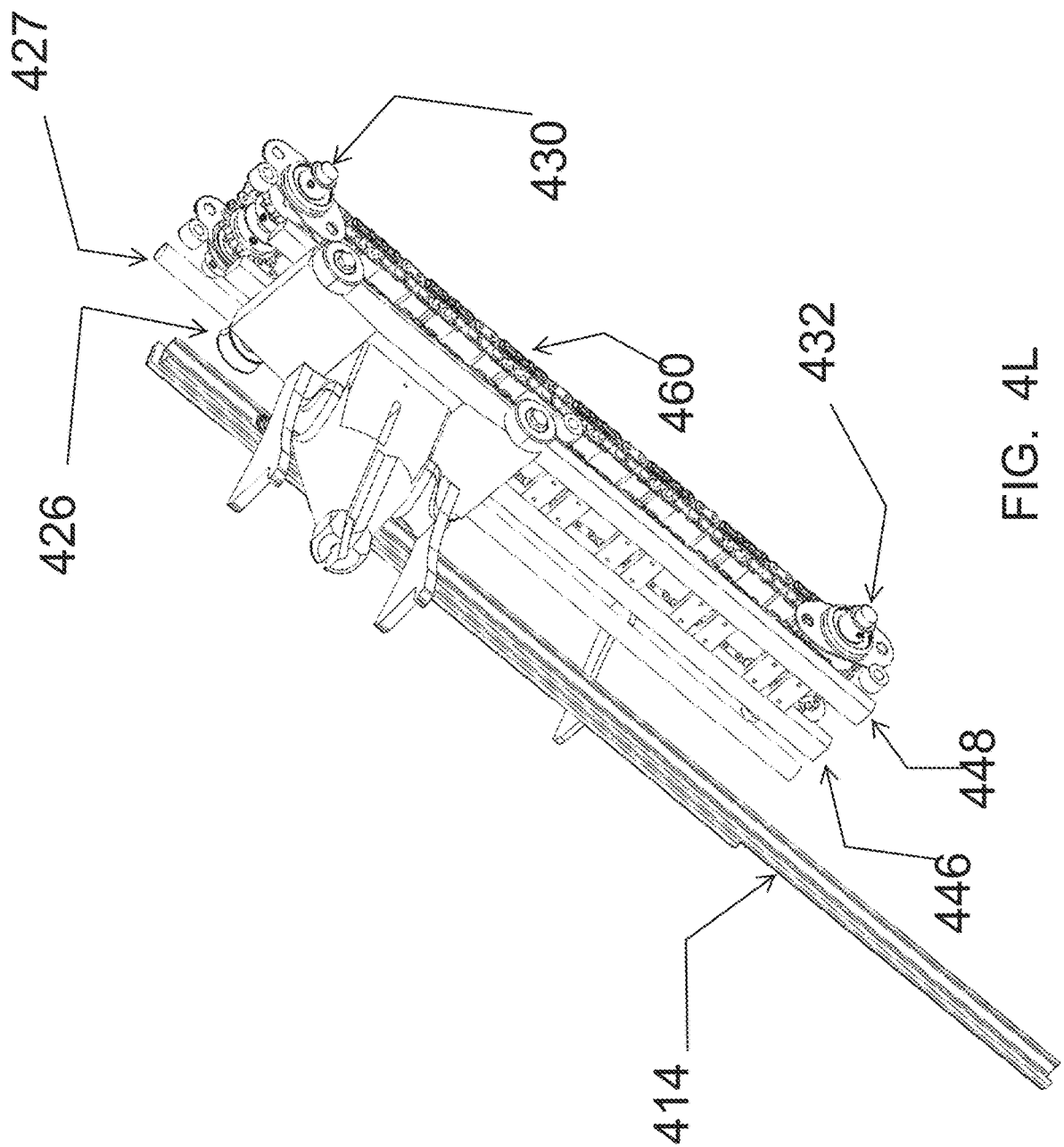
Figure 4M:
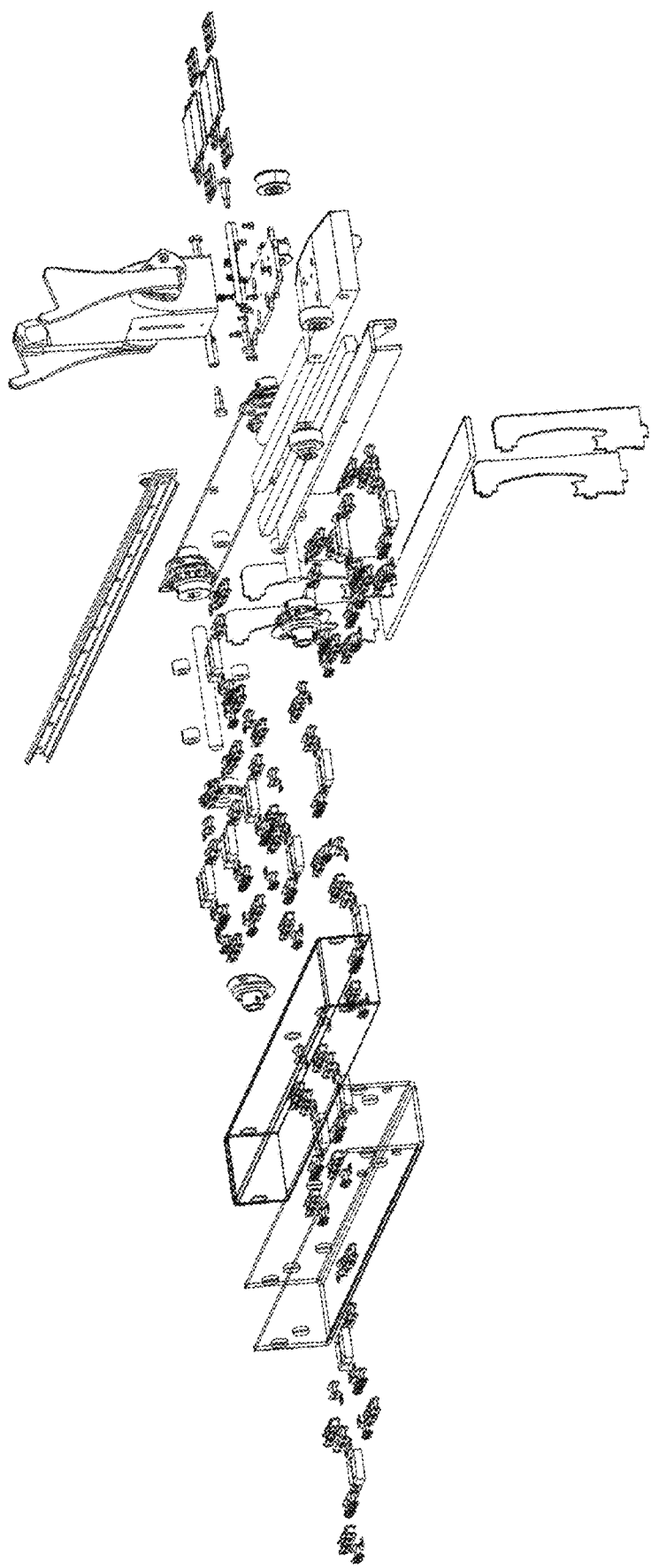

The conveyance system includes at least one endless chain conveyor for translating items 442. The implementation shown in the figures included dual side-by-side endless chain conveyors for translating items 442. The conveyance system, for one implementation, includes and internal hub assemblies 434 and 459 having dual spaced apart gear pairs 436, 437 and 456, 458 respectively. The teeth of the gears engage with dual endless spaced apart chain conveyors 438 and 439. A return portion of the endless conveyor chains are removed/hidden for illustration purposes so that the gears 436,437 and 456,458 and their teeth are illustrated. FIG. 4E illustrates endless chain 438 having an upper run 445 and a lower run 444. Endless chain conveyor 439, also includes an upper run 462 and a lower run 460. The magnetic interface item 442 is illustrated traversing on the upper run and the magnetic interface item 440 is illustrated traversing on the bottom run. For one implementation chain track guides 446 and 448 are utilized to assist with conveyor chain alignment and configure to resist chain disengagement. The top portion 441 of the series of items for one implementation is constructed of a magnet, however for another implementation, the top portion of the series of items is constructed of a ferrous material. For one implementation, at least a portion of the underside 443 of the carriage is constructed of a ferrous material. For yet another implementation, at least a portion of the underside 443 of the carriage is constructed of a magnet. FIG. 4M provide an exploded view illustration of the various components.

One implementation of the technology as disclosed and claimed herein includes controlling with a computing system an automated robotic arm 204 having an ultrasonic knife implement 206 to cause a blade 208 of the ultrasonic knife implement to traverse along the cut path of the meat item. One specific example of using this methodology is where the meat item is a poultry item and the cut path is a shoulder cut path. One function of the technology is to perform the severing of the tendons around the shoulder joint with the ultrasonic knife as the ultrasonic knife travels along the cut path. A further step of the method can include grasping and pulling the wing of the poultry item and pulling the breast meat off a frame of the poultry item, where the cutting path depth is sufficient to sever the shoulder joint. The apparatus includes an ultrasonic knife assembly and frame 106.

For one implementation the item to be operated on is mounted on debone mount jig 402 for holding the item being operated on. For one implementation of the technology, the debone track mount assembly is controlled by a computing system to control the linear position of the debone track mount assembly along the path 419 of track 414. For one implementation, a computing system controls a servo motor or other power means to effect rotation of one or both of axles 430 and 432. The axle rotation will effect rotation of the hub assemblies 434 and 459, which will effect rotation of the gears 436, 437, 456 and 458 thereby causing the conveyance chains to traverse magnetic interface items 442 and 440. Traversing the magnetic interface items will effect linearly traversing the debone track mount assembly along the path of the track. Traversing the track mount repositions the item being operated on. By way of illustration, a poultry item is repositioned in coordination with the cut path of the ultrasonic knife in order to facilitate the cutting operation and make the cutting operation more efficient.

Figure 4N:
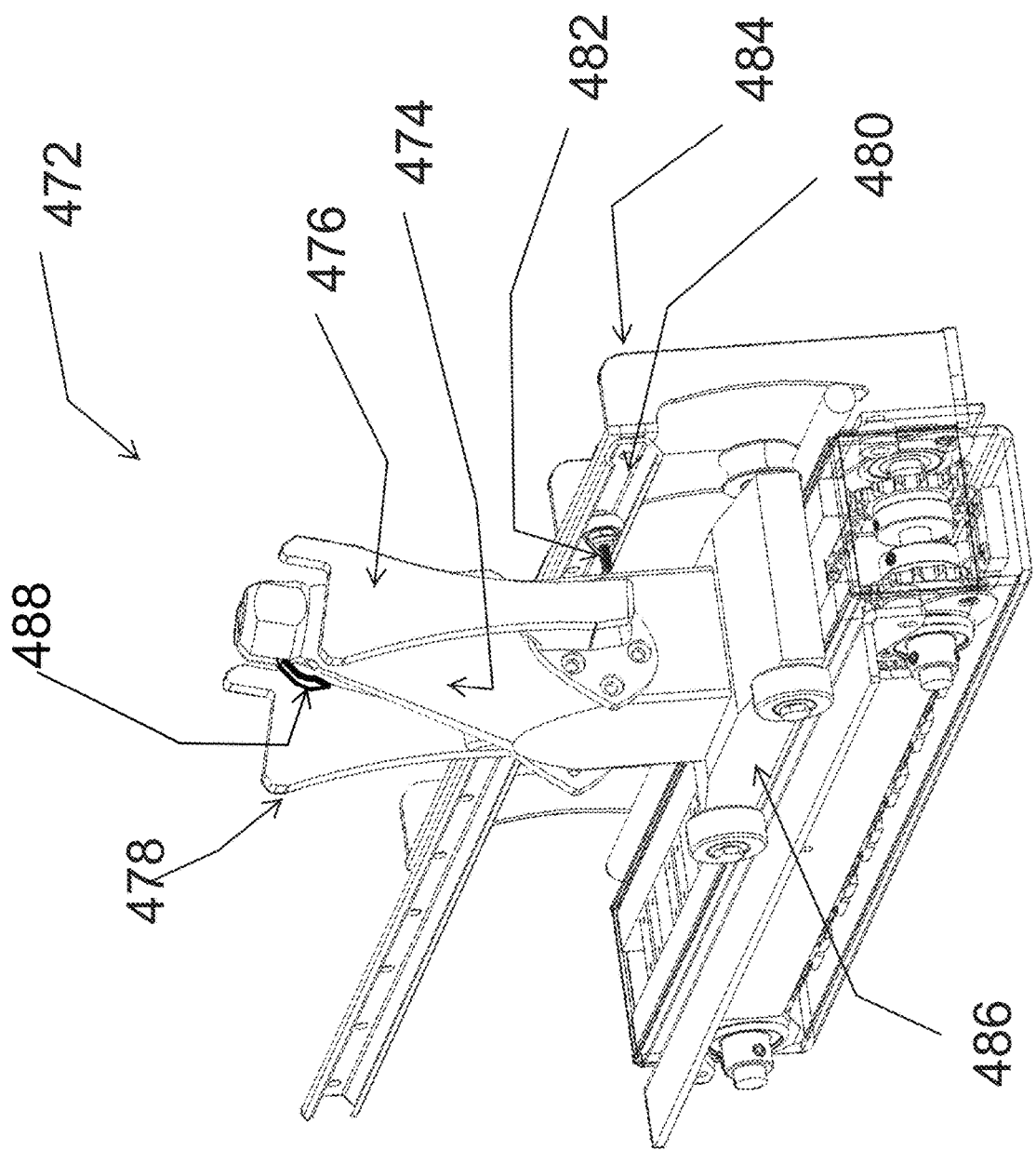
FIG. 4N an illustration of one implementation for the debone track mount with the cone and carriage rotated.
Figure 4O:
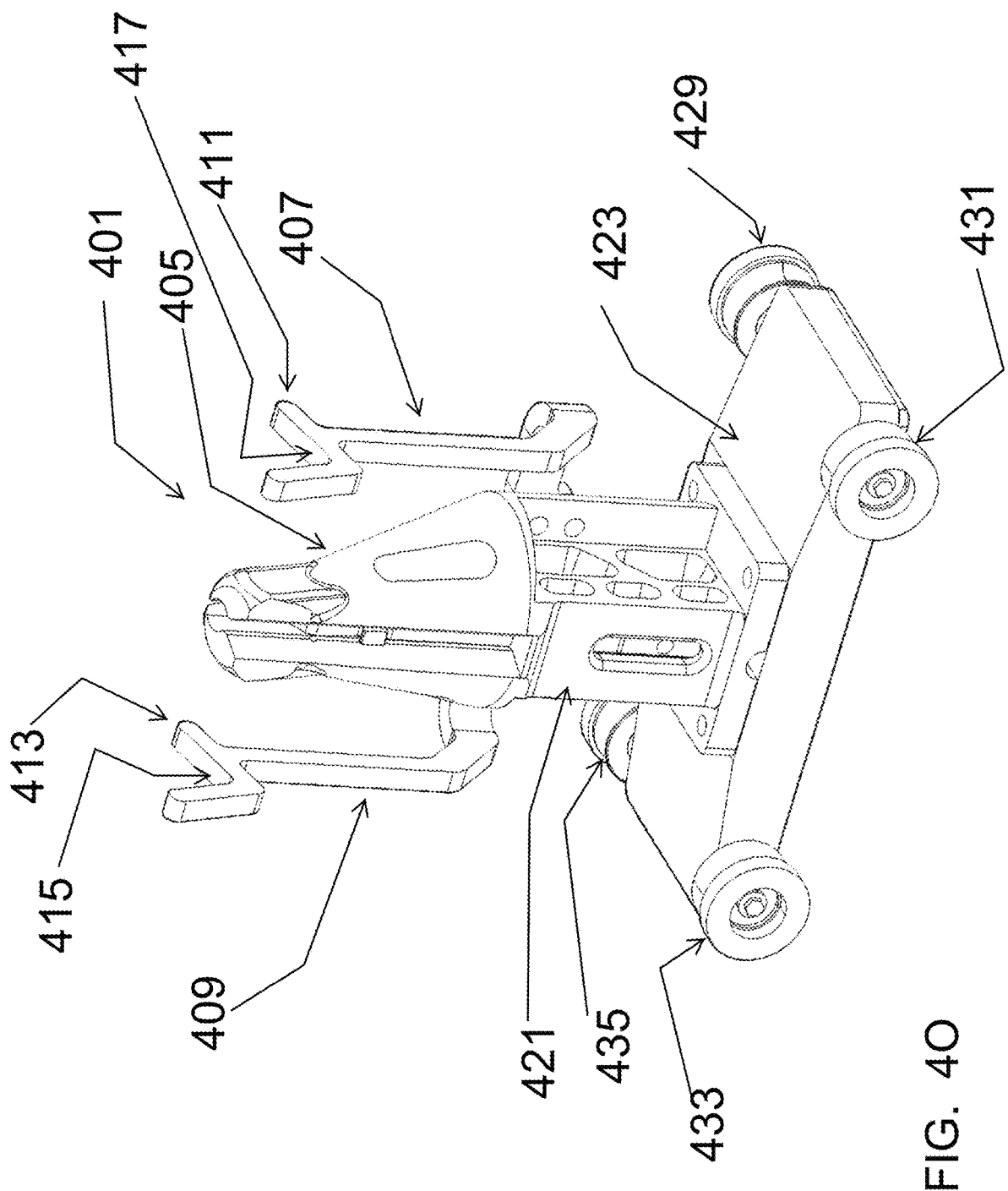
FIGS. 4O through 4S are an illustration of one embodiment of the carriage assembly.

Referring to FIG. 4N, an illustration of one implementation for the debone track mount 472 with the cone and carriage rotated is provided. Similar to the implementation illustrated in FIG. 4A, the debone track mount assembly illustrated in FIG. 4N, includes a debone mount jig cone 474 for holding the item being operated on. For one implementation a whole carcass poultry item is mounted on the debone mount jig 474 by inserting the mount 474 through the cavity opening between the legs and tail area of a whole carcass poultry item, whereby the debone mount penetrates into the poultry carcass item and stabilizes the position of the poultry item for the deboning operation. The wider the width of the cone, the more the clavicle bones are pushed outward to thereby cause the wings of a poultry item to extend outward consistently to an optimal position for the cut path. The wings of the poultry carcass are extended to straddle over wing supports 476 and 478. The pit of the wings are supported by the top upward facing surface of the wing supports. The top upward facing surface, has a downward extending angle with respect to horizontal, thereby urging the pit of the wings to rest and be captured in a corner, formed by the upward facing surface an and a member, extending orthogonally with respect to the upward facing surface. The urging of the wing pit to the corners further stabilizes the poultry item for further operation. The wing supports 476 and 478 are spaced away from debone mount 474 with spacers in order to extend the wings. For the implementation illustrated in FIG. 4N, the cone 474 and the wing supports 476 and 478 are rotated 180 degrees about its vertical axis with respect to the orientation illustrated in FIG. 4A.

For one implementation of the apparatus, the debone mount jig 474 is mounted on a stand and the wing supports are also mounted to the stand using stand-off, which provides a spacing between wing supports and the stand. The stand is mounted on a carriage 486, where the carriage 486 is configured to traverse the debone track mount along a track to further position the poultry item during the deboning process. For one implementation of the debone track mount, the track mount tracks along a substantially horizontally extended track. The debone mount has extending therefrom a track wheel 482, which tracks along the guide track 480 in a track groove. In this implementation in FIG. 4N, the track wheel 482 extends from an opposing side of the cone mount as compared to the implementation illustrated in FIG. 4A. For one implementation, the carriage includes four wheels to support the carriage and facilitate the carriage traversing with the stand along a track. Two of the wheels are grooved wheels, where the grooved wheels include a groove between the outside flanges of the wheels and the groove extends around its circumference, where the circumferential groove is configured for receiving a monorail track. The interface between the circumferential groove of the grooved wheels and the monorail is configured to resist side-to-side lateral movement of the carriage. The opposing side wheels of the carriage, ride along traversing on top of a side ledge.

The overall carriage, with stand and debone mount jig mounted thereon, is urged to travers back and forth along the track such that the operation performed on the item mounted thereon is facilitated. The carriage is urged to traverse using a magnetic interface. The magnetic interface is between a series of items being conveyed back and forth with an endless chain conveyor and at least a portion of the underside of the carriage. For one implementation, at least a portion of the underside of the carriage is constructed of a magnet. The series of items are constructed of a ferrous material that is attracted to a magnet such that when the dual side by side endless chain conveyors convey items back and forth, the magnetic interface causes the carriage, the stand and the debone mount and track wheel to traverse back and forth along the track. Axles for the conveyor can be powered to cause conveyance. For one implementation, the endless conveyance system is housed in a housing, where the housing is constructed of a material such that the magnetic interface is not interrupted. For several of the views, the housing is removed or hidden for clarity. For one implementation, at least a portion of the underside of the carriage is constructed of a ferrous material. The series of items are constructed of magnets that attract items made of ferrous materials such that when the dual side by side endless chain conveyors convey items back and forth, the magnetic interface causes the carriage, the stand and the debone mount and track wheel to traverse back and forth along the track 480, which is supported by bracket members 484. Also, for one implementation as illustrated in FIG. 4N, a mechanism for engaging a hook member 488 is actuated by a controller to urge and move the hook vertically down to thereby engage the hook to hook and grasp the mounted poultry item when the poultry item is mounted on the cone 474. The engagement of the hook pulls the item downward onto the cone such that the item is firmly seated on the cone. As the track wheel traverses along the track 480, the travel of the track wheel controls the hook member 488 to engage and disengage as a carriage travels to a cutting station position and travels away from a cutting station position after the cutting process has been performed.

Referring to FIGS. 4O through 4S, an illustration of one implementation of a debone mount jig 405 for holding the item being operated on. For one implementation a whole carcass poultry item is mounted on the debone mount jig 405 by inserting the mount 405 through the cavity opening on a bottom front half of a whole carcass poultry item, whereby the debone mount penetrates into the poultry carcass item and stabilizes the position of the poultry item for the deboning operation. For one implementation of the debone mount jig 405, the jig or mount 405 is cone shaped where the top portion or apex of the cone having a smaller diameter is oriented vertically above the bottom portion having a larger diameter with respect to the top portion. The angle of the conical shape of the mount widens from the top to the bottom where the slope or rate of increase in diameter of the conical shaped from top to bottom allows the top of the mount to be inserted into the thoracic inlet while at the same time the slope of the mount is sufficient to spread the clavicle and position the shoulder joint in a sufficiently stable and constant position to stabilize and ready the poultry item for the cutting process.

The wings of the poultry carcass are extended to straddle over wing supports 407 and 409. The pit of the wings is supported by the top upward facing surface 415 and 417 of the wing supports 413 and 411. The top upward facing surface as illustrated by item 415 and 417 of the wing supports 409 and 407, has a downward extending slope toward the rear of the mount or an angle with respect to horizontal, thereby urging the pit of the wings to rest and be captured in a corner, illustrated by item numbers 499 and 417 formed by the upward facing surface an and a member, as illustrated by items 453 and 451 extending orthogonally with respect to the upward facing surfaces 415 and 417. The urging of the wing pit to the corners 499 and 417 further stabilizes the poultry item for further operation. The wing supports 409 and 407 are spaced away from debone mount 401 with arm extensions extending from the support stand 421 in order to extend the wings outward.

For one implementation of the apparatus, the debone jig mount 405 is mounted on a stand 421 and the wing supports 409 and 407 are also mounted to the stand 421 using stand-off arm extensions 2 and 4 extending from the support stand 421, which provides a spacing between wing supports and the stand 421. The extension arms extend laterally and vertically from the stand and curve toward the rear of the carriage, thereby, extending to connect to a horizontally extending wing support, which is orthogonal with respect to the stand-off arm extensions. The stand is mounted on a carriage 423, where the carriage 423 is configured to traverse the debone track mount along a track to further position the poultry item during the deboning process. For one implementation of the debone track mount, the track mount tracks along a substantially horizontally extended track. The debone mount has extending therefrom a track wheel 418, which tracks along the guide track in a track groove. For one implementation, the carriage 423, includes four wheels, 421, 429, 431, 435 and 433 to support the carriage and facilitate the carriage traversing with the stand 421 along a track. For one implementation the wheels include an outer flange (an external ridge or rim) extending from the smooth tread of the wheel. When the carriage is traversing along a track, the flanges of the opposing wheels will be positioned along exterior opposing outer edges of the track, which will resist lateral movement as it traverses along the track. For one implementation, one or more of the wheels are grooved wheels, where the grooved wheels include a groove between the outside flanges of the wheels and extends around its circumference, where the circumferential groove is configured for receiving a monorail track. The interface between the circumferential groove of the grooved wheels and the monorail is configured to also resist side-to-side lateral movement of the carriage.

The overall carriage assembly 401, with stand 421 and debone mount jig mount 405 mounted thereon, is urged to travers back and forth along a track such that the operation performed on the item mounted thereon is facilitated. The carriage is urged to traverse using a magnetic interface. The magnetic interface is between a series of items that are made of ferrous material or are magnetic, being conveyed back and forth with an endless chain conveyor and at least a portion of the underside of the carriage is magnetic or made of ferrous material. For one implementation, at least a portion of the underside of the carriage is constructed of a magnet. The series of items are constructed of a ferrous material that is attracted to a magnet such that when the dual side by side endless chain conveyors convey items back and forth, the magnetic interface causes the carriage, the stand and the debone mount and track wheel to traverse back and forth along the track. For one implementation, the endless conveyance system is housed in a housing, where the housing is constructed of a material such that the magnetic interface between the underside of the carriage and track items are not interrupted. For one implementation, at least a portion of the underside of the carriage is constructed of a ferrous material. For this implementation, the series of transport items are constructed of magnets that attract items made of ferrous materials such that when the dual side by side endless chain conveyors convey transport items back and forth, the magnetic interface causes the carriage, the stand and the debone mount to traverse back and forth along the track 414.

Figure 4P:
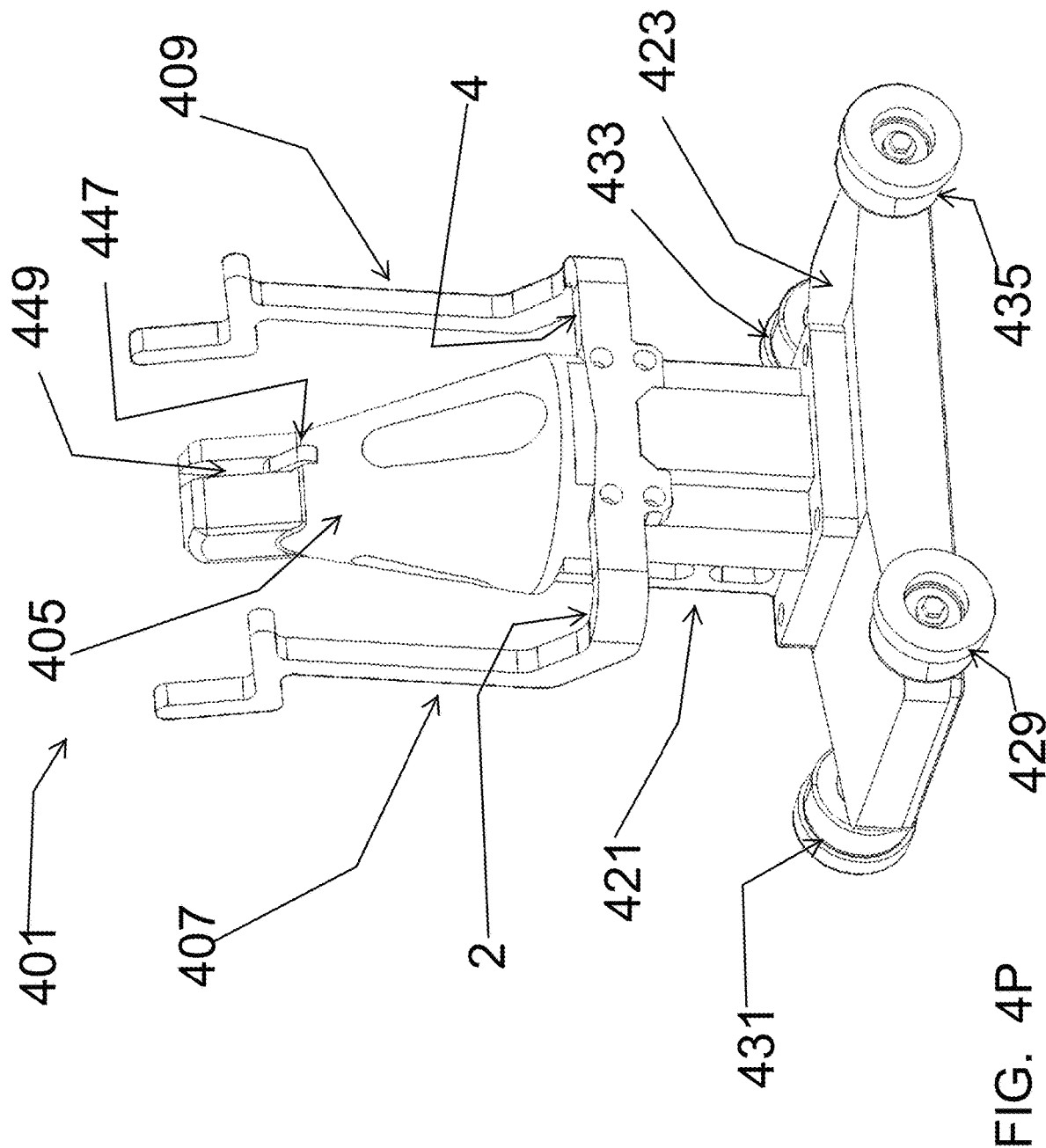
Figure 4Q:
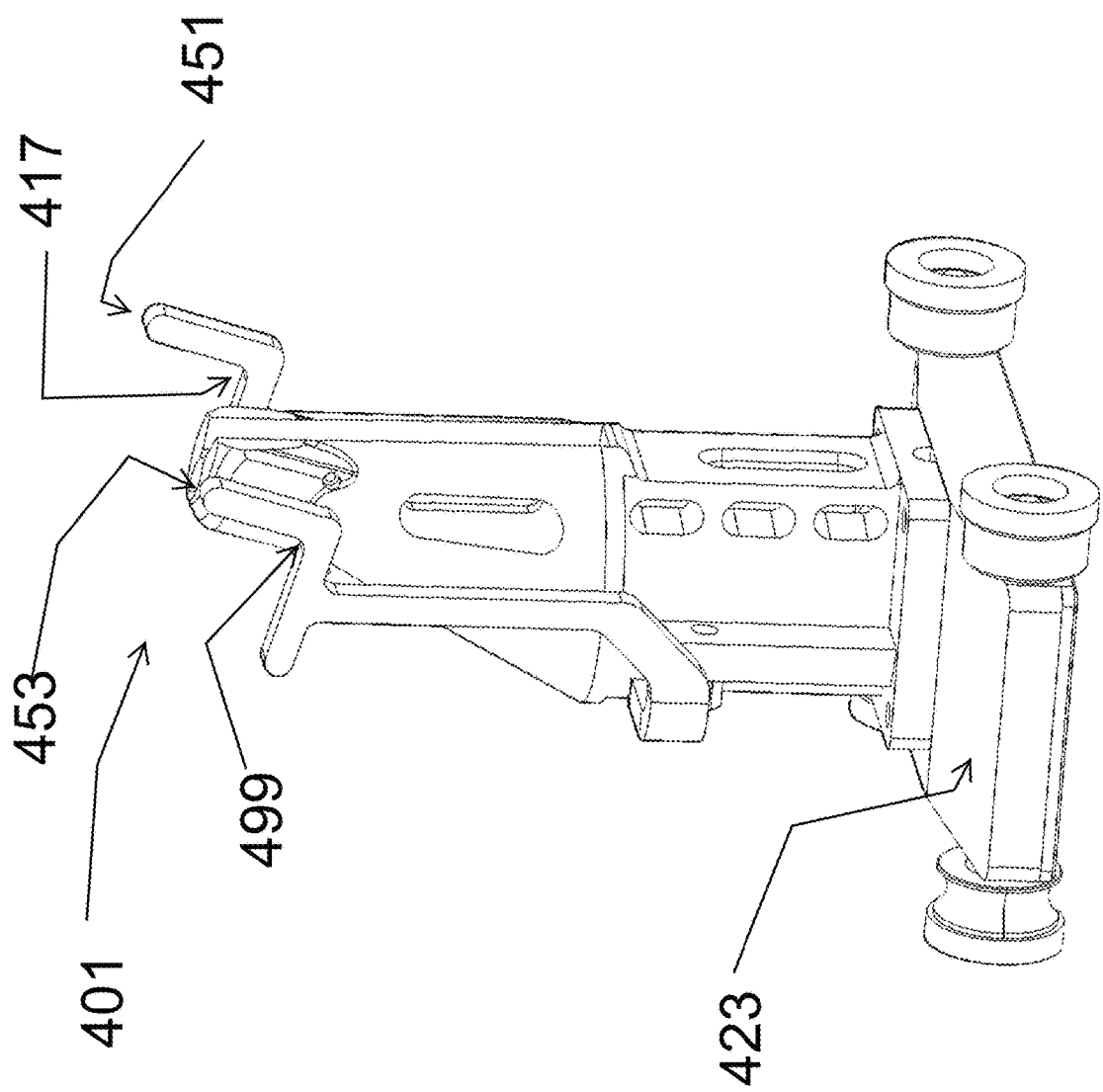

For one implementation, the apex portion of the cone-shaped jig mount includes a slot 449 extending from a top area vertically down into the body of the apex portion of the mount. For one implementation, a mechanical hook member 447 is mechanically configured to be controlled to traverse vertically up and down along the slot from an upper retracted position at the top of the slot, to a lower engaged position at the bottom of the slot, which is the position as illustrated in FIG. 4P. When the hook member 447 is engaged to traverse to the engage position, the hook hooks the interior of the item pull for example a poultry item onto the mount and further secure the poultry item on the mount when executing a cut. For one implementation, at least a portion of the underside of the carriage is constructed of a ferrous material. For yet another implementation, at least a portion of the underside of the carriage is constructed of a magnet.

Figure 4R:
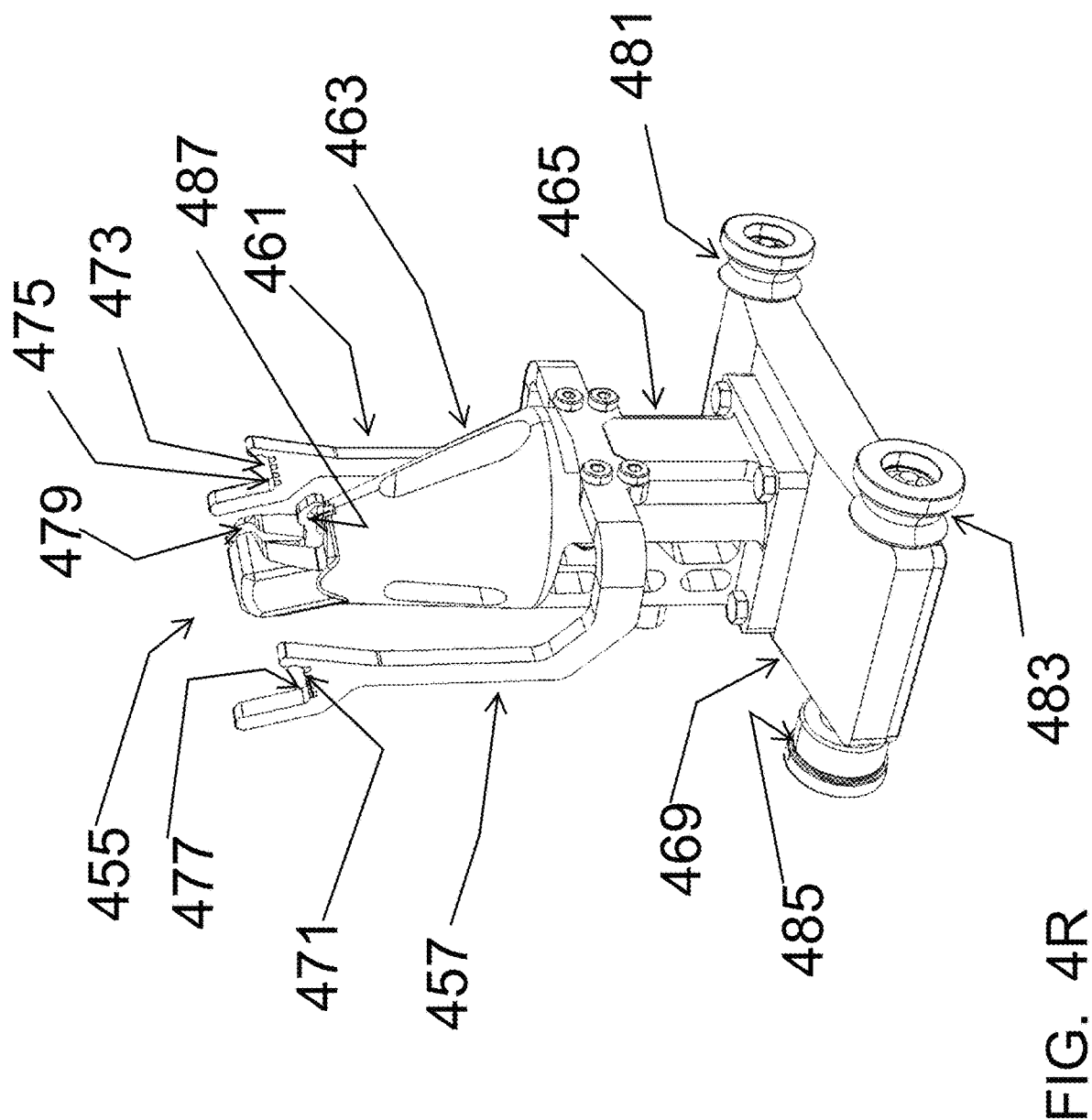
Figure 4S:
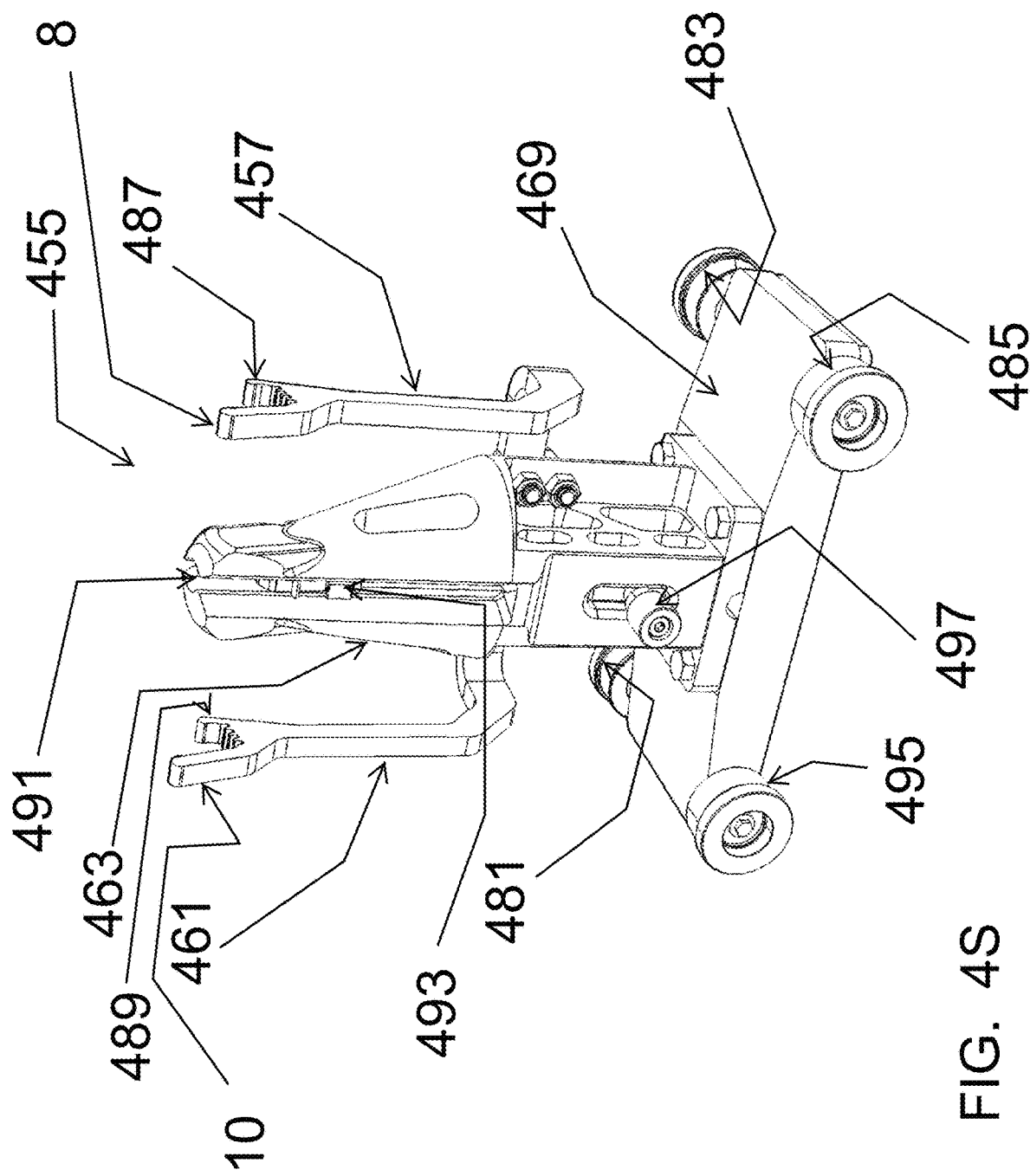

FIG. 4R illustrates one implementation of a carriage assembly 455, where the pit of the wings are supported by the top upward facing surface 471 and 473 of the wing supports. The top upward facing surface as illustrated by item 471 and 473 of the wing supports 457 and 461, has a downward extending slope toward the rear of the mount or an angle with respect to horizontal, thereby urging the pit of the wings to rest and be captured in a corner, illustrated by item numbers 477 and 475 formed by the upward facing surface an and a member, as illustrated by items 10 and 8 extending orthogonally with respect to the upward facing surfaces 471 and 473, and said wing captured between items 10 and 489; and items 8 and 491. For this implementation, the upward facing surfaces 471 and 473 include a plurality of raised ribs that will resist movement during the cutting operation of the wing of a poultry item mounted on the jig mount. The urging of the wing pit to the corners 477 and 475 further stabilizes the poultry item for further operation. The wing supports 457 and 461 are spaced away from debone mount 463 with arm extensions extending from the support stand 465 in order to extend the wings outward.

For one implementation of the apparatus, the debone jig mount 463 is mounted on a stand 465 and the wing supports 457 and 461 are also mounted to the stand 465 using stand-off arm extensions and extending from the support stand 465, which provides a spacing between wing supports and the stand. The extension arms extend laterally and vertically from the stand and curve toward the rear of the carriage, thereby, extending to connect to a horizontally extending wing support, which is orthogonal with respect to the stand-off arm extensions. The stand is mounted on a carriage 469, where the carriage 469 is configured to traverse the debone track mount along a track to further position the poultry item during the deboning process.

For one implementation of the debone track mount, the track mount tracks along a substantially horizontally extended track. The debone mount has extending therefrom a track wheel 497, which tracks along the guide track in a track groove. For one implementation, the carriage 469, includes four wheels, 481, 483, 485 and 495 to support the carriage and facilitate the carriage traversing with the stand 465 along a track. For one implementation the wheels include an outer flange (an external ridge or rim) extending from the smooth tread of the wheel. When the carriage is traversing along a track, the flanges of the opposing wheels will be positioned along exterior opposing outer edges of the track, which will resist lateral movement as it traverses along the track. For one implementation, one or more of the wheels are grooved wheels, where the grooved wheels include a groove between the outside flanges of the wheels and extends around its circumference, where the circumferential groove is configured for receiving a monorail track. See FIG. 4R, wheels 481 and 483, which are an illustration of wheels having grooves. The interface between the circumferential groove of the grooved wheels and the monorail is configured to also resist side-to-side lateral movement of the carriage.

For one implementation of the debone track mount, the track mount tracks along a substantially horizontally extended track. For one implementation the wheels include an outer flange (an external ridge or rim) extending from the smooth tread of the wheel. When the carriage is traversing along a track, the flanges of the opposing wheels will be positioned along exterior opposing outer edges of the track, which will resist lateral movement as it traverses along the track. For one implementation, one or more of the wheels are grooved wheels, where the grooved wheels include a groove between the outside flanges of the wheels and extends around its circumference, where the circumferential groove is configured for receiving a monorail track. See wheels 481 and 483. The interface between the circumferential groove of the grooved wheels and the monorail is configured to also resist side-to-side lateral movement of the carriage.

For one implementation, the apex portion of the cone-shaped jig mount includes a slot 491 extending from a top area vertically down into the body of the apex portion of the mount. For one implementation, a mechanical hook member 487 is mechanically configured to be controlled to traverse vertically up and down along the slot from an upper retracted position at the top of the slot, to a lower engaged position at the bottom of the slot, which is the position as illustrated in FIG. 4R. When the hook member 487 is engaged to traverse to the engage position, the hook hooks the interior of the item pull for example a poultry item onto the mount and further secure the poultry item on the mount when executing a cut. For one implementation, at least a portion of the underside of the carriage is constructed of a ferrous material. For yet another implementation, at least a portion of the underside of the carriage is constructed of a magnet.

Figure 5A:
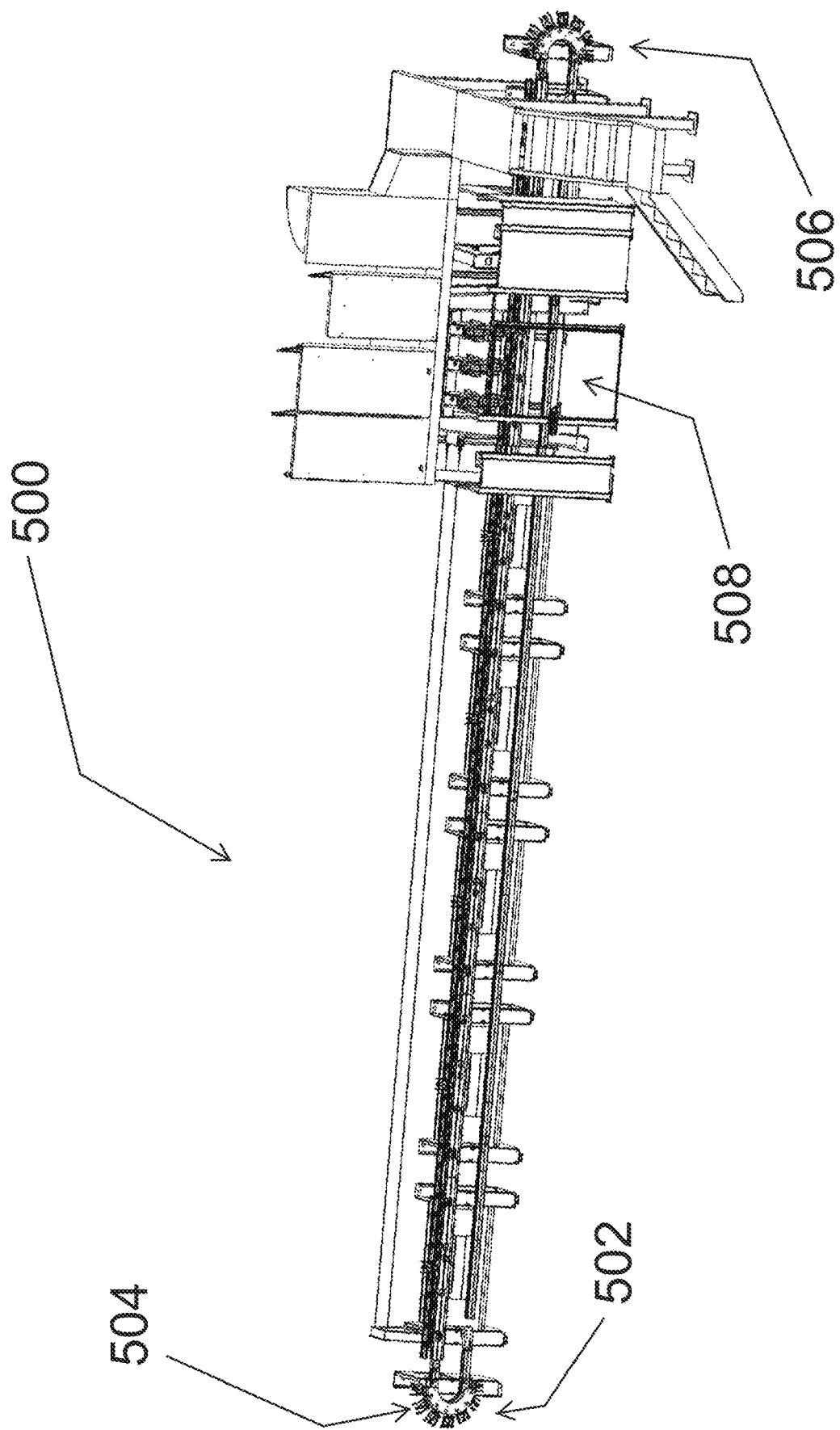
FIGS. 5A through 5D are an illustration of a track conveyance and breast removal system.
Figure 5B:
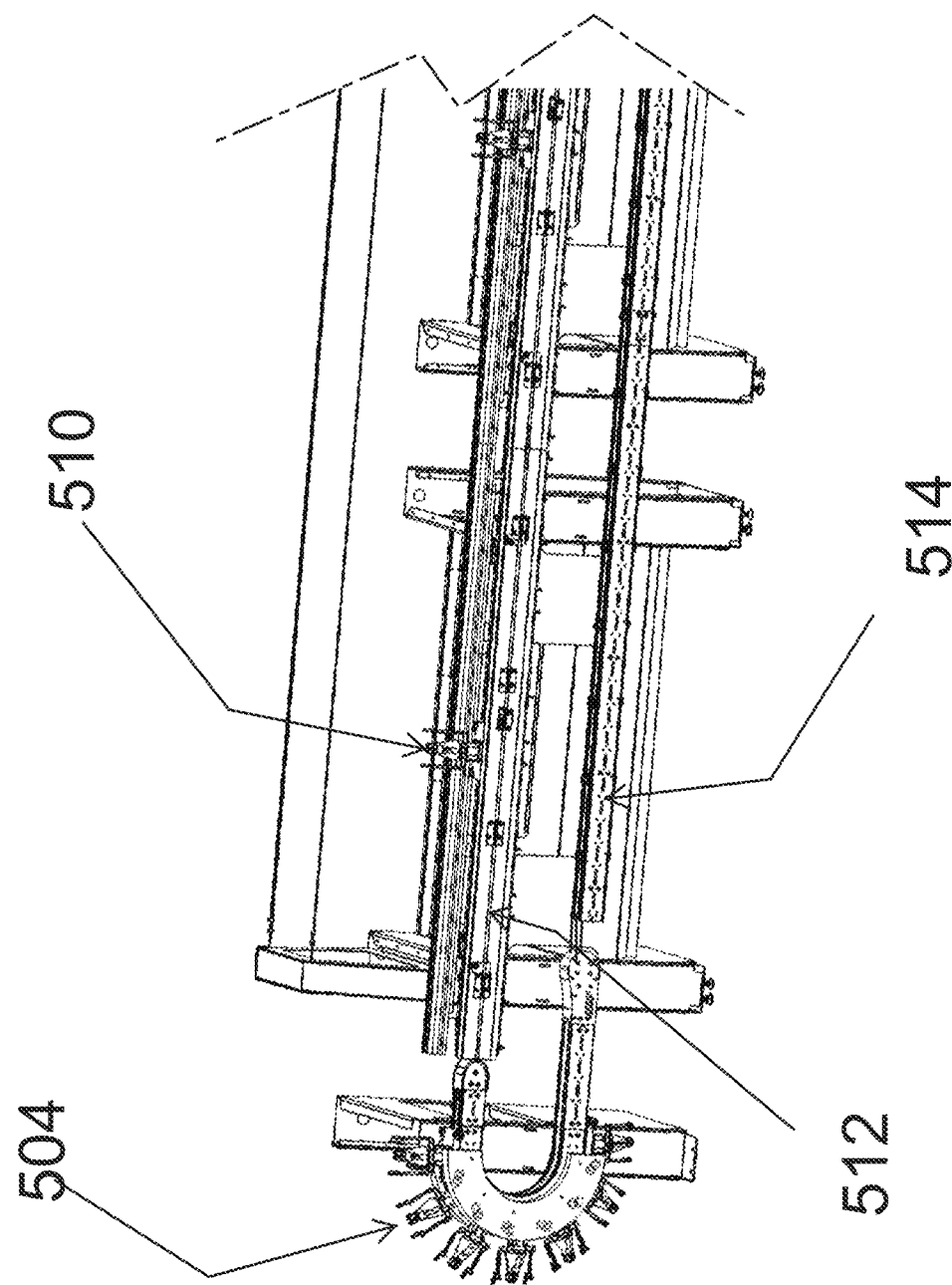
Figure 5C:
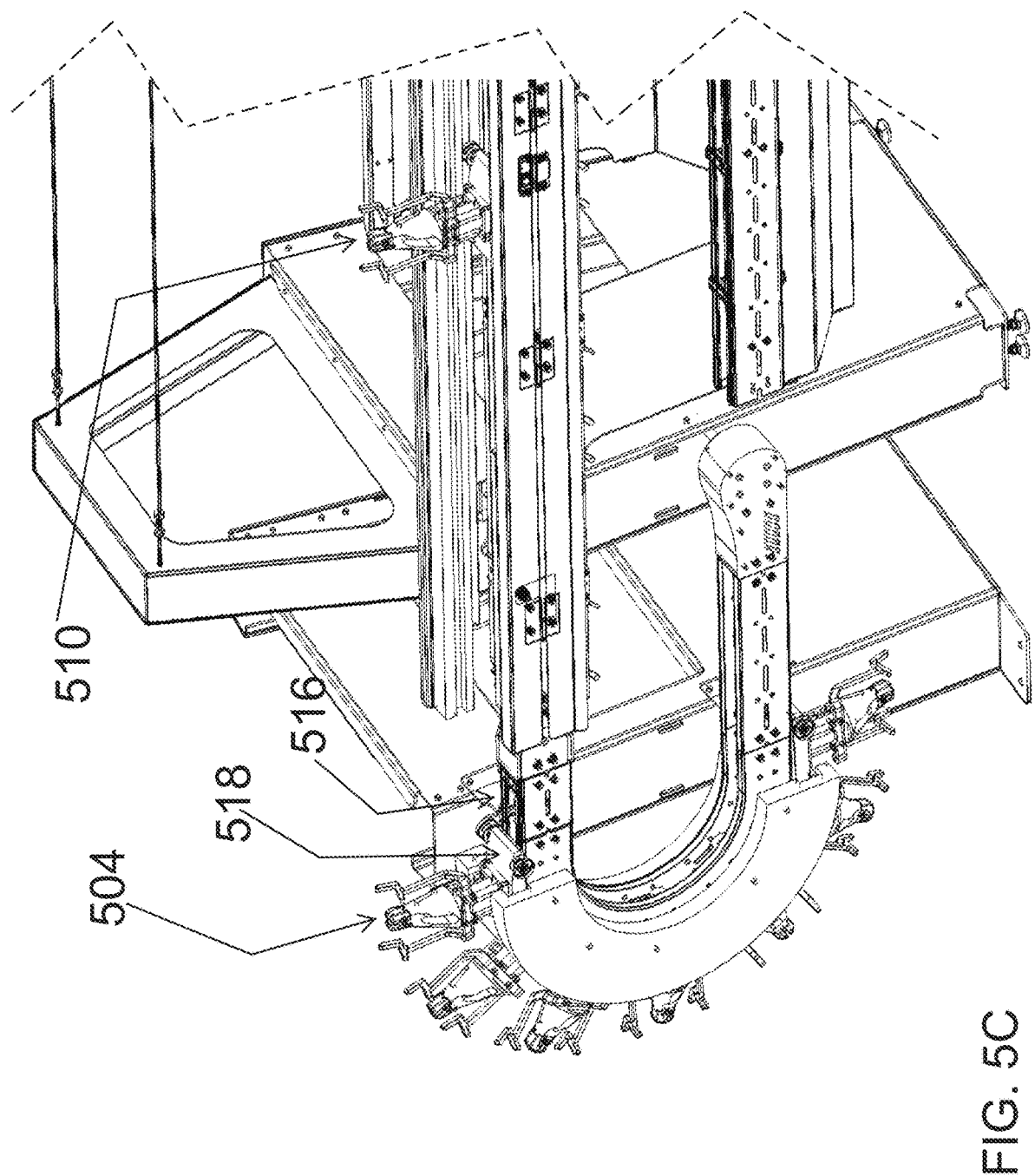
Figure 5D:
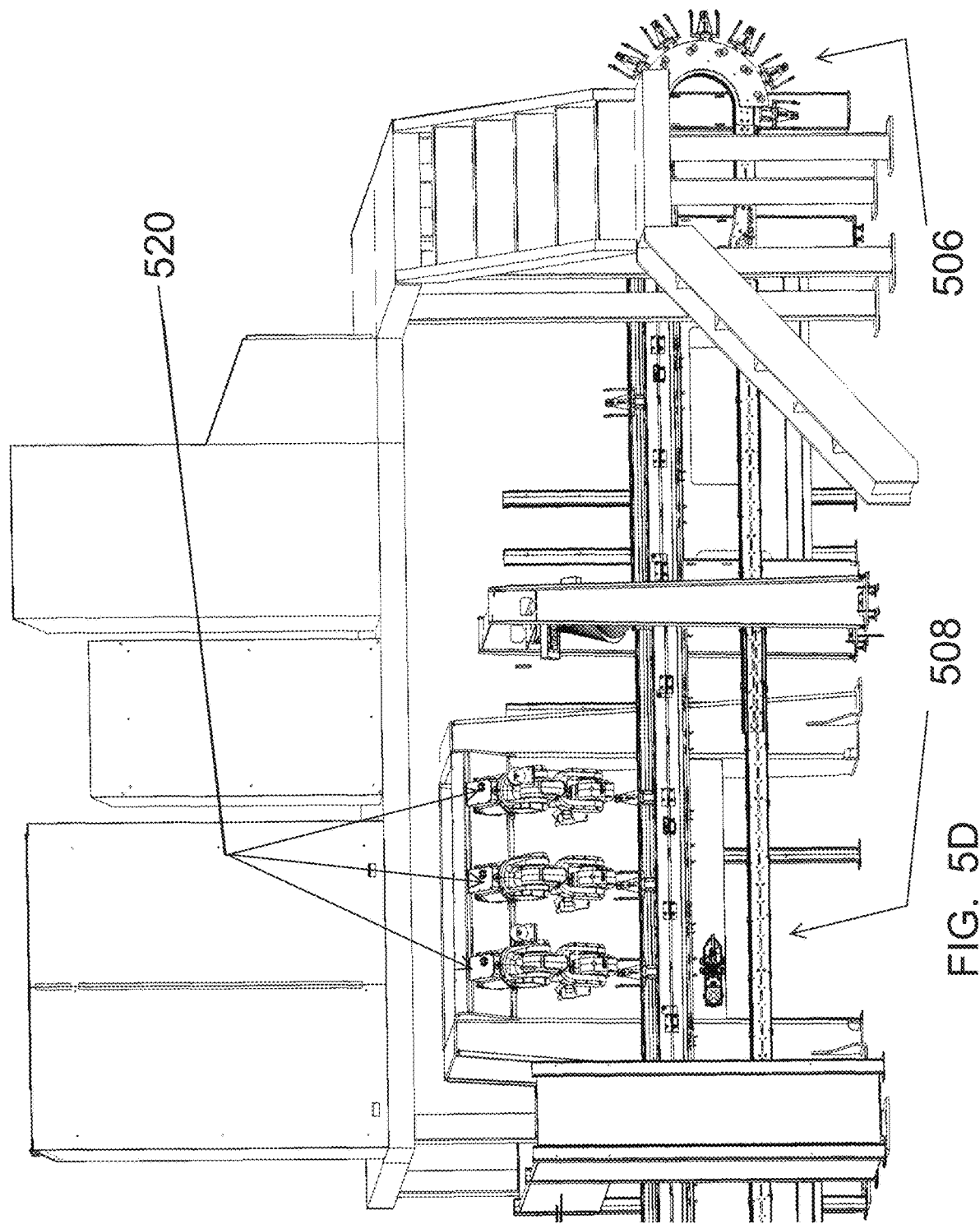

Referring to FIGS. 5A through 5D, an illustration of a track conveyance and breast removal system is provided. A similar cone mount and carriage system 504, as illustrated in FIG. 4, is used on the track conveyor and breast removal system 500. The conveyance system 500 has an entry end 502 and an exit end 506. For one implementation of the system, proximate the exit end 506, there is a breast removal station 508, where the breast meat portion of a poultry item is pulled away from the carcass where the line of separation of the breast meat from the carcass is along cut lines created by the ultrasonic knife that cut the poultry item along the cut path performed by the automated robotic arm having an ultrasonic knife implement to cause a blade of the ultrasonic knife implement to traverse along the determined cut path of the meat item. At the entry end, there are a plurality of the cone mounts, on which poultry items are mounted and where the mounts include an undercarriage with wheels for receiving items onto the conveyance system. The cone mounts are mounted on a carriage or undercarriage that traverses along similar to the cone and carriage combination of the debone track mount system illustrated in FIGS. 4A through 4N. The carriage and cone mount 510 traverses along an endless cable system 516, where, for one implementation, the endless cable system contains a ferrous material for pulling the carriage along the track 512. The endless track system includes a top run 510 and a return run 514. FIG. 5C illustrates the cone 504 and carriage 518 system engaging the endless cable system 516.

Referring to FIGS. 5E through 5L an illustration of a breast removal station 520 along the track conveyance system is provided. The breast removal station includes a breast removal system 540 and a controller system 536, which controls a robotic arm 522, which positions the grasping talon implements 524 and 526, which grasp the poultry item along the wing bone and pulls the breast portion away from the carcass along cut lines created by the ultrasonic knife that cut the poultry item 528 along the cut path performed by the automated robotic arm having an ultrasonic knife implement. Prior pulling the breast portion away from the carcass, a stabilizing system 534 captures the carcass behind the shoulder joint on either side of the cervical vertebrae with stabilizer arms 530 and 532. The stabilizing system 534 includes actuators that actuate the stabilizer arms 530 and 532 to extend clamps 531 and 533 respectively to hook and hold the carcass by engaging the carcass behind the shoulder joint on either side of the cervical vertebrae in the area illustrated by item 535.

Figure 5E:
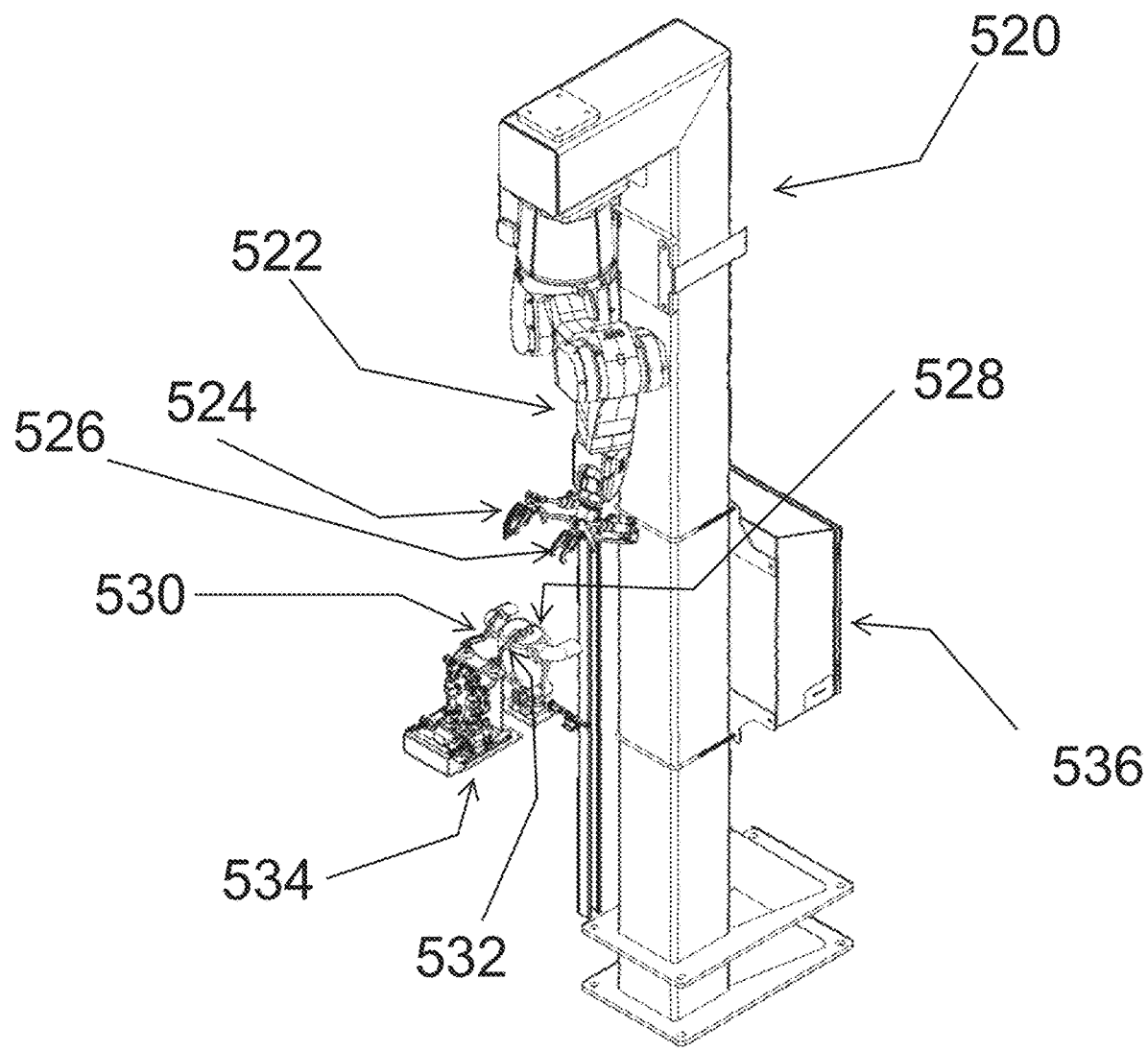
Figure 5F:
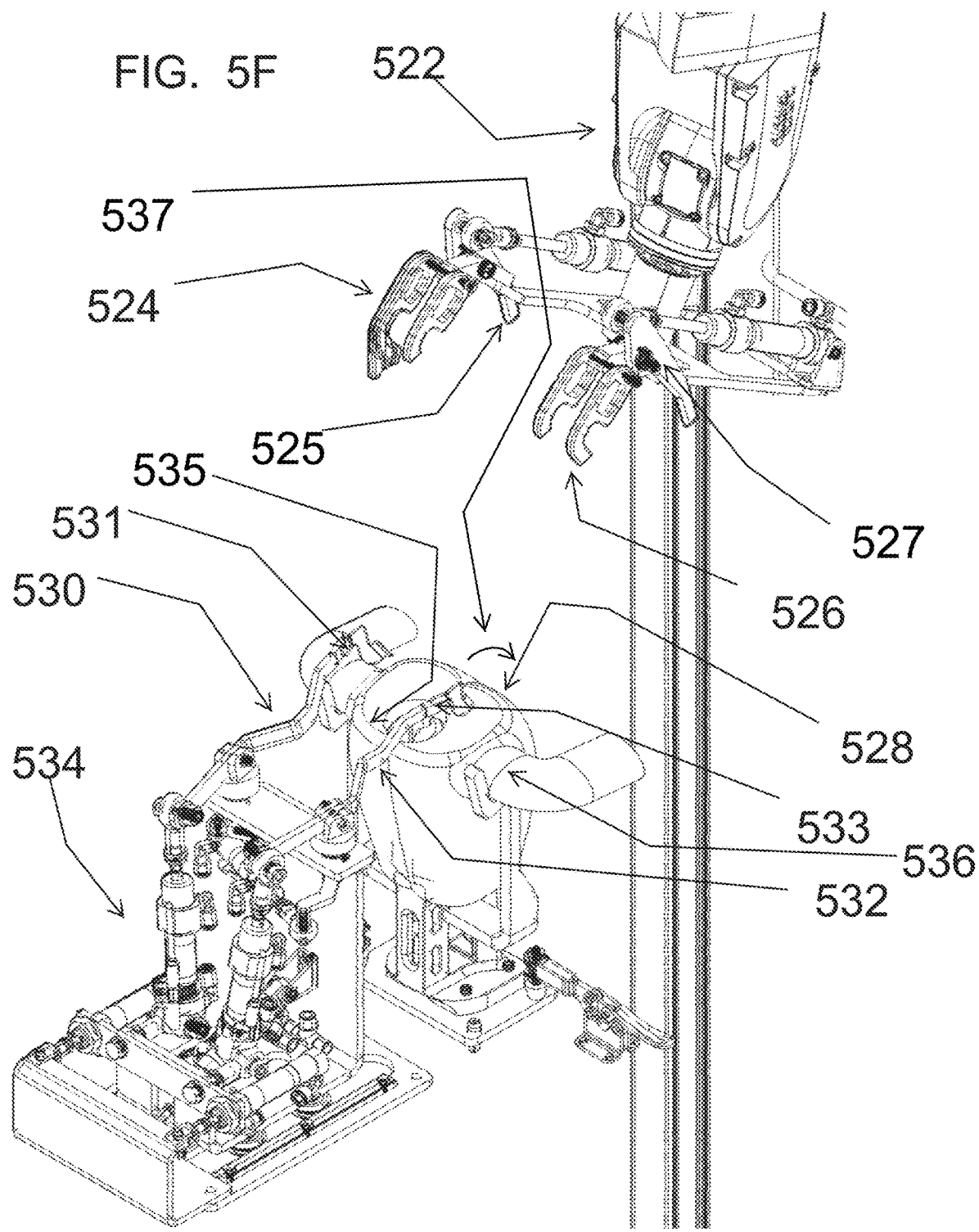
Figure 5G:
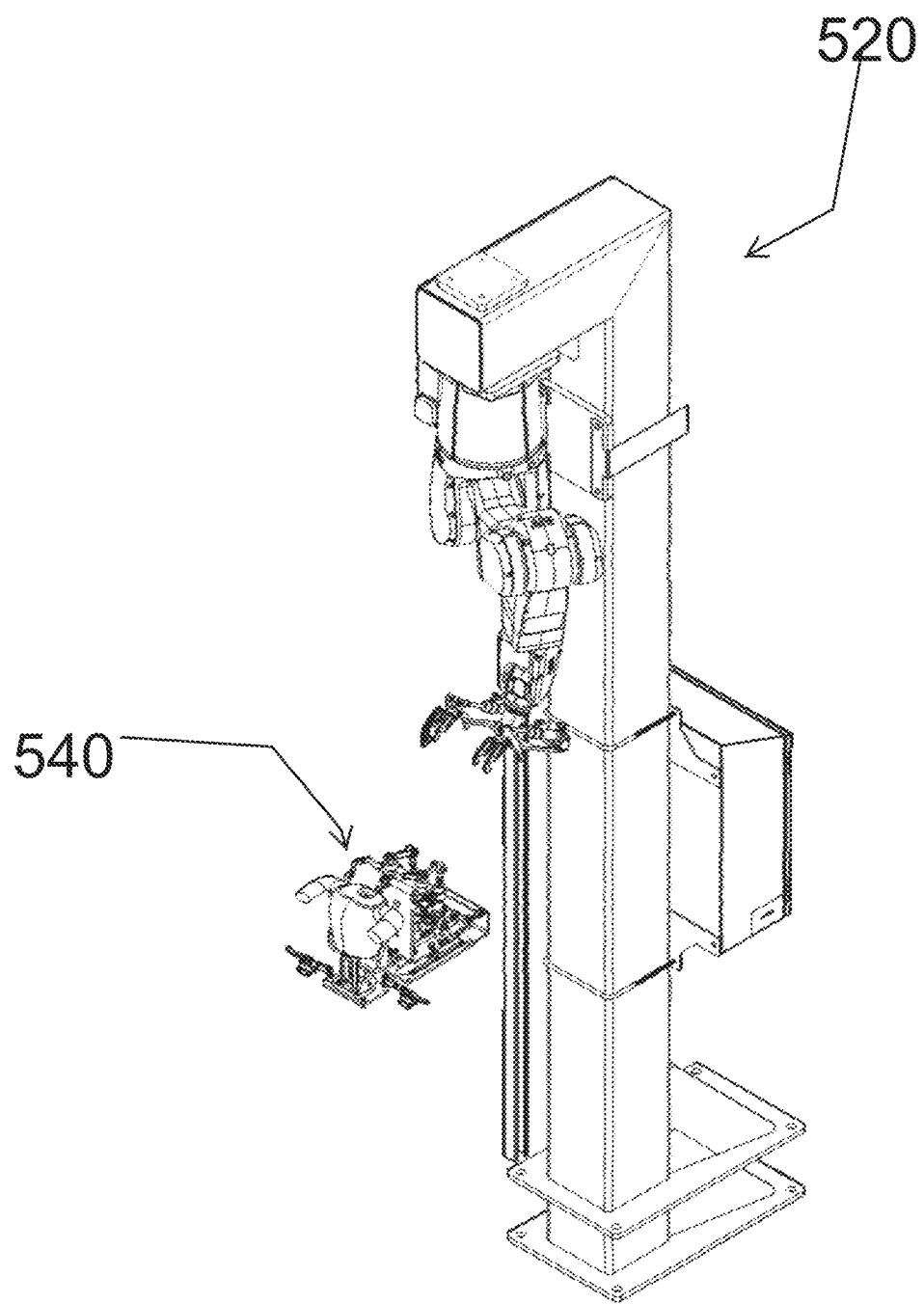
Figure 5H:
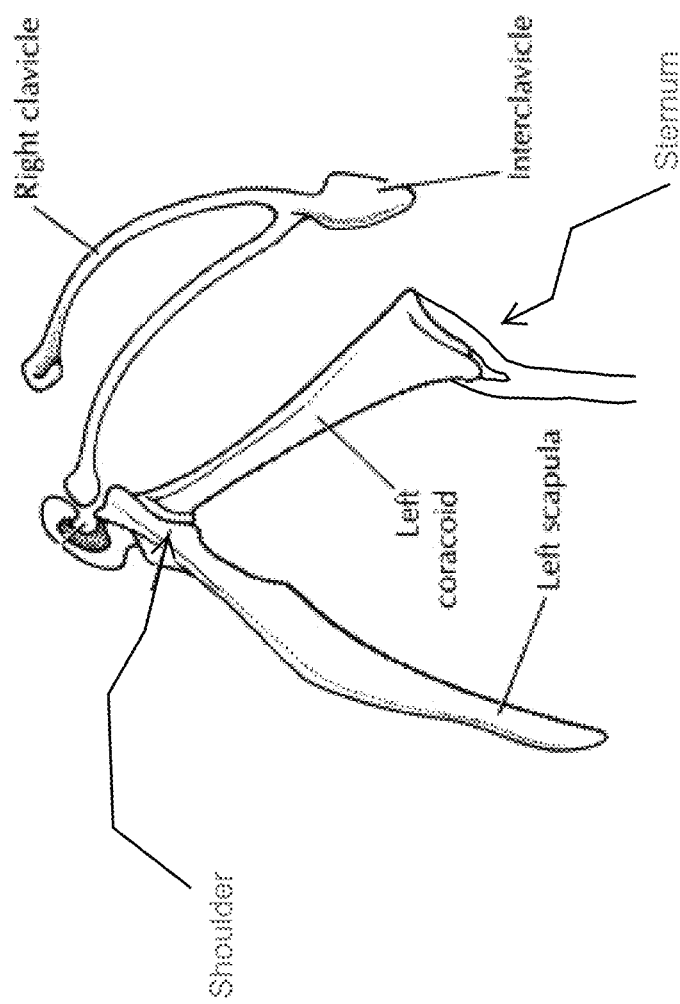
Figure 5J:
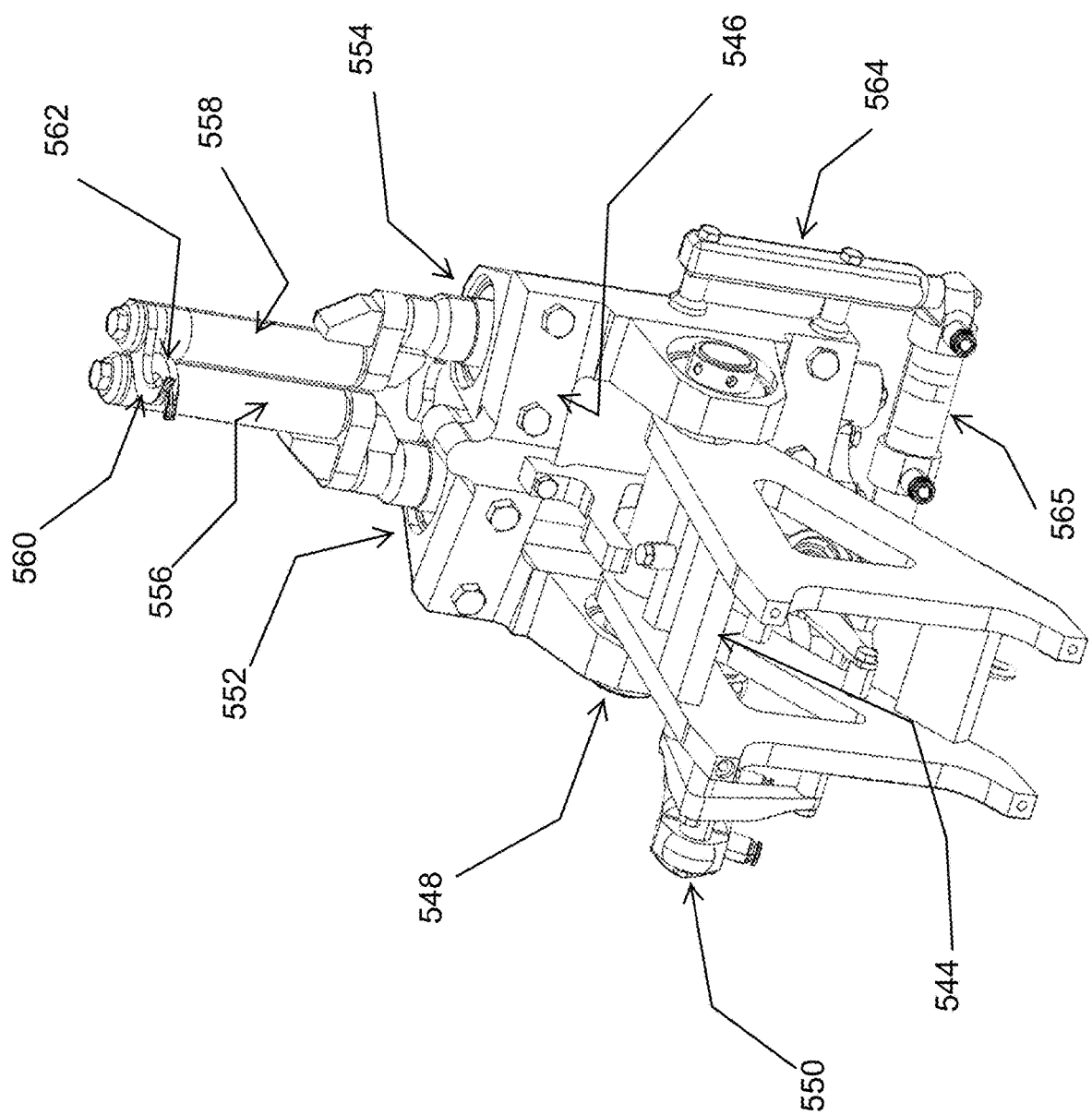

The stabilizer arms 530 and 532 are controlled and actuated by a controller to lower down to the carcass to extend the stabilize clamping member 531 and 533 to engage and grasp the coracoid bone, SEE FIG. 5H, which is the main bone structure that extends from the shoulder to the top of the sternum and the stabilizer clamps 531 and 533 grasp the left and right coracoid bone structures. The coracoid is a stout strong bone that connects the cranial edge of the sternum to the shoulder joint complex. It opposes the powerful contraction of the major pectoral muscle during the down-stroke of the wing. The two clamps 531 and 533 extend into and through an incision in the breast meat made by a knife implement controlled to make the incision during the cutting process and the clamps are controlled by a controller and actuated grab the left and right coracoid bone structures. As shown, the clamps are configured with a bend such that the clamps can extend around the outside of the coracoid bone structure, between the coracoid bone structure and the scapula, and clamp inward. However, for one implementation the clamps can be configured with a bend opposite that shown in the figure such that the clamp can extend with an inside path between the pulley bones and the opposing side of the coracoid bone structure, and then clamp outward to grasp the coracoid bone structure. The pulley bones are the left and right clavicle bones that extend adjacent the left and right coracoid bones respectively. Grasping the coracoid bone structure assists in anchoring the carcass when pulling away the breast portion so that the breast portion can be pulled away cleanly.

The grasping talon implements 524 and 526 are lowered to grasp the poultry item in the wing area illustrated by item 536 by controlling the robotic arm with the controller to position the talon implements, and the controller actuates the clamping members 525 and 527 to pivot and pinch the wings between the talon implements and the clamping members. The robotic arm then traverses the talons away from the carcass in a direction as illustrated by arrow 537 to thereby pull the breast meat from the carcass. This pulling action separates the meat from the carcass frame. The wing portions can then be separated from the breast portions.

Another implementation of a stabilizer system is illustrated in FIGS. 5I through 5L, where the clamps are configured with a bend opposite that shown in FIGS. 5E through 5G such that the clamps can extend with an inside path between the pulley bones from the opposing side of the coracoid bone structure, and then clamp outward to grasp the coracoid bone structure. Grasping the coracoid bone structure assists in anchoring the carcass when pulling away the breast portion so that the breast portion can be pulled away cleanly. Prior pulling the breast portion away from the carcass, a stabilizing system 542 captures the carcass behind the shoulder joint on either side of the cervical vertebrae with stabilizer arms 556 and 558. The stabilizing system 542 includes actuators that actuate the stabilizer arms 558 and 556 to rotate outwardly counter-clockwise and clockwise respectively to rotate and extend clamps 560 and 562 respectively to hook and hold the carcass by engaging the carcass behind the shoulder joint on either side of the cervical vertebrae.

The stabilizer arms 558 and 556 are controlled and actuated by a controller to lower down to the carcass to extend the stabilize clamping members 560 and 562 to engage and grasp the coracoid bone, SEE FIG. 5H, which is the main bone structure that extends from the shoulder to the top of the sternum and the stabilizer clamps 531 and 533 grasp the left and right coracoid bone structures. The coracoid is a stout strong bone that connects the cranial edge of the sternum to the shoulder joint complex. It opposes the powerful contraction of the major pectoral muscle during the down-stroke of the wing. The two clamps 560 and 562 extend into and through an incision in the breast meat made by a knife implement controlled to make the incision during the cutting process and the clamps are controlled by a controller and actuated grab the left and right coracoid bone structures.

As shown, the clamps are configured with a bend such that the clamps can extend with an inside path between the pulley bones from the opposing side of the coracoid bone structure, and then clamp outward to grasp the coracoid bone structure. Grasping the coracoid bone structure assists in anchoring the carcass when pulling away the breast portion so that the breast portion can be pulled away cleanly. The stabilizer assembly 542, includes a stabilizer arm assembly 546 and a base assembly 544. The stabilizer arm assembly 546 and the base assembly 544 are pivotally connected by a hinge 548 such that the stabilizer arm assembly pivots with respect to the base assembly about the hinge in order to lower the stabilizer arms to a position to engage the product. The stabilizer arm assembly is shown in the stowed position in FIG. 5I and 5J. An actuator 550 is controllably actuated by a controller to cause the stabilizer arm assembly to pivot downward for engagement with a product. When lowered to the engagement position, the stabilizer arms 558 and 556 are actuated by an actuator 565 to rotate about bearings 554 and 552 respectively such that the stabilizer arms 558 and 556 to rotate outwardly counter-clockwise and clockwise respectively to rotate and extend clamps 560 and 562 respectively to hook and hold the carcass by engaging the carcass behind the shoulder joint on either side of the cervical vertebrae.

The actuator 565 is mounted to the stabilizing arm assembly 546 with an actuator bracket 564.

The grasping talon implements are lowered to grasp the poultry item in the wing area by controlling the robotic arm with the controller to position the talon implements, and the controller actuates the clamping members to pivot and pinch the wings between the talon implements and the clamping members. The robotic arm then traverses the talons away from the carcass to thereby pull the breast meat from the carcass. This pulling action separates the meat from the carcass frame. The wing portions can then be separated from the breast portions.

Figure 5K:
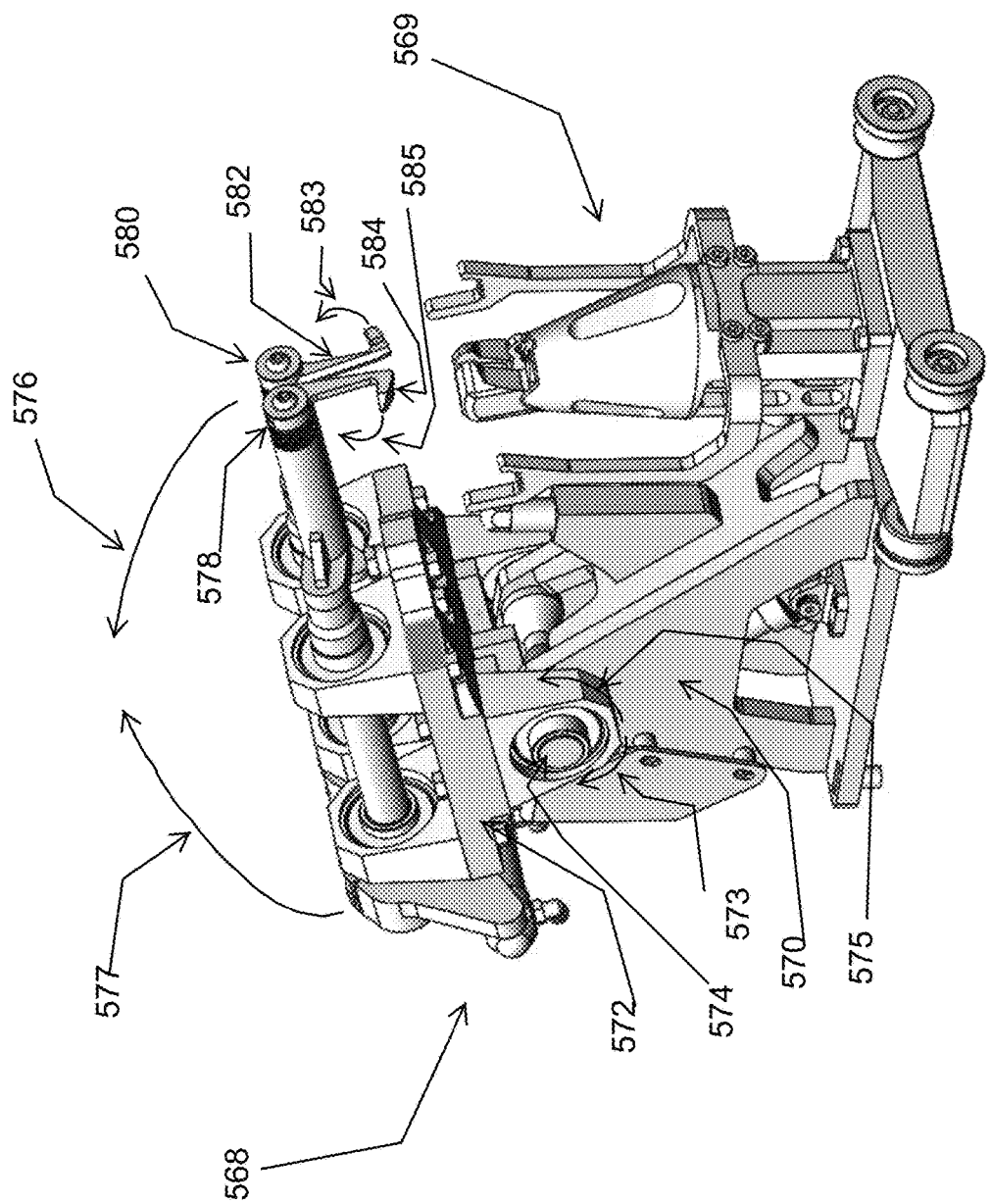
Figure 5L:
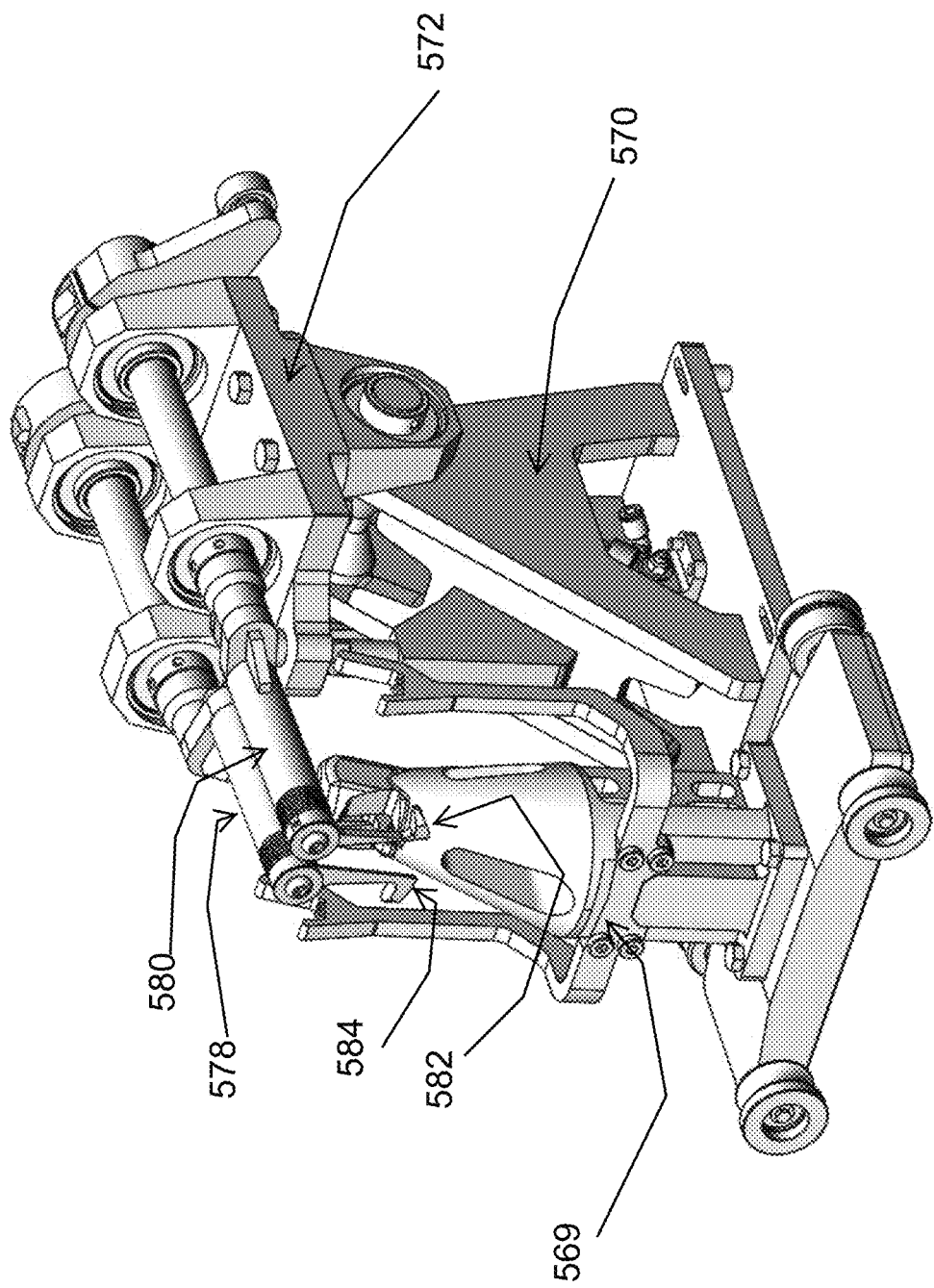
Figure 6A:
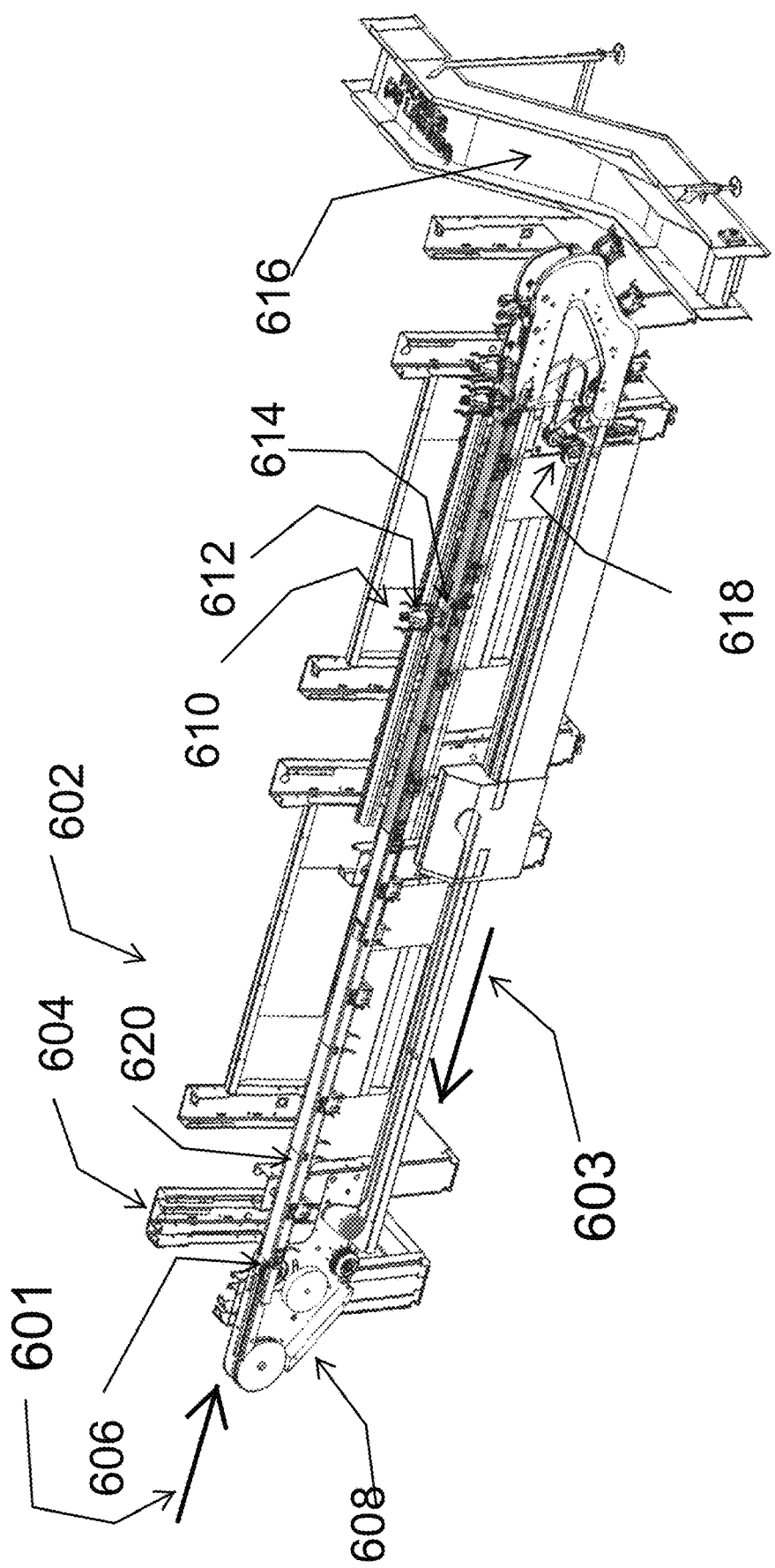
Figure 6B:
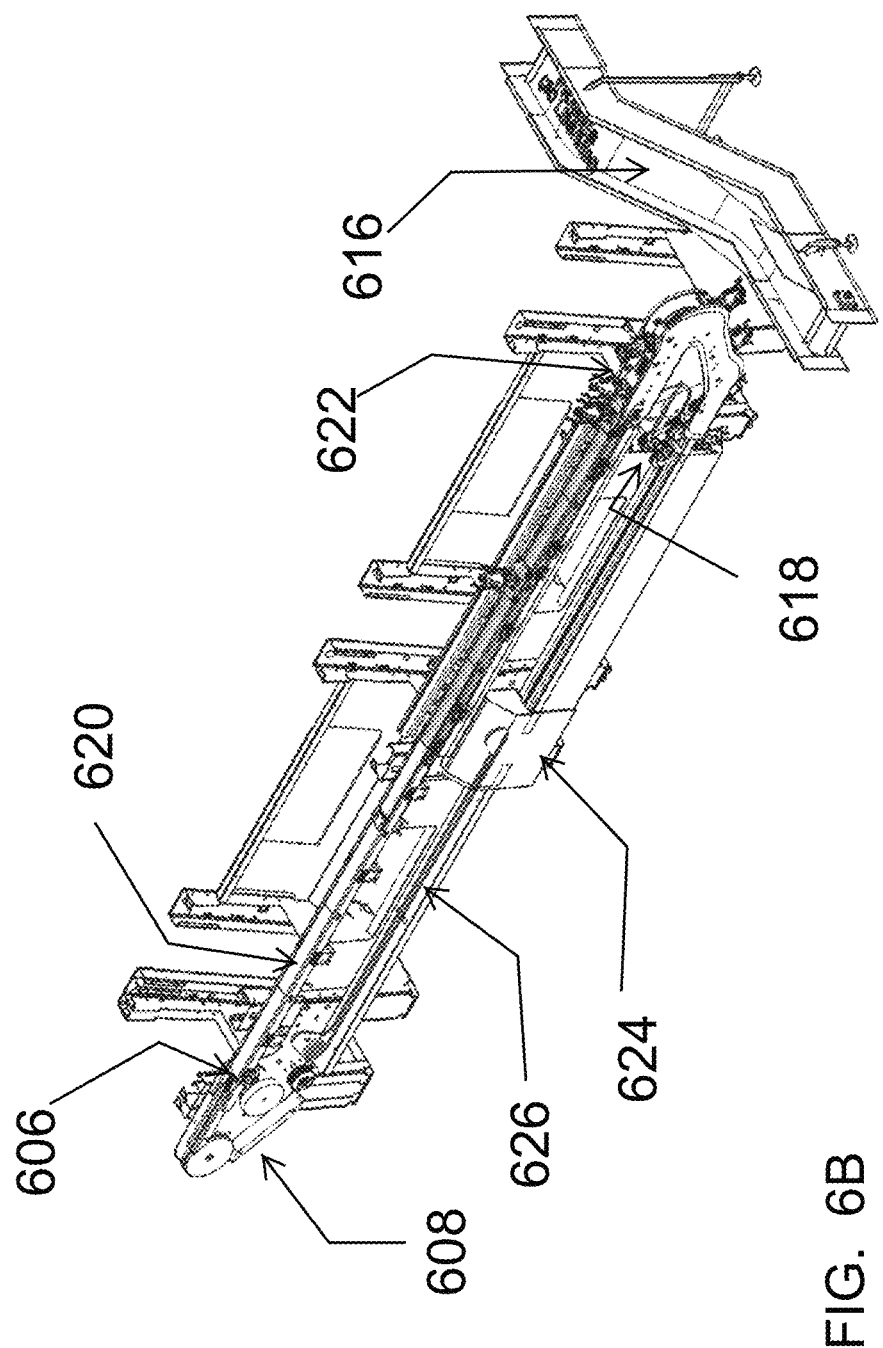
Figure 6C:
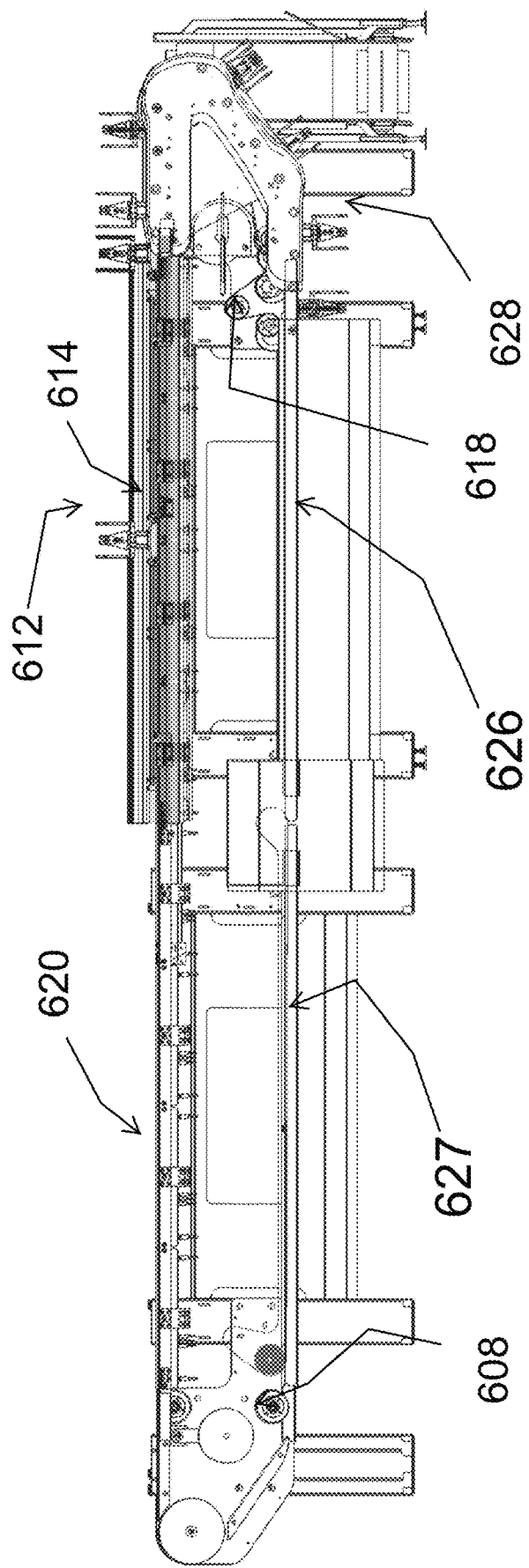
Figure 6D:
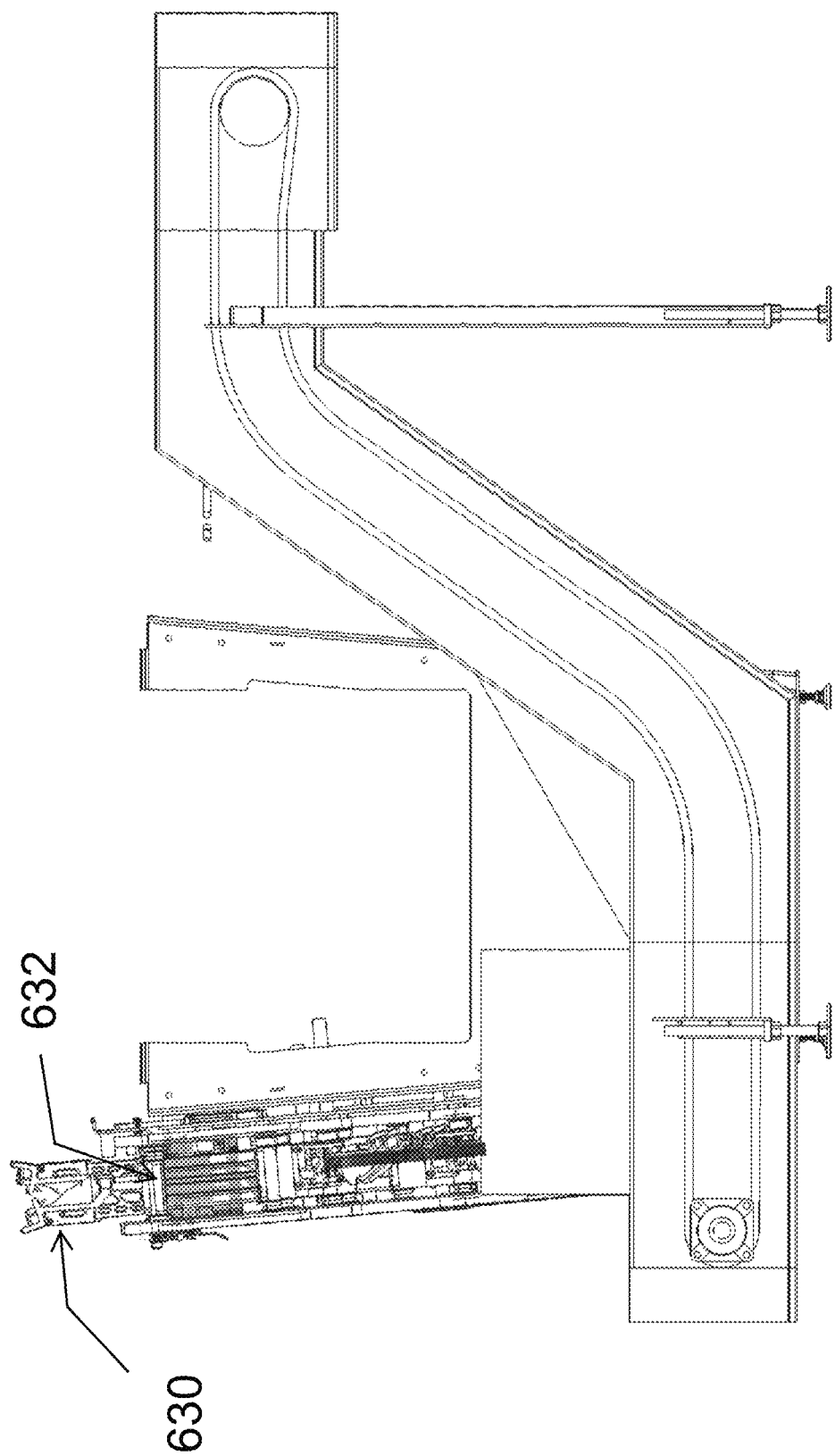
Figure 6E:
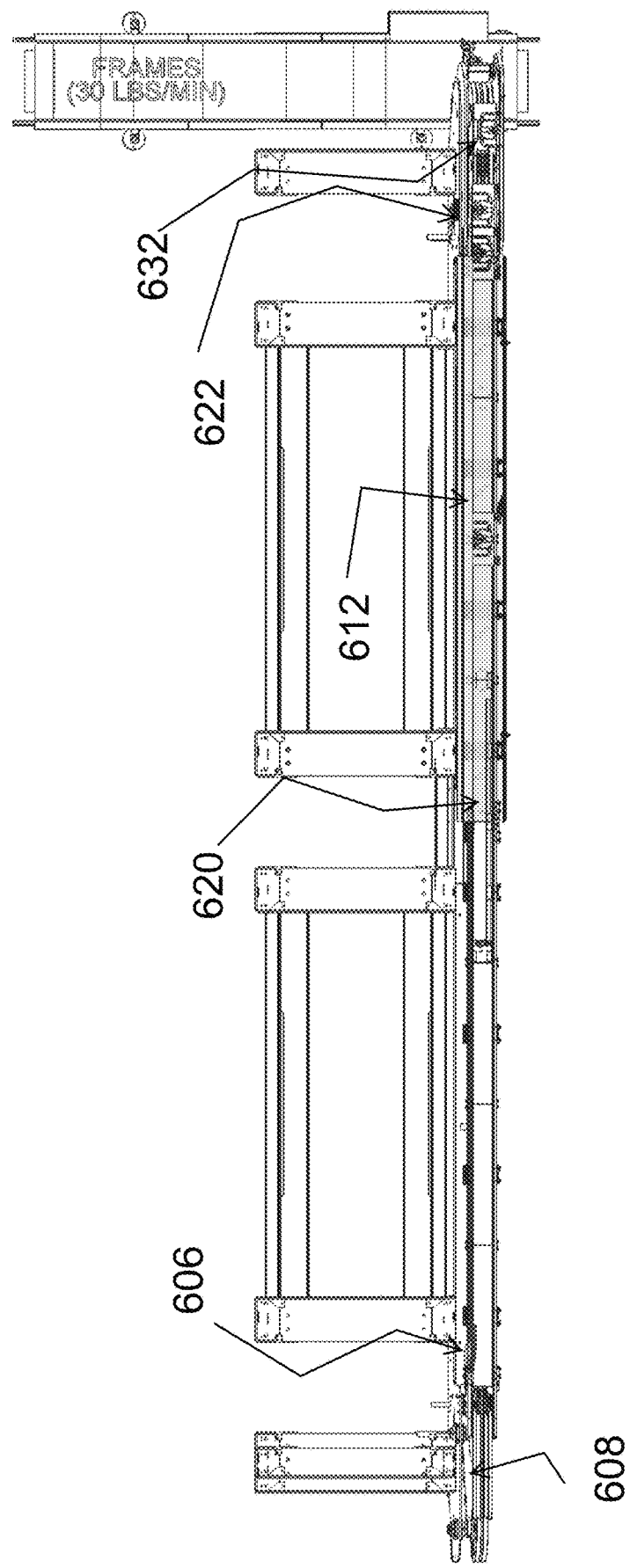
Figure 6F:
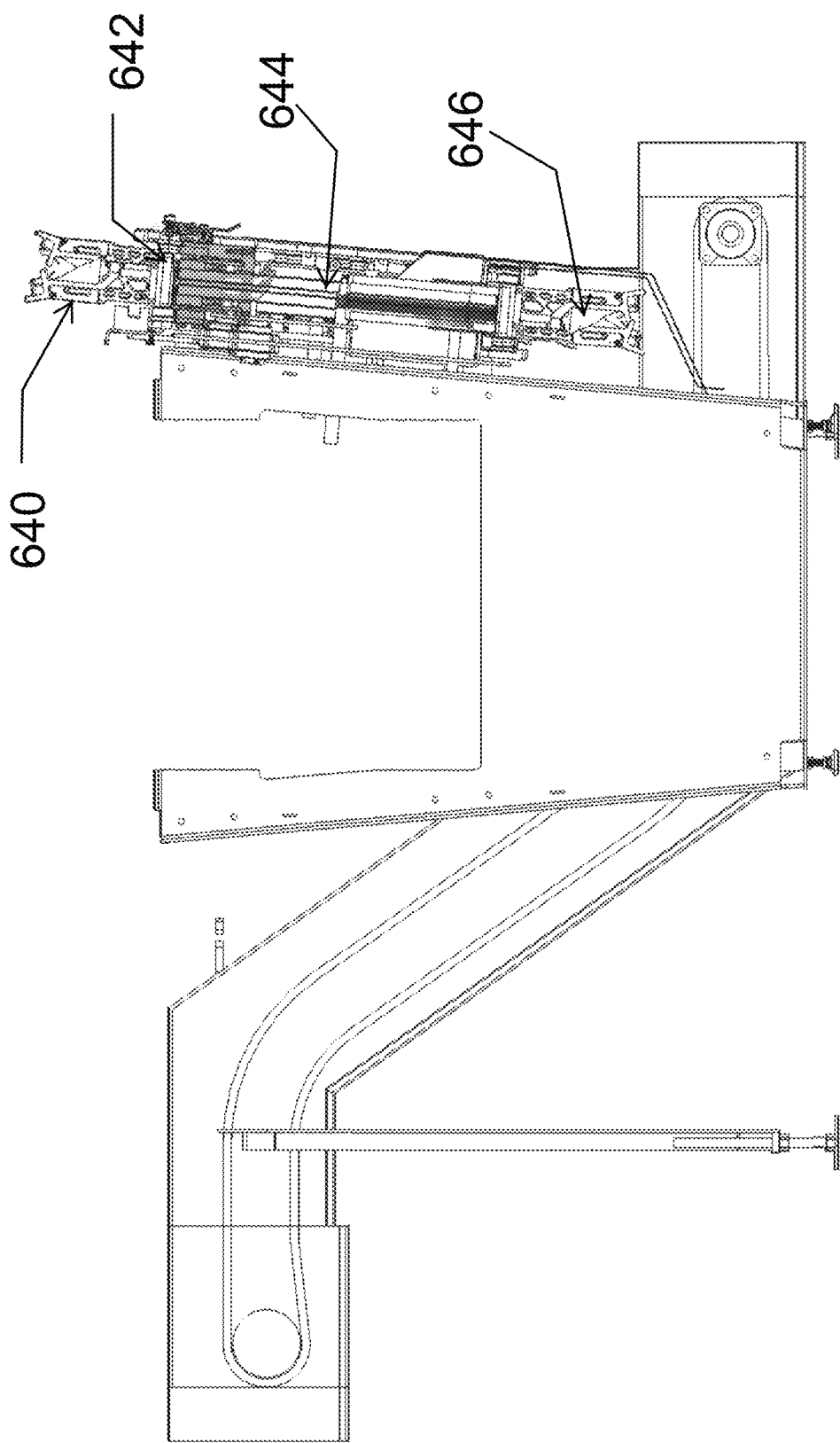
Figure 6G:
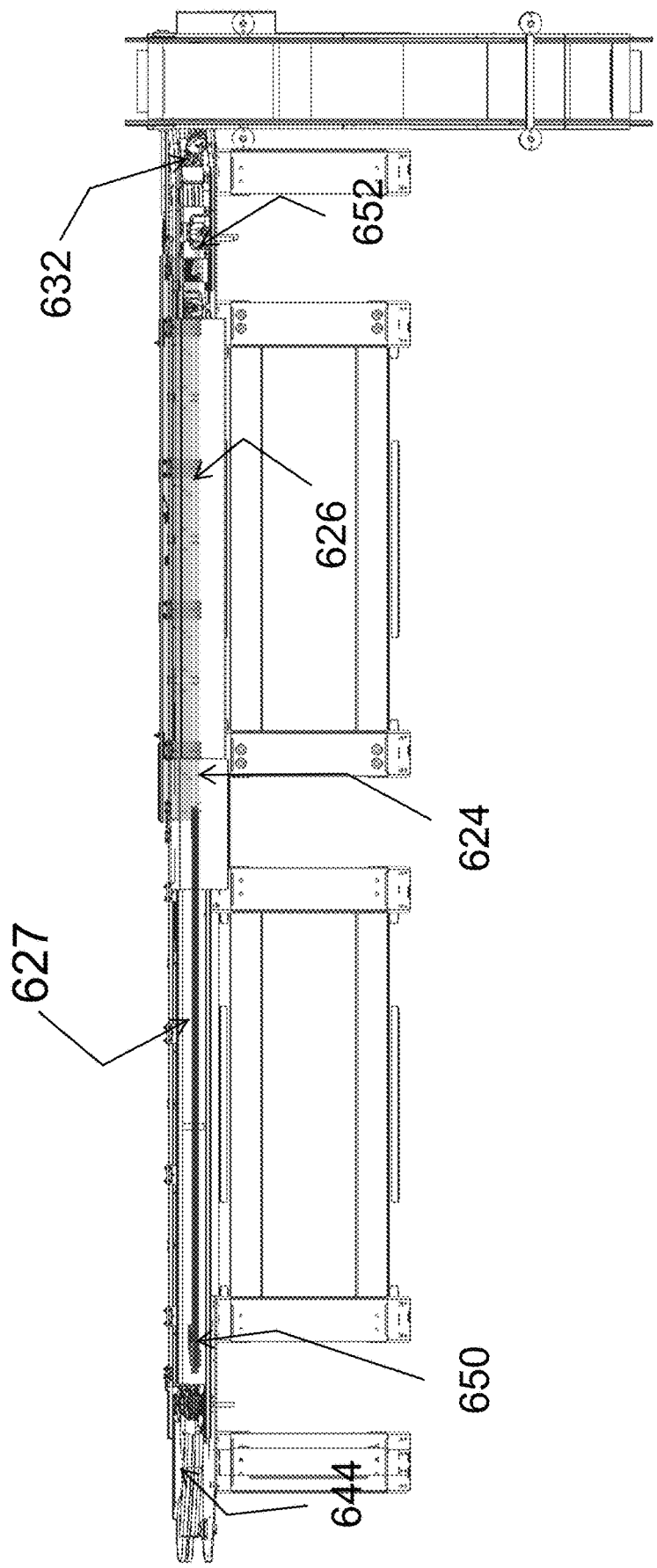
Figure 6H:
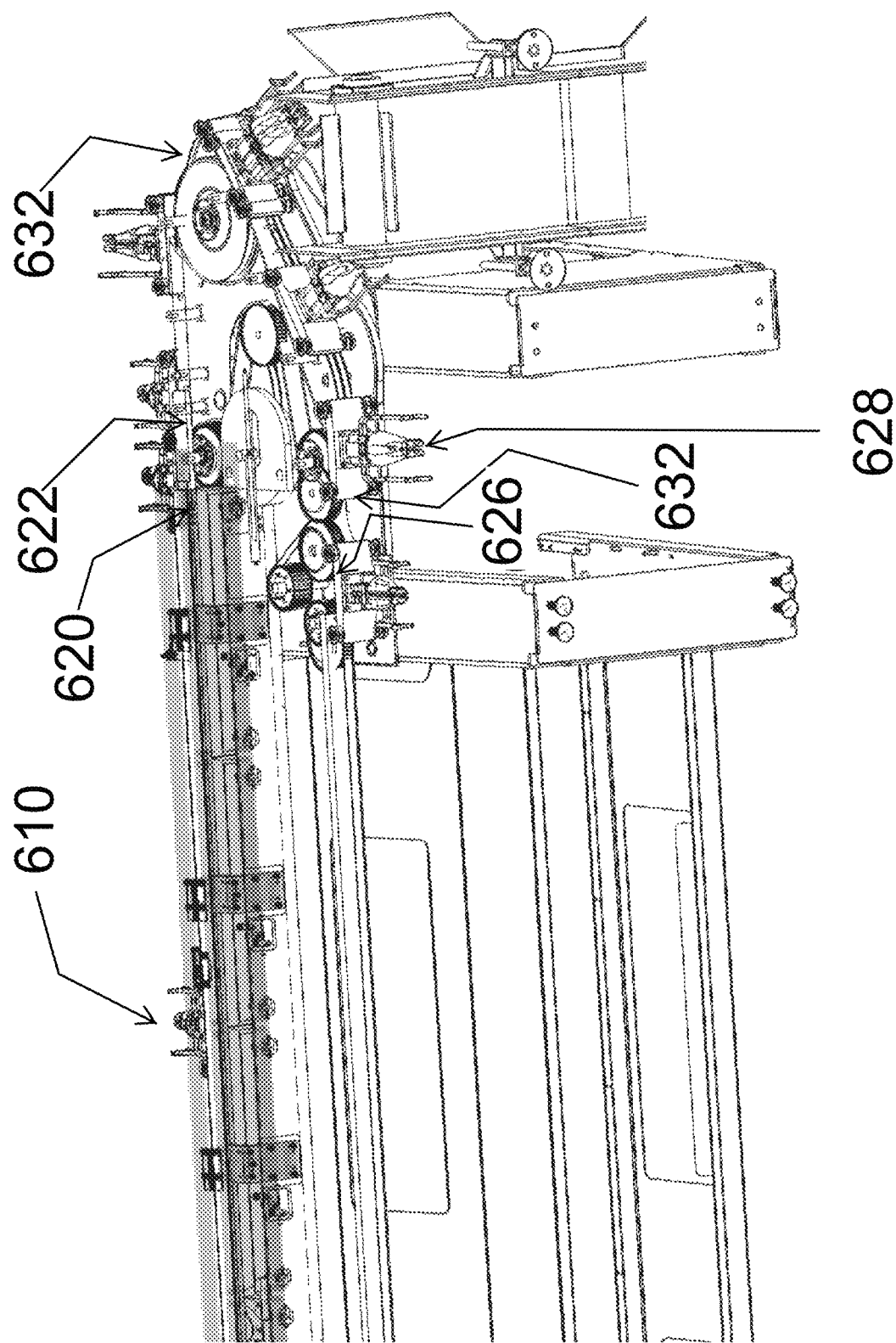
Figure 61:
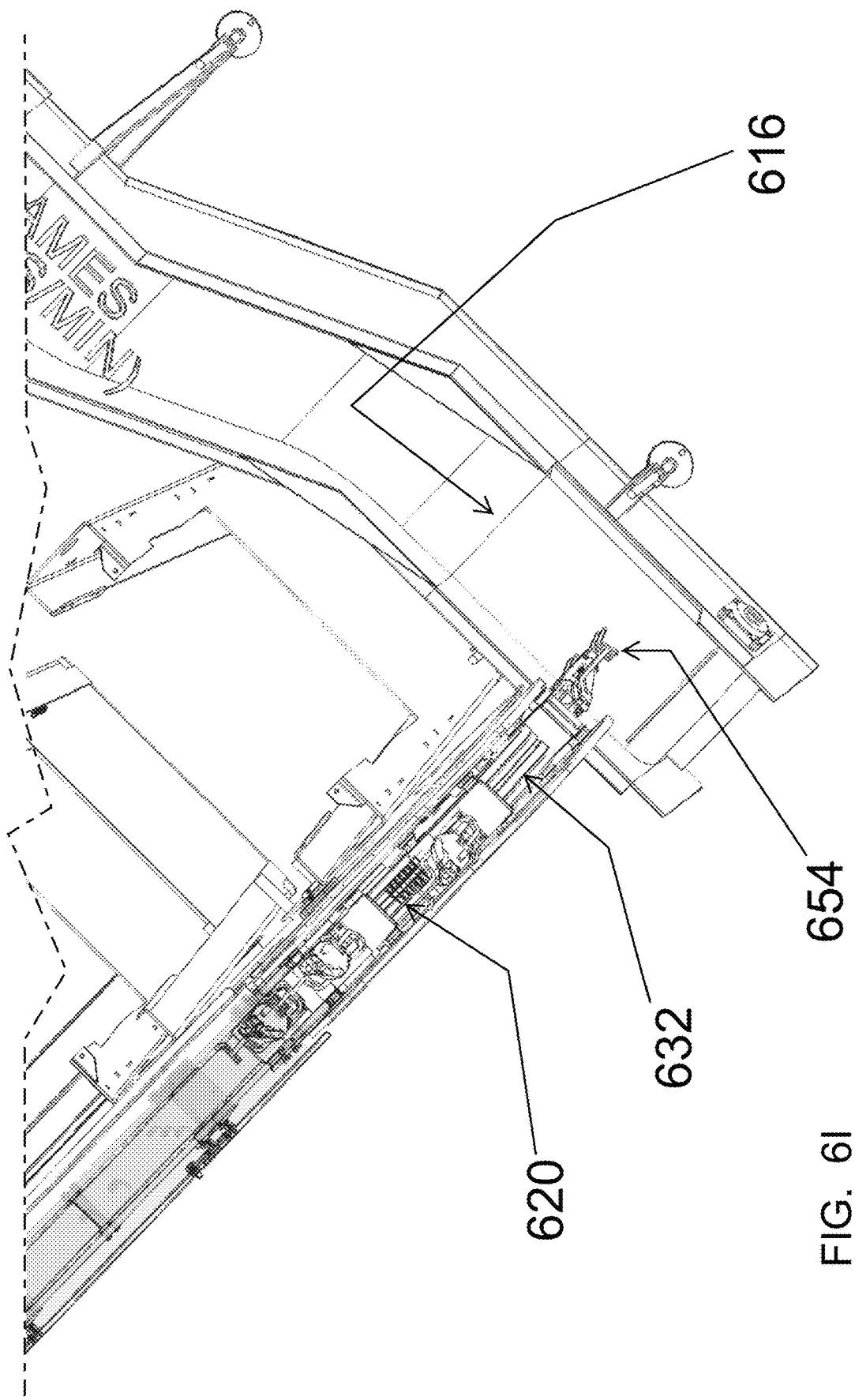

FIGS. 5K and 5L is another illustration of an implementation of a stabilizer assembly 568, with the stabilizer arm assembly rotated downward to the engage position. The stabilizer arm assembly 572 is pivoted downward about hinge 574 with respect to a base assembly 570 as illustrated by rotation indication arrows 577 and 573. The stabilizer assembly 572 is rotated downward such that the stabilizer arms 578 and 580 are positioned to engage a product item mounted on a carriage assembly 569. Once in the engage position, the stabilizer arms 578 and 580 are actuated to rotate clockwise and counter-clockwise respectively as illustrated by rotation arrows 585 and 583. Once the operation is complete, the stabilizer arm assembly is rotated back to a stowed position as illustrated by rotation arrows 576 and 575. When lowered to the engagement position, the stabilizer arms 578 and 580 are actuated by an actuator to rotate about bearings such that the stabilizer arms 578 and 580 to rotate outwardly counter-clockwise and clockwise respectively to rotate and extend clamps 582 and 584 respectively, as indicated by arrows 585 and 583 to hook and hold the carcass by engaging the carcass behind the shoulder joint on either side of the cervical vertebrae thereby moving the clamp mechanism into the crop cavity and the clamp then extends outward to secure the coracoid bone.

Referring to FIGS. 6A through 6I, a combination linear and magnetic carriage track conveyor system 602 is illustrated. For one implementation of the conveyor system 602 mounted on a rack 604, as illustrated, includes a combination of a precision linear track conveyor 620 and various magnetic based track conveyors configured to convey a carriage apparatus 610 along a path of conveyance extending adjacent a plurality of debone stations. The carriage apparatus 610, for one implementation includes a carriage base 614 with wheels and a poultry cone mount 612. The carriage base and wheels are configured to be conveyed by a linear track conveyor 620. One implementation of the carriage base includes a magnet array for engaging ferrous material in the various magnetic based track conveyors of the conveyor system 602.

For one implementation, the magnet array is disposed on the bottom side of the carriage base 614 that is attracted due to magnetic forces to the conveyor belt of one or more of the various magnetic based track conveyors where the belt that runs on this pulley system and contains ferrous material to thereby result in magnetic attraction forces between the magnet array and the belt. For one implementation the belt has an embedded steel cabling or other ferrous material cabling that then attracts to magnet array disposed on the bottom of the carrier as caused by the magnetic attraction force of the magnets. A carriage transfers from the linear motor track conveyor 620 extending along the top run of conveyor system, which extends adjacent the cutting stations, over to the magnetic based belt containing ferrous material extending along the bottom run of the conveyor system and then back to the linear motor track conveyor.

There is an entry end magnetic based transfer conveyor 608 that transfers a carriage apparatus back onto the linear track conveyor 620 at a transition point 606 and an exit end magnetic based transfer conveyor 618 that receives a carriage apparatus being transferred off the linear track conveyor. Any poultry item mounted on a cone mount of the carriage apparatus downstream of the debone stations is discharge to a discharge conveyor 616 as the carriage apparatus traverses around the exit end transfer conveyor 618 from the top run of the conveyor to the bottom return run of the conveyor. For one implementation a carriage apparatus 610 having a poultry item mounted thereon is carried on the top run along a path of conveyance as illustrated by directional arrow 601, where the path of conveyance extends adjacent the cutting stations. For one implementation a carriage is returned to the entry end on the lower run of the conveyor, where the lower run extends along a reverse path of conveyance as illustrated by directional arrow 603.

For one implementation, the transfer between the linear track conveyor and the magnetic based conveyor occurs proximate the end of the top run of the conveyor, where the magnetic attraction forces between the magnet array of the carriage and the ferrous material in an exit end transfer belt, cause the exit end transfer belt to grab the carriage at a transition position 622, which carries a carriage 630 with belt 632 around the exit end transfer end down to the bottom run 652 of the conveyor. For one implementation of the conveyor system, the exit end transfer belt transitions the carriage to a first phase belt 627 extending along a first portion of the lower run. Similarly for this implementation, the magnetic attraction forces between the magnet array of the carriage and the ferrous material in a first phase belt, cause the first phase belt to grab the carriage at a transition position and carry the carriage along a portion of the bottom return run back toward the entry end.

For one implementation, the first phase belt transfers the carriage to a second phase belt, where, again, the magnetic attraction forces between the magnet array of the carriage and the ferrous material in a second phase belt 627, cause the second phase belt to grab the carriage at a transition position 624 and carry the carriage further along a portion of the bottom return run 626 back to the entry end. For one implementation, the second phase belt transfers a carriage apparatus 646 to an entry end transfer belt proximate position 650, where the magnetic attraction forces between the magnet array of the carriage and the ferrous material in an entry end transfer belt, cause the entry end transfer belt to grab the carriage and carry the carriage around the entry end transfer entry run up to the top run of the conveyor proximate position 606. For one implementation of the conveyor system, the entry end transfer belt 644 transitions the carriage 642 and mount 640 to the linear motor track belt conveyor extending along the top run. The linear motor track belt grabs the carriage and carries the carriage along the top run. For one implementation of the conveyor system 602, the exit end transfer belt conveyor 618 transfers a carriage 628 to the conveyor extending along the lower return run. As a carriage apparatus 654 transitions to the lower run, any item mounted thereon is discharged onto a discharge conveyor 616.

For the implementation illustrated, rather than having a top and bottom return run of an endless linear motor track belt be that of the more expensive linear track conveyor, where the speed and accuracy is not needed, which is on the bottom return run, the return run portion is replaced by a less expensive magnetic belt. When a carriage gets to the end of the linear conveyer, this magnetic based belt just picks up that carrier and takes it on to return it to the entry end to transfer it back to the linear conveyor. Where the system doesn't need the accuracy and the speed and the benefits of the linear motor conveyor and the associated cost, as when the carriages traverse the cutting stations, the system uses the magnetic conveyor.

Also by transferring from a first phase to a second phase on the bottom run the conveyor system can transfer from one section to another and have a belt with the same length on each section thereby avoiding a longer run of one belt and these belt sections are configure to be interchangeable, thereby allowing for one part on the shelf that's the same between each conveyor section, therefore, sections can be added as needed depending on the distance of the overall conveyor run. When the carriage transfers back onto the linear track belt from the magnetic based belt, the linear track conveyor is functionally configured to adjust the position and speed of each carriage with respect to other carriages being conveyed concurrently somewhere along the top run. The PLC controlled linear motor conveyor is smart such that once it sees the carriage, it just picks it up and gets the carriage into the queue, position and speed where it needs to be.

A carriage can stay in that same orientation relative to the other carriers once it comes onto the magnetic conveyor belt portion of the system. The pitch does not have to change once it comes onto the magnetic based conveyor on either end of the conveyor system and extending along the bottom run. The linear motor conveyor in one implementation is PLC controlled to change pitch or distance between carriages, and the controller is configured to catch one carriage up to the one immediately in front of it if needed to maintain the desired pitch between the carriages or get it set at a certain rate of velocity as it's been defined in the controller as to what is needed to do and where on the conveyor. On the return run the conical mount and the carriage can be cleaned and sanitized.

Figure 7A:
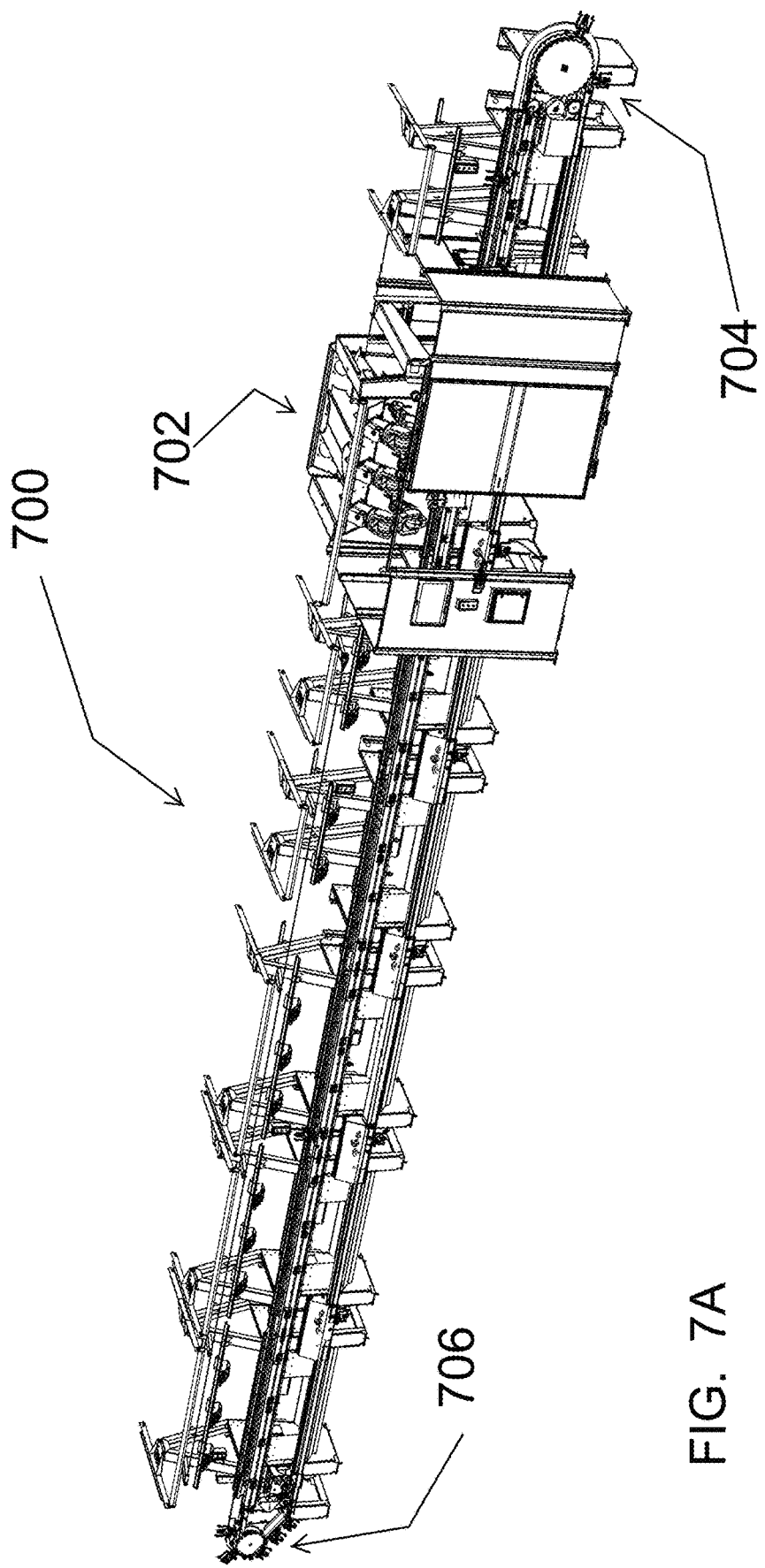
Figure 7B:
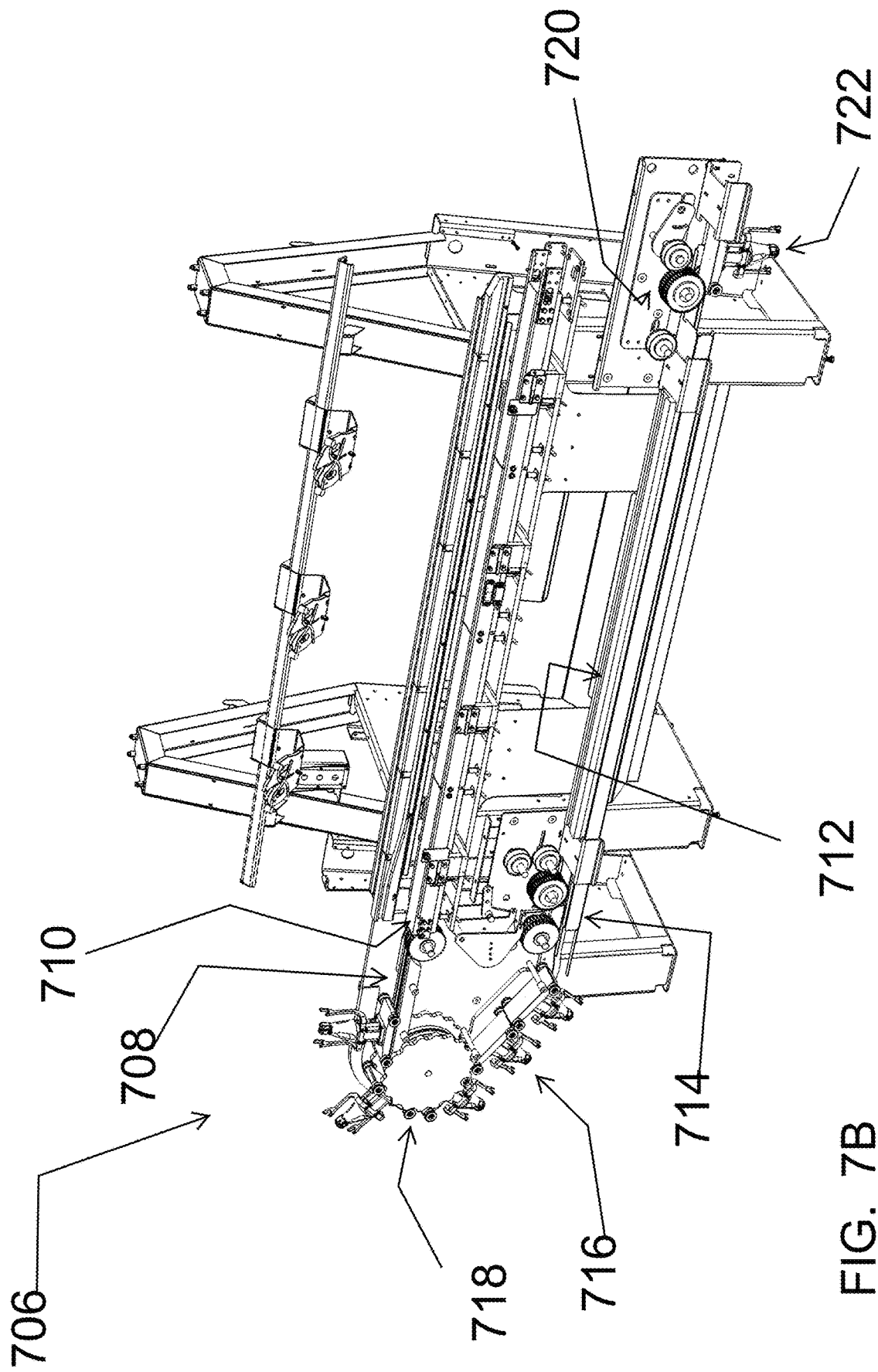
Figure 7C:
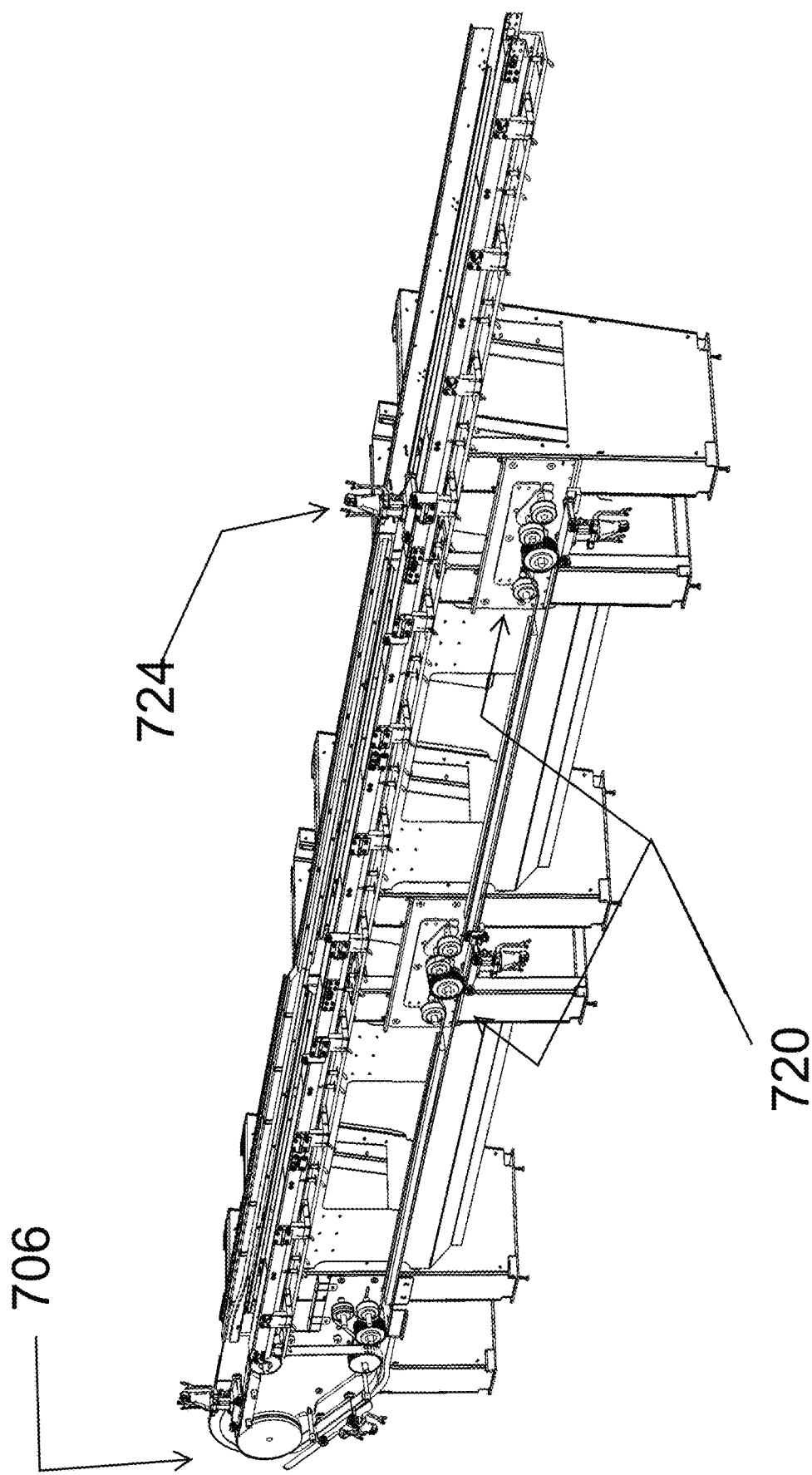

Referring to FIGS. 7A through 7I, a processing line 700 is illustrated. This particular processing line includes a poultry debone station 702 configured to remove the breast portion of a poultry item from the carcass. The processing line 700 includes an entry end 706 and an exit end 704. Each debone station 702 is configured with multiple robotic cutting arms and cutting implements. Carriage assemblies including a jig mount with a poultry item mounted thereon are conveyed along the processing line 700 to a debone station 702, were the debone operation is performed. FIG. 7B illustrates an entry end 706 of the processing line. The entry end of the processing line is where a poultry item is mounted onto a carriage assembly. A carriage assembly 722 is conveyed along a return line of conveyance along a bottom return run. The lower run of the return conveyor 712 carries a carriage assembly 722 through multiple intermediate lower run conveyance sections 720 to a transfer return conveyor 714, which transitions a carriage assembly 716 to a conveyor return tail pulley 718 and conveyor return belt 708, which transitions a carriage assembly back to the top run conveyor track 710. A carriage assembly 724 then has a poultry item mounted thereon and is conveyed along the top run toward a debone station.

Figure 7D:
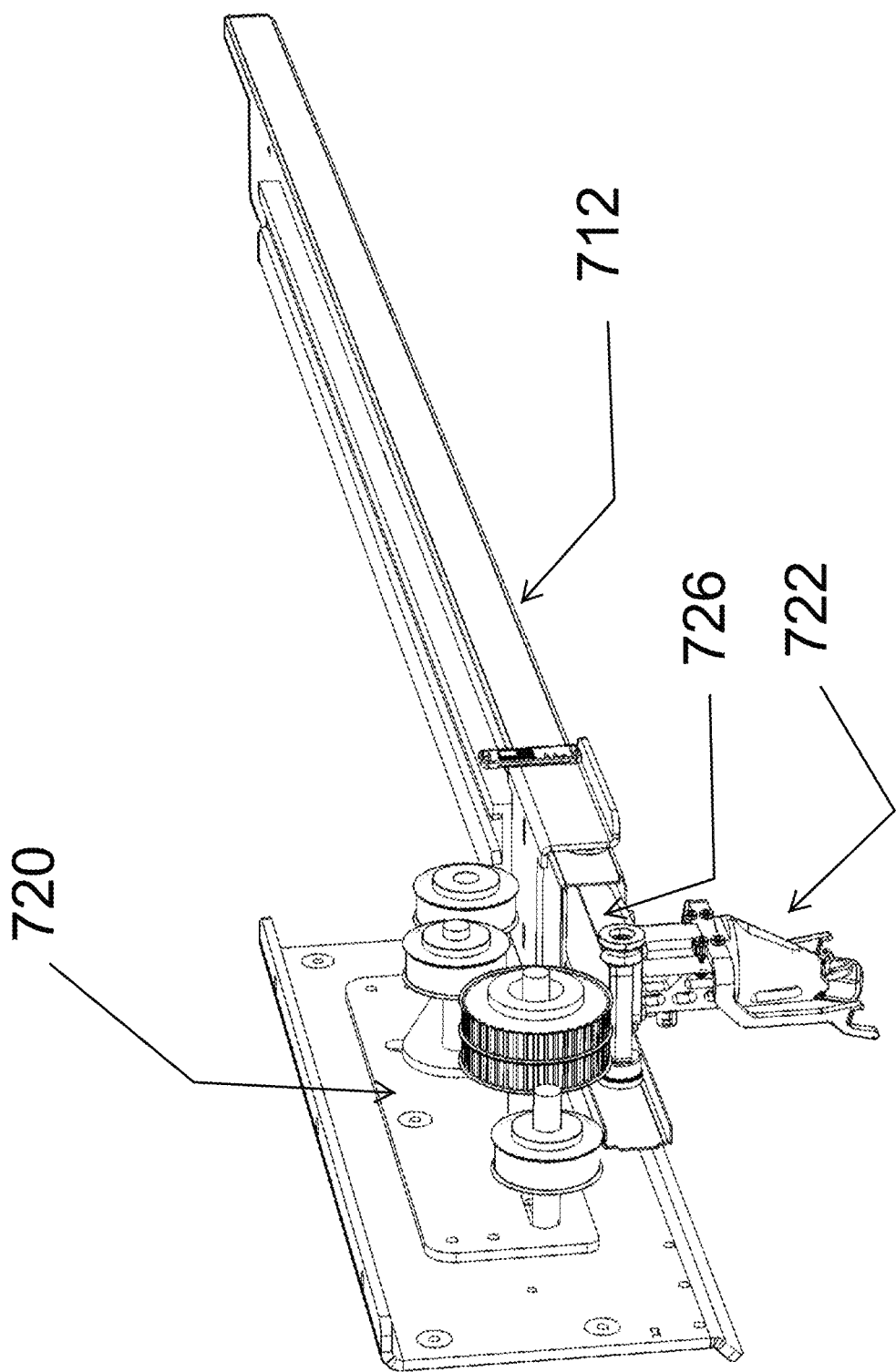
Figure 7E:
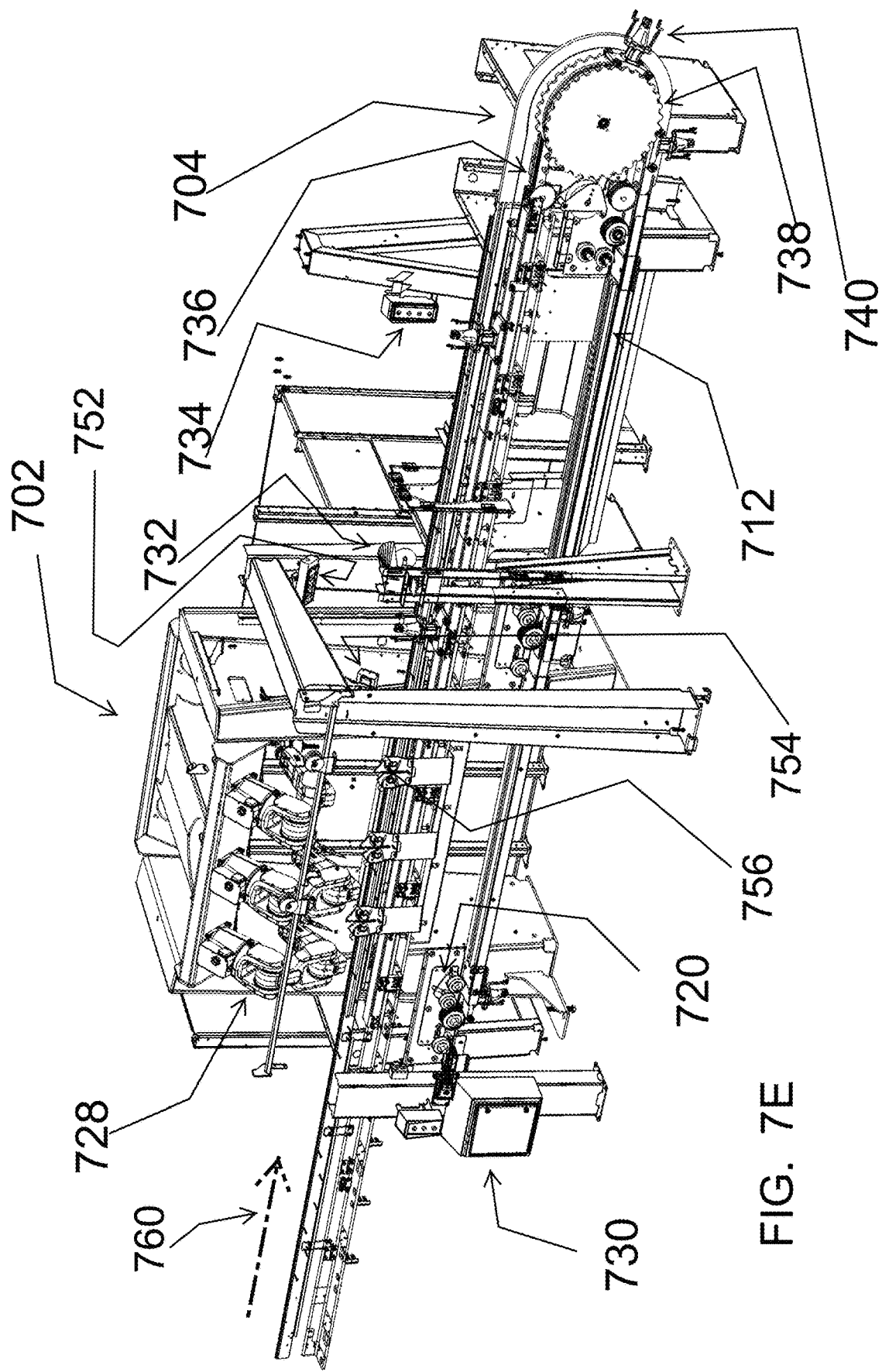

Referring to FIG. 7D, the lower run return conveyor includes multiple lower run conveyance sections 712 and multiple intermediate pulley sections 720, whereby a carriage assembly 726 is conveyed over the multiple sections along the return run. FIG. 7E, illustrates an exit end 704 of a process line including a debone station 702, which includes multiple robotic arms 728 for performing a shoulder cut operation on a poultry item.

One implementation of the conveyor system, as illustrated, includes a combination of a precision linear track conveyor and various magnetic based track conveyors configured to convey a carriage assembly along a path of conveyance 760 extending adjacent a plurality of debone stations 702. The debone stations include one or more robotic arms 728 with an ultrasonic blade implement for performing a debone cut. For one implementation, the debone station 702 includes one or more sharpener stations 756 for sharpening the blades of the ultrasonic blade implement. One implementation of a sharpener as shown is a pull-through blade sharpener for beveled edged blades. The robotic arm is controlled to periodically position the beveled edge of the blade of the ultrasonic blade implement in the valley of the sharpener formed by the opposing sharpening surfaces. The blade is pulled through the valley to re-edge the blade. The carriage, for one implementation includes a carriage base with wheels and a poultry cone mount. The carriage base and wheels are configured to be conveyed by a linear track conveyor extending along the top run. One implementation of the carriage base includes a magnet array for engaging ferrous material in the various magnetic based track conveyors of the conveyor system.

For one implementation, the magnet array is disposed on the bottom side of the carriage base that is attracted due to magnetic forces to the conveyor belt of one or more of the various magnetic based track conveyors where the belt that runs on this pulley system and where the belt contains ferrous material to thereby result in magnetic attraction forces between the magnet array and the belt. For one implementation the belt has an embedded steel cabling or other ferrous material cabling that then attracts to magnet array disposed on the bottom of the carrier as caused by the magnetic attraction force of the magnets. A carriage transfers from the linear motor track conveyor extending along the top run of conveyor system, which extends adjacent the cutting stations, over to a 180 degree turn belt, over to the magnetic based belt containing ferrous material extending along the bottom run of the conveyor system and then back to the linear motor track conveyor by way of another 180 degree turn belt.

For the implementation illustrated, rather than having a top and bottom return run of an endless linear motor track belt be that of the more expensive linear track conveyor, where the speed and accuracy is not needed on the bottom return run, the return run portion is replaced by a less expensive magnetic belt. When a carriage gets to the end of the linear conveyer, this magnetic based belt extending along the bottom return run just picks up that carrier and takes it on to return it to the entry end to transfer it back to the linear conveyor. The carriers are transferred to and from the bottom return run by exit end and entry end 180 degree turn belts. Where the system doesn't need the accuracy and the speed and the benefits of the linear motor conveyor and the associated cost, as when the carriages traverse the cutting stations, the system uses the simple and less expensive magnetic conveyor belt system along the bottom return run.

Also by transferring from a first phase to a second phase on the bottom run the conveyor system can transfer from one section to another and have a belt with the same length on each section thereby avoiding a longer run of one belt and these belt sections are configured to be interchangeable, thereby allowing for one part on the shelf that's the same between each conveyor section, and therefore, sections can be added or removed as needed depending on the distance of the overall conveyor run. When the carriage transfers back onto the linear track belt extending along the top run from the simple magnetic based belt, the linear track conveyor is functionally configured to adjust the position and speed of each carriage with respect to other carriages being conveyed concurrently somewhere along the top run. The PLC controlled linear motor conveyor is smart such that once it sees the carriage, it just picks it up and gets the carriage into the queue, position and speed where it needs to be.

For one implementation the process line includes sensors spaced along the line of conveyance configured to detect the position of an item being conveyed along the process line. For example sensors 752 and 754 are positioned on either side of the top run of the conveyor. The sensor type is one or more of a photoelectric sensor, a laser sensor or other appropriate sensor. The sensors provide position inputs to a controller, which uses the inputs to control the speed of conveyance and the distance maintained between carriage assemblies as they are being conveyed. The exit end 704 of the process line includes a conveyor return head pulley 738 and exit end belt 736 that is configured to transition a carriage from a top run to the bottom run 712. The process line includes one or more controller systems 730 configured to monitor and control the conveyance system and the debone station operation.

Figure 7F:
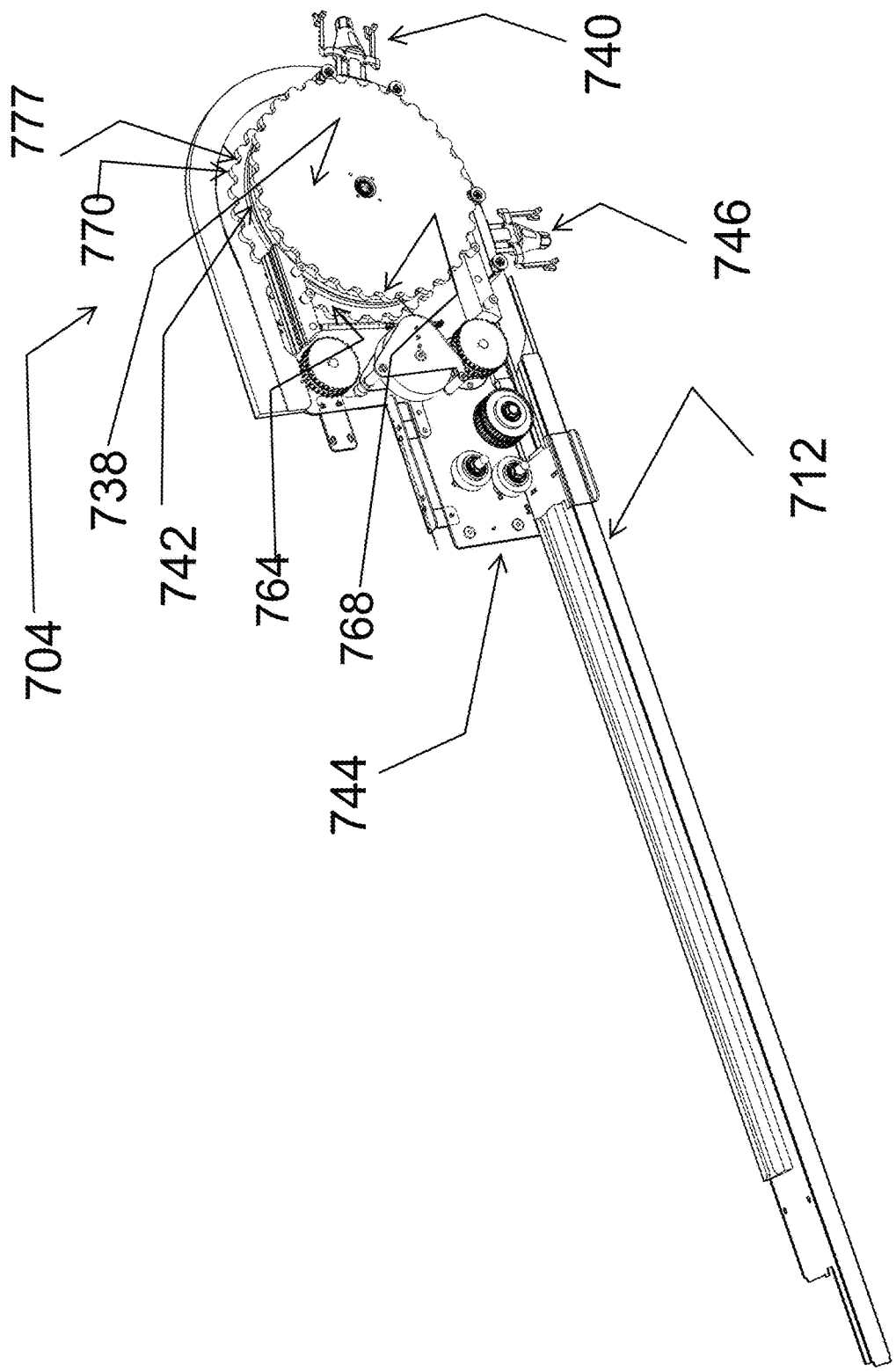
Figure 7G:
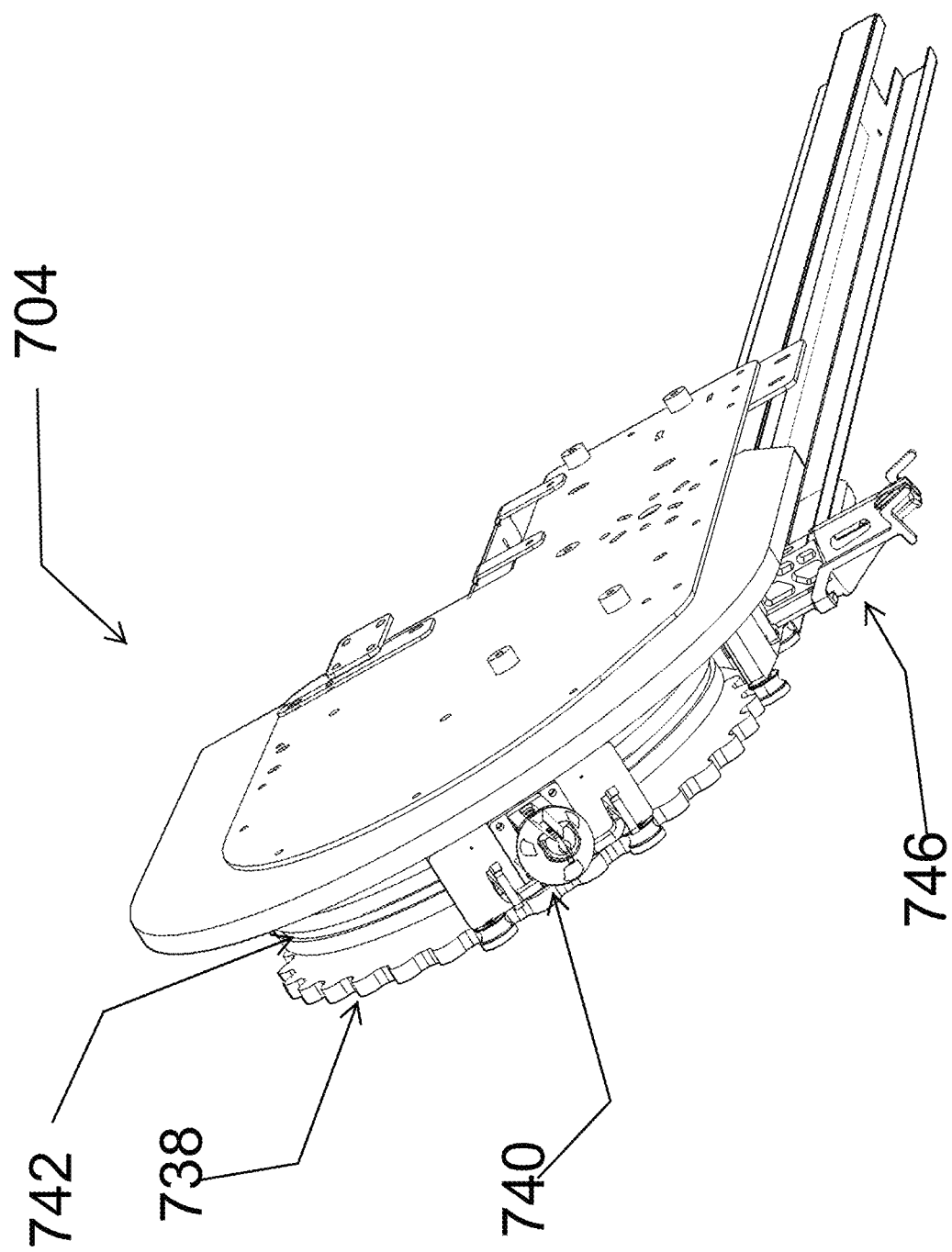

For one implementation, the cutting station 702 also includes a scoring blade 732. As illustrated, one implementation of a scoring blade includes a circular blade implement that is controllably positioned to score a product with an incision to facilitate removal of a desired portion of the item being operated on. As discussed herein, the implementation as illustrated is configured to score a poultry item mounted on a carriage assembly being conveyed, where the cut or incision performed by the circular blade is a cut that runs from the shoulder down towards the keel of the pulley bone. For one implementation of the process line, control switches 734 are placed at various positions along the process line where an operator can push to actuate one or more push buttons to start and stop the conveyor, or advance or reverse the conveyor. When a button is actuated by an operator, a control signal is transmitted to the controller 730, which will interpret the signal transmission and control the conveyor accordingly. FIG. 7F illustrates further detail of the exit end 704 of the process line, which includes the conveyor return head pulley 738 and an exit end belt 742 that is configured to transition carriages, as illustrated by items 740 and 746, from a top run to a bottom run 712.

Also illustrated is an intermediate pulley system 744 configured with a belt system for transitioning a carriage assembly from the top run to the conveyor return head pulley and exit belt, and further from the head pulley to the lower return run. For one implementation as illustrated, the return head pulley 738 and similarly the return tail pulley 718 are configured as a spool having opposing outer flanges 764 and 768, where each of the circumferential edges of the outer flanges include peaks 770 and valleys 777 where the pitch or frequency of the peaks and valleys are such that the circumferential tread surface of the wheels of the carriage assembly rest in the valleys of the outer flanges as the carriage assembly make the 180 degree turn to and from the top run of the conveyor system.

Figure 7H:
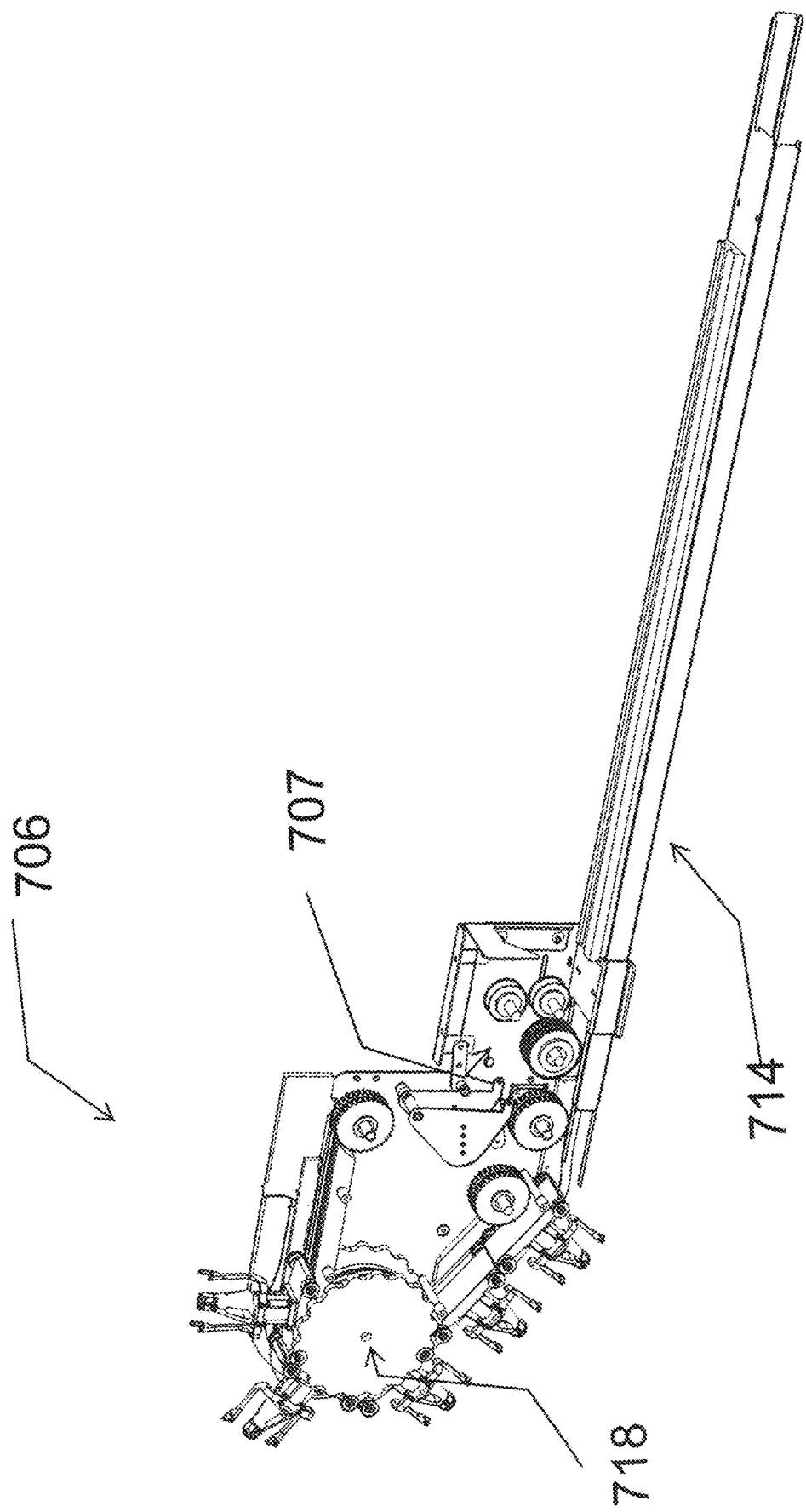
Figure 71:
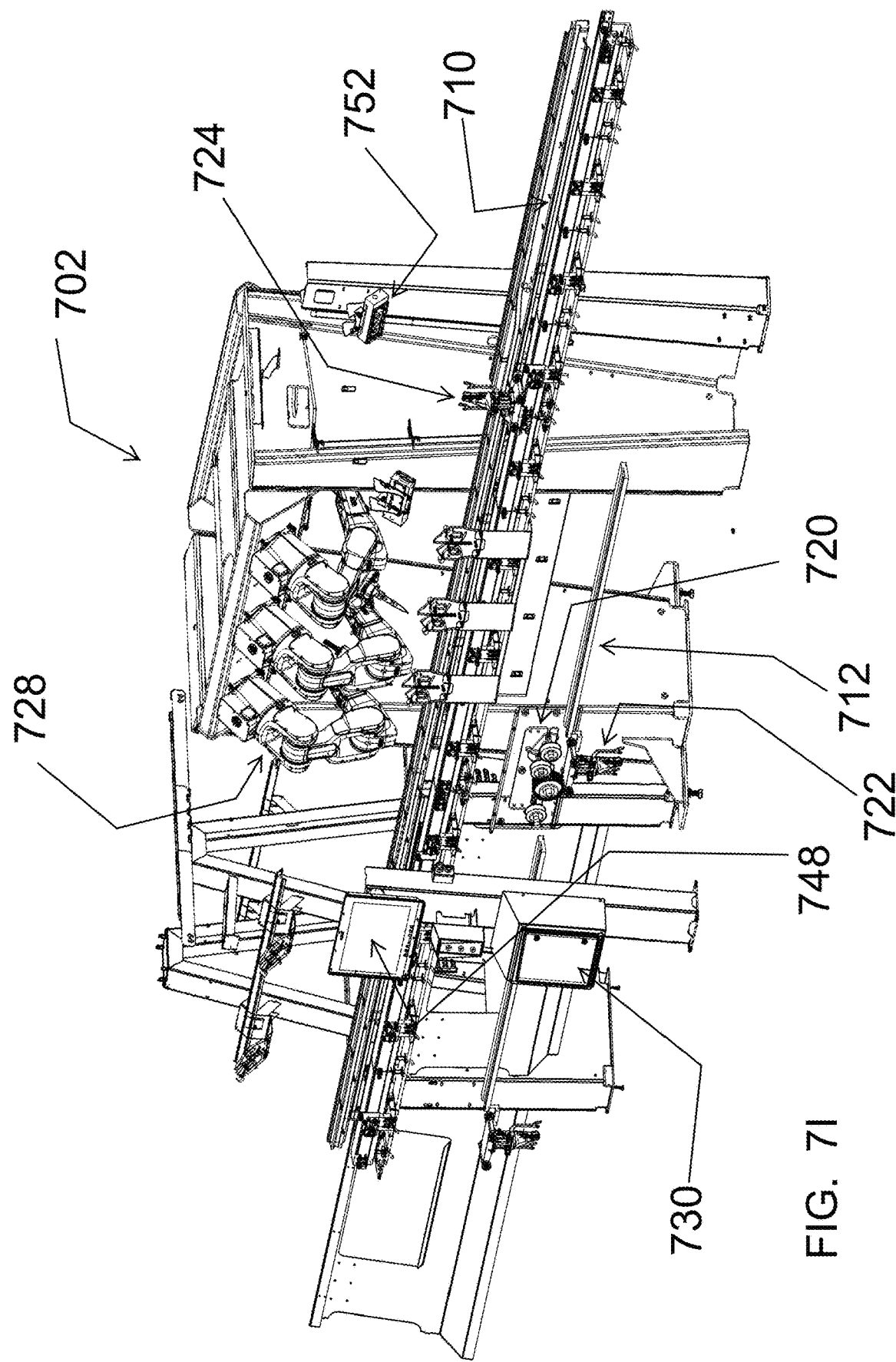

Referring to FIG. 7H, the entry end 706 of the process line includes a conveyor return tail pulley 718 and entry end belt 707 that is configured to transition a carriage from a bottom run to the top run. 712. The process line includes one or more controller systems 730 configured to monitor and control the conveyance system and the debone station operation. FIG. 7F illustrates further detail of the exit end 704 of the process line, which includes the conveyor return head pulley 738 and an exit end belt 742 that is configured to transition carriages, as illustrated by items 740 and 746, from a top run to a bottom run 712. Also illustrated is an intermediate pulley system 744 configured with a belt system for transitioning a carriage assembly from the top run to the conveyor return head pulley and exit belt, and further from the head pulley to the lower return run. FIG. 7I further illustrates the debone station 702 including the controller system 730 with interfacing display monitor 748.

Figure 8A:
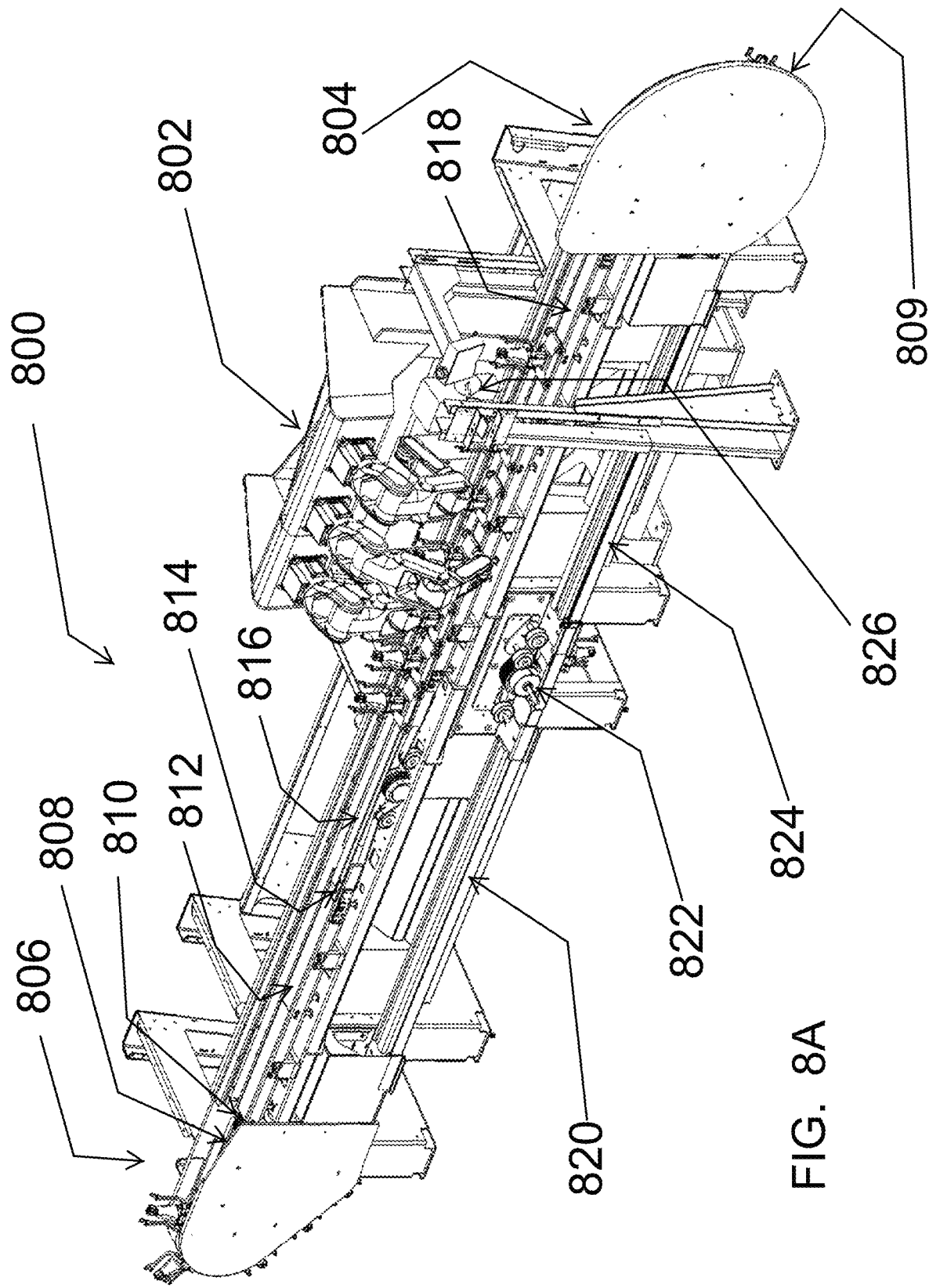
FIGS. 8A through 8C illustrate a further embodiment of a breast removal line.
Figure 8B:
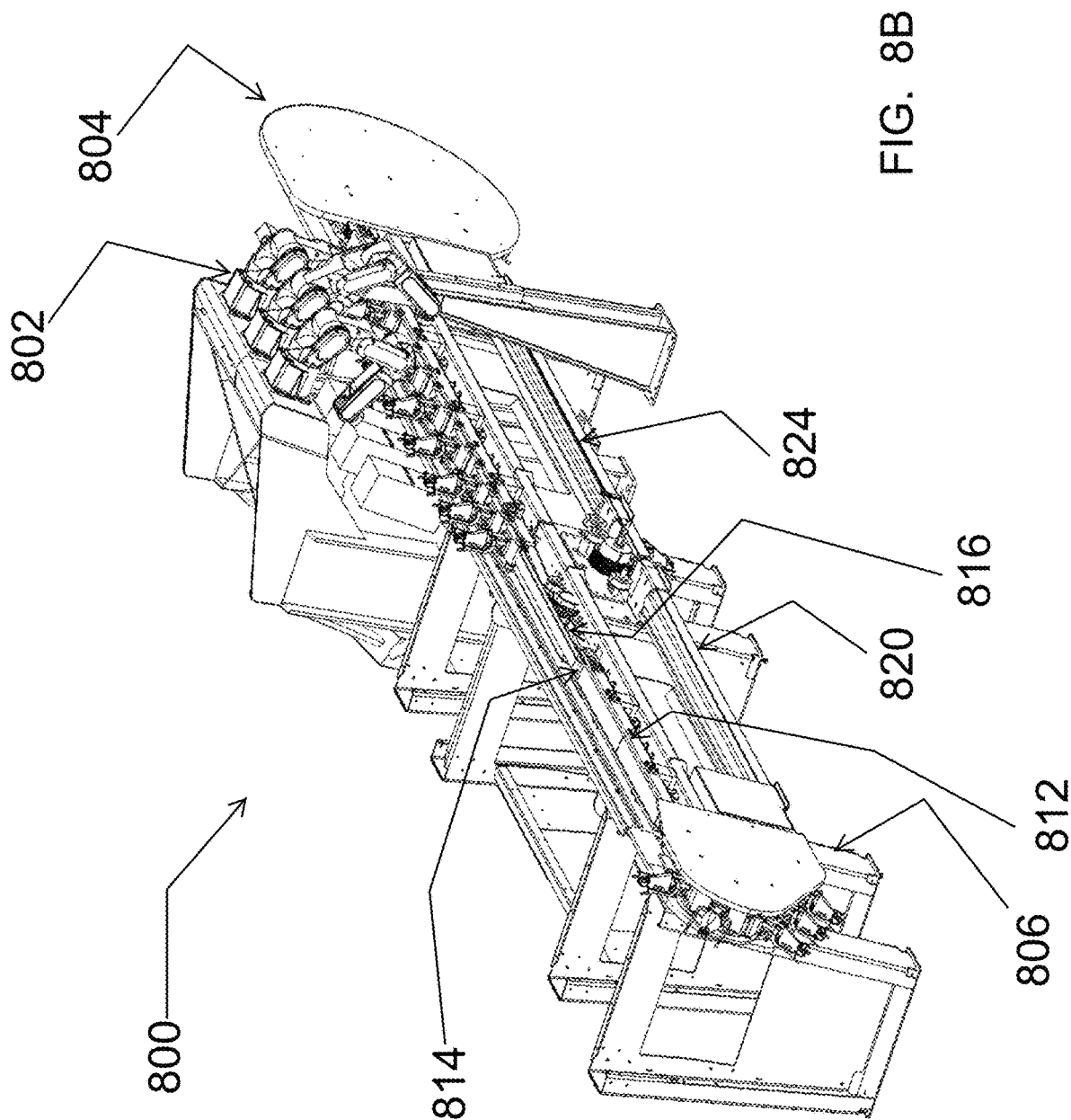
Figure 8C:
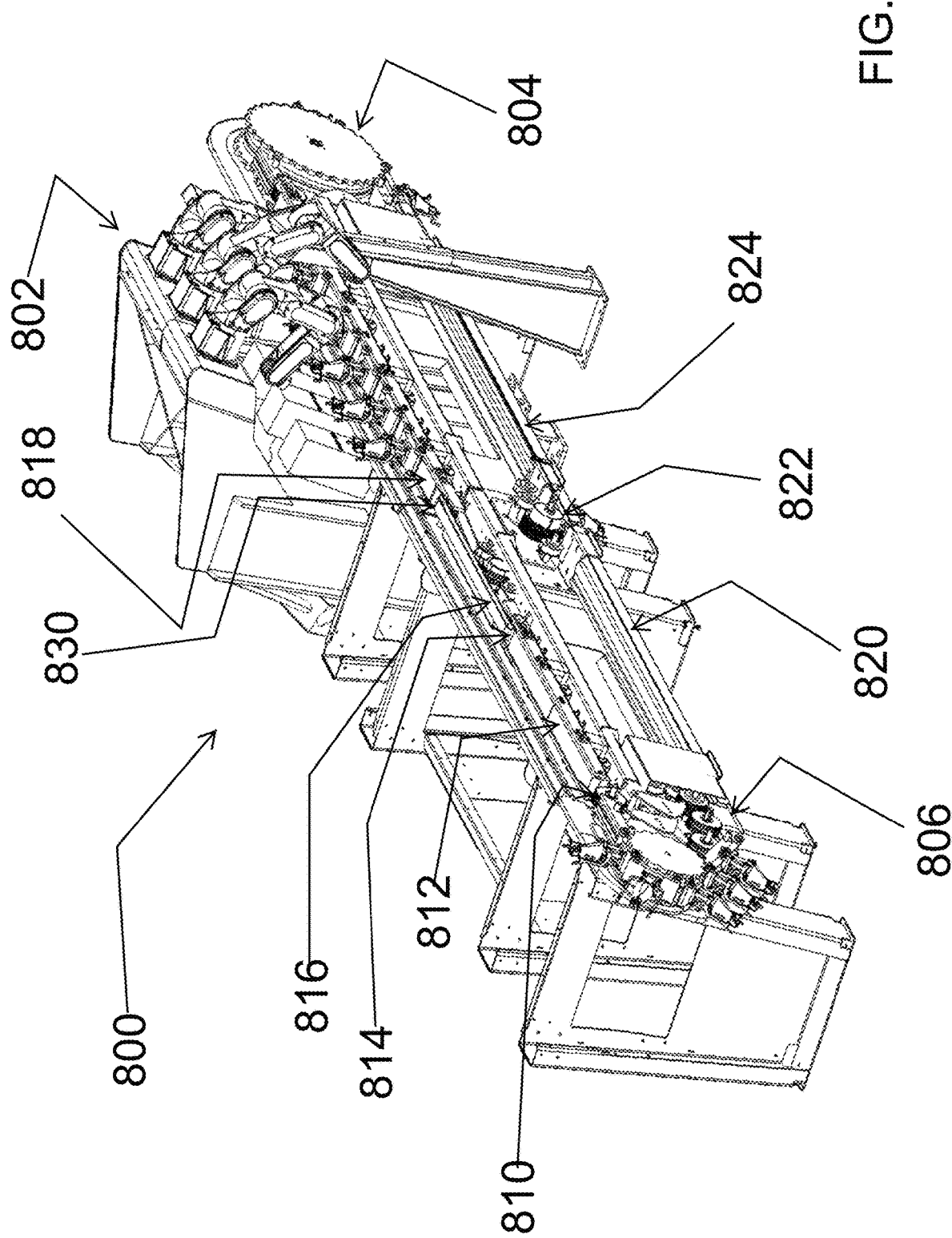

Referring to FIGS. 8A through 8C, a further implementation of a debone process line 800 is illustrated. As with other implementations disclosed herein, the implementation illustrated in FIG. 8 includes a debone cutting station 802, an entry end 806 and an exit end 804. The process line includes various conveyor components including an entry end 180 degree turn conveyor 808, which transitions carriages from the bottom run back to the top run of the conveyor system, and an exit end 180 degree turn conveyor 809, which transitions carriages from the top run to the bottom run of the conveyor system. The entry end turn conveyor 808 transitions carriages at a transition point 810 back to an initial entry end section 812 of the top run magnetic track conveyor. The exit end turn conveyor transitions carriages to the lower run conveyor belt. The magnetic track conveyor is controlled by a programmable controller to adjust the position and conveyance speed of each carriage and adjust and maintain the distance or pitch between carriages. For the implementation illustrated in FIGS. 8A through 8C, where accuracy is not needed the carriages are transition at a transition point 814 to less accurate magnetic belt conveyors 816, which extend along sections of the top run, between magnetic track conveyor sections 818 where more accuracy is needed as illustrated as carriages are conveyed along the path of conveyance adjacent a debone cutting station 802. Along the top run, carriages are transitioned at a transition point 830 from the less accurate magnetic belt 816 to the more accurate magnetic track conveyor 818. For one implementation, the debone cutting station 802, includes a scoring blade 826. As illustrated, one implementation of a scoring blade includes a circular blade implement that is controllably positioned to score a product with an incision to facilitate removal of a desired portion of the item being operated on. As discussed herein, the implementation as illustrated is configured to score a poultry item mounted on a carriage assembly being conveyed, where the cut or incision performed by the circular blade is a cut that runs from the shoulder down towards the keel of the pulley bone. FIG. 8C illustrates further detail of the exit end 804 of the process line, which includes the conveyor return head pulley and an exit end belt that is configured to transition carriages from a top run to a bottom run. The bottom run includes multiple less accurate magnetic conveyor belt sections 820 and 824, where a carriage being conveyed along the bottom run transitions from section 824 to section 820 at the transition point 822.

Also illustrated is a belt system for transitioning a carriage assembly from the top run to the conveyor return head pulley and exit belt, and further from the head pulley to the lower return run. For one implementation as illustrated, the return head pulley and similarly the return tail pulley are configured as a spool having opposing outer flanges, where each of the circumferential edges of the outer flanges include peaks and valleys where the pitch or frequency of the peaks and valleys are such that the circumferential tread surface of the wheels of the carriage assembly rest in the valleys of the outer flanges as the carriage assembly make the 180 degree turn to and from the top run of the conveyor system.

The entry end 806 of the process line includes a conveyor return tail pulley and entry end belt that is configured to transition a carriage from a bottom run to the top run. The process line includes one or more controller systems configured to monitor and control the conveyance system and the debone station operation.

For one implementation of the technology as disclosed and claimed herein, an automated computer controlled method for performing a meat cut includes placing a meat item on a track mount assembly, said track mount assembly mounted on an under carriage where said under carriage is configured to traverse along a path of a track and where a portion of an underside of the undercarriage includes a magnetically coupled magnetic interface. One implementation includes controlling an endless conveyor to traverse magnetically coupled items attached to said endless conveyor, where the magnetically coupled items are magnetically coupled to the magnetic interface of the underside of the under carriage, thereby causing the undercarriage, track mount assembly and the meat item to traverse along the path of the track. For one implementation, the method further includes calculating a final cut path from a retrieved cut path corresponding to a selected point cloud template based on defined alignment adjustments. For yet another implementation the method includes controlling and articulating a blade of an ultrasonic knife along the calculated final cut path with multiple degrees of freedom while cutting a meat item, where articulating along the final cut path includes vibrating the blade at an ultrasonic frequency. For one implementation, the method includes the method of performing meat cut, where controlling the endless conveyor and controlling the articulating blade is performed collectively for the most efficient cutting operation.

For one implementation of the technology, an automated computer controlled system for performing a meat cut includes a track mount assembly mounted on an under carriage where said under carriage is configured to traverse along a path of a track and where a portion of an underside of the undercarriage includes a magnetically coupled magnetic interface. An endless conveyor controls traverse of magnetically coupled items attached to said endless conveyor, where the magnetically coupled items are magnetically coupled to the magnetic interface of the underside of the under carriage, thereby causing the undercarriage, track mount assembly and the meat item to traverse along the path of the track. A cut path control engine processing at a computer thereby calculates a final cut path from a retrieved cut path corresponding to a selected best matching point cloud template based on defined alignment adjustments. For one implementation, the cut path control engine thereby controls and articulates a blade of an ultrasonic knife along the calculated final cut path with multiple degrees of freedom while cutting a meat item, where articulating along the final cut path includes vibrating the blade at an ultrasonic frequency.

The various implementations and examples shown above illustrate a method and system for use of an ultrasonic knife to perform a cut. A user of the present method and system may choose any of the above implementations, or an equivalent thereof, depending upon the desired application. In this regard, it is recognized that various forms of the subject ultrasonic knife method and system could be utilized without departing from the scope of the present technology and various implementations as disclosed.

Certain systems, apparatus, applications or processes are described herein as including a number of modules. A module may be a unit of distinct functionality that may be presented in software, hardware, or combinations thereof. For example the three dimensional scanners can be considered modules having photo sensors and software to control the capture and exporting of the cloud data. A module can also include the computing system to which the three dimensional scanners are connected. When the functionality of a module is performed in any part through software, the module includes a computer-readable medium. The modules may be regarded as being communicatively coupled. By way of illustration a computer implemented software module and/or hardware module for one implementation controls the track mount position, which is connected with modules controlling the path of the ultrasonic knife such that the movements are coordinated to perform the cut. The inventive subject matter may be represented in a variety of different implementations of which there are many possible permutations.

The methods described herein do not have to be executed in the order described, or in any particular order. Moreover, various activities described with respect to the methods identified herein can be executed in serial or parallel fashion. In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

In an example implementation, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, PLC or Robotic controller or any machine capable of executing a set of instructions (sequential or otherwise) that specify actions to be taken by that machine or computing device. For the technology as disclosed and claimed herein, a portion of the machine is a computing system 132. The computing system is modified to be particularly configured to include a Point Cloud Engine, a Template Comparison and Selection Engine, a Point Cloud Crop Engine, an Alignment and Cut Path Adjustment Engine and a Cut Path Control Engine to perform the functions as described herein. Further, while only a single machine is illustrated, the term "machine" shall also be taken to include any collection of machines that individually or jointly execute a set (or multiple sets) of instructions to perform any one or more of the methodologies discussed herein. If the machine is a computer, the computer can be modified by software to interface with and control other hardware to perform tasks as with the various engines described herein. For the present technology as disclosed and claimed herein, the computing system is coupled with a robotic ultrasonic knife assembly configured to be controlled by the computing system as disclosed and claimed herein. Regarding the present disclosure, the computer can be configured with software that is operable to be executed to control signal outputs to the robotic arm.

The example computer system and client computers can include a processor (e.g., a central processing unit (CPU) a graphics processing unit (GPU) or both), a main memory and a static memory, which communicate with each other via a bus. The computer system may further include a video/graphical display unit (e.g., a liquid crystal display (LCD) or a cathode ray tube (CRT)). The computer system and client computing devices can also include an alphanumeric input device (e.g., a keyboard), a cursor control device (e.g., a mouse), a drive unit, a signal generation device (e.g., a speaker) and a network interface device.

The drive unit includes a computer-readable medium on which is stored one or more sets of instructions (e.g., software) embodying any one or more of the methodologies or systems described herein. The software may also reside, completely or at least partially, within the main memory and/or within the processor during execution thereof by the computer system, the main memory and the processor also constituting computer-readable media. The software may further be transmitted or received over a network via the network interface device.

The term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present implementation. The term "computer-readable medium" shall accordingly be taken to include, but not be limited to, solid-state memories, and optical media, and magnetic media.

As is evident from the foregoing description, certain aspects of the present implementation are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the scope of the present implementation(s). Accordingly, the specification and drawings are to be regarded in an illustrative rather than a restrictive sense.

The various ultrasonic knife examples described above illustrate a method for performing a meat cut. A user of the present technology as disclosed may choose any of the above implementations, or an equivalent thereof, depending upon the desired application. In this regard, it is recognized that various forms of the subject ultrasonic knife could be utilized without departing from the scope of the present invention.

As is evident from the foregoing description, certain aspects of the present technology as disclosed are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the scope of the present technology as disclosed and claimed.

Other aspects, objects and advantages of the present technology as disclosed can be obtained from a study of the drawings, the disclosure and the appended claims.

What is claimed is:

1. An apparatus for conveying an item comprising:
   a track mount assembly mounted on an under carriage where said under carriage is configured with a first wheel to traverse along a track, where a portion of an underside of the under carriage includes a magnetically coupled magnetic interface; and
   an endless conveyor extending along the track including one or more of an endless conveyor belt and an endless conveyor chain, where the one or more of the endless conveyor belt and the endless conveyor chain is controlled to traverse along the track and said one or more of the endless conveyor belt and the endless conveyor chain having magnetically coupled material, where the magnetically coupled material is magnetically coupled to the magnetic interface of the underside of the under carriage, thereby causing the undercarriage and the track mount assembly to traverse along the track.

2. The apparatus for conveying as recited in claim 1, comprising:
   a track wheel extending from the track mount assembly and engages and tracks along a guide track in a track groove of the guide track.

3. The apparatus for conveying as recited in claim 1, where the track includes a monorail track and where the first wheel is a grooved wheel including a groove between the outer and inner flanges of the first wheel, where said groove extends around a wheel circumference forming a circumferential groove where the circumferential groove has a curved cross-section and sized to receive the monorail track thereby resisting side-to-side movement of the carriage when being conveyed.

4. The apparatus for conveying as recited in claim 1, where the track includes one or more track guides extending proximately adjacent and above the one or more of the endless conveyor belt and the endless conveyor chain thereby assisting the one or more of the endless conveyor belt and the endless conveyor chain to thereby remain in alignment and resist disengagement.

5. The apparatus for conveying as recited in claim 1, comprising:
   a second wheel located on an opposing side of the under carriage with respect to the first wheel, said second wheel having an outer flange of the second wheel protruding beyond a tread service of the second wheel forming an outer rim to thereby resist lateral movement with respect to the one or more track guides.

6. An apparatus for conveying an item comprising:
   a linear track conveyor having an upper conveyor run extending along a path of conveyance, a lower conveyor run extending along a return path of conveyance, an entry end transfer conveyor positioned and aligned to transfer a return item being conveyed on the lower conveyor run to the upper conveyor run, and an exit end transfer conveyor positioned and aligned to transfer an operational item being conveyed on the upper conveyor run to the lower conveyor run, where the upper conveyor run includes a linear track conveyor track, and where the lower conveyor run includes a lower conveyor belt, and the entry end transfer conveyor includes an entry end conveyor belt and the exit end transfer conveyor includes an exit end conveyor belt, and where each of the lower conveyor belt, the entry end conveyor belt and the exit end conveyor belt include a ferrous material; and
   a track mount assembly mounted on an under carriage where said under carriage has a first wheel configured to interface with and traverse along the linear track conveyor and where said under carriage is further configured with a magnet array disposed in a portion of an underside of the under carriage to magnetically couple with the ferrous material in the lower conveyor belt, the entry end conveyor belt and the exit end conveyor belt.

7. The apparatus for conveying as recited in claim 6, comprising:
a track wheel extending from the track mount assembly and engages and tracks along a guide track in a track groove of the guide track.

8. The apparatus for conveying as recited in claim 6, where the linear track conveyor includes a monorail track and where the first wheel is a grooved wheel including a groove between the outer and inner flanges of the first wheel, where said groove extends around the wheel circumference forming a circumferential groove where a circumferential groove has a curved cross-section and sized to receive the monorail track thereby resisting side-to-side movement of the carriage when being conveyed.

9. The apparatus for conveying as recited in claim 6, where the linear track conveyor track includes one or more track guides extending proximately adjacent and above the linear track conveyor track thereby assisting the linear track conveyor track to thereby remain in alignment and resist disengagement.

10. The apparatus for conveying as recited in claim 6, comprising:
a second wheel located on an opposing side of the under carriage with respect to the first wheel, said second wheel having an outer flange of the second wheel protruding beyond a tread service of the second wheel forming an outer rim to thereby resist lateral movement.

11. A method for conveying an item comprising:
traversing a track mount assembly, said track mount assembly mounted on an under carriage where traversing said track mount assembly is traversing said under carriage configured with a first wheel thereby traversing to traverse along a path of a track and where a portion of an underside of the undercarriage includes a magnetically coupled magnetic interface; and
controlling an endless conveyor thereby controlling and traversing one or more of an endless conveyor belt and an endless conveyor chain to traverse along the track, said one or more of the endless conveyor belt and the endless conveyor chain having magnetically coupled material where the magnetically coupled material is magnetically coupled to the magnetic interface of the underside of the under carriage, thereby causing the undercarriage, the track mount assembly to traverse along the path of the track.

12. The method for conveying as recited in claim 11, comprising:
a track wheel extending from the track mount assembly and engages and tracks along a guide track in a track groove of the guide track.

13. The method for conveying as recited in claim 11, where the track includes a monorail track and where the first wheel is a grooved wheel including a groove between an outer and an inner flange of the first wheel, where said groove extends around a wheel circumference forming a circumferential groove where the circumferential groove has a curved cross-section and sized to receive the monorail track thereby resisting side-to-side movement of the carriage when being conveyed.

14. The method for conveying as recited in claim 11, where the track includes one or more track guides extending proximately adjacent and above the one or more of the endless conveyor belt thereby assisting to thereby remain in alignment and resist disengagement.

15. The method for conveying as recited in claim 11, comprising:
a second wheel located on an opposing side of the under carriage with respect to the first wheel, said second wheel having an outer flange of the second wheel protruding beyond a tread service of the second wheel forming an outer rim to thereby resist lateral movement.

16. A method for conveying an item comprising:
conveying a track mount assembly mounted on an under carriage on a conveyor conveying an upper conveyor run extending along a path of conveyance, a lower run conveyor extending along a return path of conveyance, an entry end transfer conveyor positioned and aligned to transfer a return item being conveyed on the lower conveyor run to the upper conveyor run, and an exit end transfer conveyor positioned and aligned to transfer an operational item being conveyed on the upper conveyor run to the lower conveyor run, transferring with the conveying exit end transfer conveyor the track mount assembly mounted on the undercarriage from the conveying upper conveyor run to the conveying lower conveyor run, and transferring with the conveying entry end transfer conveyor the track mount assembly mounted on the under carriage assembly from the conveying lower conveyor run to conveying the upper conveyor run, where the under carriage is conveying on the upper conveyor using a linear track conveyor track, and where the under carriage is conveying along the conveying lower conveyor run on a lower conveyor belt, conveying along the conveying entry end transfer conveyor on an entry end conveyor belt and conveying along the conveying exit end transfer conveyor on an exit end conveyor belt, and where each of the lower conveyor belt, the entry end conveyor belt and the exit end conveyor belt includes a ferrous material; and
where said under carriage has a first wheel interfacing with and traversing along the linear track conveyor and where said under carriage is further configured with a magnet array disposed in a portion of an underside of the under carriage thereby magnetically coupling with the ferrous material in the lower conveyor belt, the entry end conveyor belt and the exit end conveyor belt.

17. The method for conveying as recited in claim 16, comprising:
engaging and tracking a track wheel extending from the track mount assembly along a guide track in a track groove of the guide track.

18. The method for conveying as recited in claim 16, where the conveyor includes a monorail track and where the first wheel is a grooved wheel including a groove between an outer and an inner flange of the first wheel, where said groove extends around a wheel circumference forming a circumferential groove where the circumferential groove has a curved cross-section and sized to receive the monorail track thereby resisting side-to-side movement of the carriage when being conveyed.

19. The method for conveying as recited in claim 16, where the conveyor includes one or more track guides extending proximately adjacent and above the linear track conveyor track thereby assisting to thereby remain in alignment and resist disengagement.

20. The method for conveying as recited in claim 16, comprising:
  a second wheel located on an opposing side of the under carriage with respect to the first wheel, said second wheel having an outer flange of the second wheel protruding beyond a tread service of the second wheel forming an outer rim to thereby resist lateral movement.

21. An apparatus for conveying and item comprising:
  a conveyor having an upper conveyor run extending along a path of conveyance, a lower run conveyor extending along a return path of conveyance, an entry end transfer conveyor positioned and aligned to transfer a return item being conveyed on the lower conveyor run to the upper conveyor run, and an exit end transfer conveyor positioned and aligned to transfer an operational item being conveyed on the upper conveyor run to the lower conveyor run, where the upper conveyor run includes a plurality of linear track conveyor sections that are spaced apart, one linear track conveyor section with respect to the other, and said upper conveyor run includes upper linear track conveyor track sections disposed between the spaced apart linear track conveyor sections, and where the lower conveyor run includes a lower conveyor belt, the entry end transfer conveyor includes an entry end conveyor belt and the exit end transfer conveyor includes an exit end conveyor belt, and where each of the lower conveyor belt, the entry end conveyor belt and the exit end conveyor belt includes a ferrous material; and
  a track mount assembly mounted on an under carriage where said under carriage includes a wheel configured to interface with and traverse along the linear track conveyor sections and the upper linear track conveyor track sections disposed between the linear track conveyor sections and where said under carriage is further configured with a magnet array disposed in a portion of an underside of the under carriage to magnetically couple with the ferrous material in the upper conveyor belt section, the lower conveyor belt, the entry end conveyor belt and the exit end conveyor belt.

22. The apparatus for conveying as recited in claim 21, comprising:
  a track wheel extending from the track mount assembly and engages and tracks along a guide track in a track groove of the guide track.

23. The apparatus for conveying as recited in claim 21, where the linear track conveyor includes a monorail track and where the first wheel is a grooved wheel including a groove between the outer and inner flanges of the first wheel, where said groove extends around the wheel circumference forming a circumferential groove where a circumferential groove has a curved cross-section and sized to receive the monorail track thereby resisting side-to-side movement of the carriage when being conveyed.

24. The apparatus for conveying as recited in claim 21, where the linear track conveyor track includes one or more track guides extending proximately adjacent and above the linear track conveyor track thereby assisting the linear track conveyor track to thereby remain in alignment and resist disengagement.

25. The apparatus for conveying as recited in claim 21, comprising:
  a second wheel located on an opposing side of the under carriage with respect to the first wheel, said second wheel having an outer flange of the second wheel protruding beyond a tread service of the second wheel forming an outer rim to thereby resist lateral movement.

26. A method for conveying and item comprising:
  conveying a conveyor having an upper conveyor run extending along a path of conveyance, a lower run conveyor extending along a return path of conveyance, an entry end transfer conveyor positioned and aligned to transfer a return item being conveyed on the lower conveyor run to the upper conveyor run, and an exit end transfer conveyor positioned and aligned to transfer an operational item being conveyed on the upper conveyor run to the lower conveyor run, where the upper conveyor run includes a plurality of linear track conveyor sections that are spaced apart, one linear track conveyor section with respect to the other, and said upper conveyor run includes upper linear trach conveyor track sections disposed between the spaced apart linear track conveyor sections, and where the lower conveyor run includes a lower conveyor belt, the entry end transfer conveyor includes an entry end conveyor belt and the exit end transfer conveyor includes an exit end conveyor belt, and where each of the lower conveyor belt, the entry end conveyor belt and the exit end conveyor belt includes a ferrous material; and
  traversing a track mount assembly mounted on an under carriage where said under carriage includes a wheel configured to interface with and thereby traversing along the linear track conveyor sections and the upper conveyor belt sections disposed between the linear track conveyor sections and where said under carriage is further configured with a magnet array disposed in a portion of an underside of the under carriage, thereby magnetically coupling with the ferrous material in the upper conveyor belt section, the lower conveyor belt, the entry end conveyor belt and the exit end conveyor belt.

27. The method for conveying as recited in claim 26, comprising:
  a track wheel extending from the track mount assembly and engages and tracks along a guide track in a track groove of the guide track.

28. The method for conveying as recited in claim 26, where the linear track conveyor includes a monorail track and where the first wheel is a grooved wheel including a groove between the outer and inner flanges of the first wheel, where said groove extends around the wheel circumference forming a circumferential groove where a circumferential groove has a curved cross-section and sized to receive the monorail track thereby resisting side-to-side movement of the carriage when being conveyed.

29. The method for conveying as recited in claim 26, where the linear track conveyor track includes one or more track guides extending proximately adjacent and above the linear track conveyor track thereby assisting the linear track conveyor track to thereby remain in alignment and resist disengagement.

30. The apparatus for conveying as recited in claim 26, comprising:
  a second wheel located on an opposing side of the under carriage with respect to the first wheel, said second wheel having an outer flange of the second wheel protruding beyond a tread service of the second wheel forming an outer rim to thereby resist lateral movement.

* * * * *